US010372752B1

(12) United States Patent
Veitch

(10) Patent No.: US 10,372,752 B1
(45) Date of Patent: *Aug. 6, 2019

(54) METHOD AND SYSTEM FOR COLLECTING, AND GLOBALLY COMMUNICATING AND EVALUATING, DIGITAL STILL AND VIDEO IMAGES OF SPORTS AND EVENT SPECTATORS, INCLUDING AUGMENTED REALITY IMAGES FROM ENTERTAINMENT AND GATHERING VENUES

(71) Applicant: KissCam, LLC, Morrison, CO (US)

(72) Inventor: Dana Richard Veitch, Morrison, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/368,715

(22) Filed: Mar. 28, 2019

Related U.S. Application Data

(63) Continuation-in-part of application No. 16/024,616, filed on Jun. 29, 2018, now Pat. No. 10,248,665, which is a continuation of application No. 15/942,190, filed on Mar. 30, 2018, now Pat. No. 10,162,839.

(51) Int. Cl.
*H04W 4/14* (2009.01)
*G06F 16/54* (2019.01)
*G06Q 30/02* (2012.01)
*H04W 4/021* (2018.01)

(52) U.S. Cl.
CPC ........ *G06F 16/54* (2019.01); *G06Q 30/0267* (2013.01); *H04W 4/021* (2013.01); *H04W 4/14* (2013.01)

(58) Field of Classification Search
CPC ............ G07F 17/3295; G07F 17/3218; G07F 17/3223; G07F 17/3225; G07F 17/3237; A63F 13/12; A63F 2300/409; A63F 2003/083; A63F 13/795; H04N 21/4781; H04N 21/4784; G06F 17/30772; G06F 16/54; H04L 67/22; G06Q 30/0267; H04W 4/021; H04W 4/14
See application file for complete search history.

(56) References Cited

U.S. PATENT DOCUMENTS

| 2008/0120396 | A1* | 5/2008 | Jayaram | G06Q 10/10 709/218 |
| 2014/0267747 | A1* | 9/2014 | Kritt | H04N 7/181 348/159 |
| 2014/0378212 | A1* | 12/2014 | Sims | G06Q 30/0276 463/25 |

* cited by examiner

*Primary Examiner* — Nizar N Sivji
(74) *Attorney, Agent, or Firm* — Hulsey, P.C.

(57) ABSTRACT

A contest method and system include a sponsor displaying an advertisement accompanied by a contest invitation in association with a spectator event. An electronically geofenced perimeter of the spectator event to electronically submit affection-demonstrating digital images for contest participation, the affection-demonstrating digital images comprising at least one still image selected from a personal photograph, a family photograph, and a pet photograph portraying demonstrations of kissing, hugging, or otherwise conveying personal affection between at least two individuals or pets. Selecting a subset of the affection-demonstrating digital images, including augmented reality (AR) images, from spectators located within the electronically geofenced perimeter of the spectator event as candidates for entry into a voting stage of the contest.

20 Claims, 30 Drawing Sheets

METHOD AND SYSTEM FOR COLLECTING, AND GLOBALLY COMMUNICATING AND EVALUATING, DIGITAL STILL AND VIDEO IMAGES OF SPORTS AND EVENT SPECTATORS, INCLUDING AUGMENTED REALITY IMAGES FROM ENTERTAINMENT AND GATHERING VENUES

CROSS REFERENCE TO RELATED APPLICATIONS

This application further claims the benefit of the following non-provisional applications, all of which are here expressly incorporated by reference:

Ser. No. 15/942,190 entitled "METHOD AND SYSTEM FOR COLLECTING, AND GLOBALLY COMMUNICATING AND EVALUATING DIGITAL IMAGES OF SPORTS FANS, PUBLIC DISPLAYS OF AFFECTION AND MISCELLANEOUS GROUPS FROM ENTERTAINMENT VENUES," filed on Mar. 30, 2018, now U.S. Pat. No. 10,162,839, with Issue Date of Dec. 25, 2018;

Ser. No. 16/024,616 entitled "METHOD AND SYSTEM FOR COLLECTING, AND GLOBALLY COMMUNICATING AND EVALUATING DIGITAL IMAGES OF SPORTS FANS, PUBLIC DISPLAYS OF AFFECTION AND MISCELLANEOUS GROUPS FROM ENTERTAINMENT VENUES," filed on Mar. 30, 2018, now U.S. Pat. No. 10,248,665, with Issue Date of Apr. 2, 2019;

FIELD OF THE INVENTION

The present disclosure relates to method and system for collecting, globally communicating, and evaluating advertising messages including digital images of public displays of affection from a large entertainment venue. More particularly, the present disclosure relates to a method and system for a crowd-pleasing advertising tool and global electronic contest whereby spectators participate by sharing digital images and videos of individuals kissing or otherwise showing personal affection for one or more individuals upon being captured by the venue camera. Even more particularly, the present disclosure relates to a method, system, and integrated digital communications system for forming a correlated view of a plurality of individuals attending a large entertainment venue or gathering for entertaining a global community of spectators with digital images, including actual and augmented and/or virtual reality images, from live entertainment venue or gathering participants by permitting a global community to view, assess, and cast votes relating to images derived from entertainment participants at the venue or gathering.

BACKGROUND OF THE INVENTION

The original KissCam® video was introduced in North America in the 1980s and has proven to be one of the most crowd-pleasing advertising tools in history. KissCam® is a social contest that takes place during arena, stadium and court sporting events in the United States and Canada. It is intended as a light-hearted diversion to the main event during a timeout, television timeout, or similar downtime. A 'KissCam®' camera scans the crowd, and selects a couple, their images being shown on the Jumbotron® screens in the arena. The couple are then invited to kiss one another, encouraged by the rest of the audience. A kiss is traditionally rewarded by cheers and whistles, whereas a refusal to kiss is booed.

When the KissCam® is in action, the audience may be alerted by a known 'kiss-related' song being played, and/or an announcer warning the crowd. The crowd attending then pay attention to the marked 'KissCam®' video screen. Normally several consecutive couples are selected and appear on the screen. As each pair appear onscreen, they are then expected to kiss. Additionally, sporting event staff may appear as couples who reject kisses or proposals in order to entertain or surprise the attending audience.

As all eyes turn to the KissCam® segment, they also linger on the sponsor's logo. It is still the crowd favorite. When the Kiss Cam catches you, you know what you're going to do. Participants never forget the first time they embarrassed themselves in front of 40,000 people. The growth in popularity and use of KissCam® has been phenomenal and promises to continue to grow.

As KissCam® has grown, however, significant changes have occurred in both the venues where the contest may be played and expectations of the contest participants. Geographically, new venues are moving back to the city, anchoring larger mixed-use real estate developments and creating "arena districts" that reshape commercial activity in the neighborhood. Meanwhile, fans are playing an increasingly important role in shaping and directing the experience-interacting with teams and players in new ways on the field, in the concourses, and outside the stadium.

Concurrent to these trends in stadium construction, over the past fifty years, transformative advances in consumer technology have occurred. Increases in computing power and the shift to mobile and cloud computing as the dominant paradigm have fundamentally reshaped commerce. Today's smartphone owner carries a device with processing power that would have required a computer the size of a stadium fifty years ago.

These trends are increasingly converging. The sports industry is moving toward a new model in which the stadium is a technological and commercial platform. This change subverts the traditional way of thinking about the stadium experience. It is no longer enough to only consider the role of sightlines, seat width, and the price of beer. Teams need to engage their fans and event-goers to encourage them to shape their own experience.

While the platform concept requires an organizational and operational mindset shift for teams and stadium operators, teams that embrace it in stadium design, construction, and operation will be on the vanguard of offering their fans the best experience in the stadium of the future.

In a day of increased recognition of the KissCam® contest, the enhanced technological and social importance of the large stadium or gathering venues, and the ever-increasing power of the venue participants to influence stadium and gathering activities, a new demand for an enhance KissCam® contest arises.

Augmented reality applies a different reality or scenes an observer experiences which are overlayed onto the pre-existing reality. Devices capable of preforming these functions include certain devices such as smartphones and smartglasses. Computer-generated images of a different setting are superimposed on the user's device to alter his perspective of reality. Augmented reality works in sync with other technologies such as IoT (Internet of Things) and many others to give people a richer view on their reality. Augmented reality differs from what is known as virtual reality. With VR (Virtual Reality), the viewer is totally submerged into a completely different reality than the one they are currently living in. In contrast, with AR the use can see an altered version of his own reality on a mobile phone screen/smart-glasses and still be in his present reality, with VR, the user wears a headset that would to cover an entire field of view. He cannot actually see anything going on in your actual setting, except as may be projected through the headset. There is no direct line of sight with the actual setting.

AR involves the superimposition of images, but for VR requires creation of a whole new setting either from scratch or based on a pre-existing setting. AR is mostly beneficial for things like driving, day-to-day navigation, indoor navigation.

BRIEF SUMMARY OF THE INVENTION

The disclosed subject matter provides a method and system for collecting, and globally communicating and evaluating digital images, including still and video images, of public displays of affection from a large entertainment venue or gathering. For purposes of the present disclosure, affection may include fondness, love, liking, endearment, feeling, sentiment, tenderness, warmth, warmness, devotion, care; caring, attentiveness, closeness, attachment, affinity, friendliness, friendship, intimacy, familiarity; amity, favor, regard, respect, admiration; warm feelings. Moreover, the affection-demonstrating digital images, as referenced herein, include digital images capable of demonstrating affection. For instance, such affection-demonstrating digital images may include, but not be limited to, at least one still image or video segment selected from a personal photograph, a family photograph, and/or a pet photograph portraying demonstrations of kissing, hugging, or otherwise conveying personal affection between at least two individuals or pets.

The present disclosure provides a greater means for generating revenue and enhancing participant involvement in the KissCam® contest than ever before. The present disclosure includes a KissCam® app for engaging audiences, as well as a comprehensive client-server architecture and a global video communications network for aggregating, assessing, and generating contest results and follow-on marketing and demographic data as a result of playing the contest. When entering a gathering or venue, contest sponsors or controls may invite spectators to join in the KissCam® contest by downloading on their iPhone or other portable multifunctional device the KissCam® app. They may snap their own photos, select a frame designed for the venue with the sponsor's logo, upload their photo and enter to the KissCam® contest to win prizes (e.g., vacations, team merchandise, etc.). Moreover, not only still images, but also video images are within the practice of the presently disclosed subject matter. Participants may be randomly selected and uploaded on a big television or video screen at the venue. An event announcer may request that all who see the photos text their vote for "best kiss" or "favorite image" while encouraging everyone to instantly post their images on social media from the KissCam® app. While the KissCam® video segment only lasts for a few minutes, the branded frame endures. All participants have an opportunity to win, fans may commemorate their experience with a framed memento, advertisers extend their exposure as photos are launched into social media, and the venue enjoys increased advertising revenues and data collection to further marketing efforts.

The method and system of the present disclosure provide KissCam® sports frames for customization of the experience at different events and different venues around the world. The presently disclosed method and system provide a wide array of communication modes and may be offered in many different kinds of venues. Such venues may also include national landmarks, parks and recreation areas where crowds of people gather. With the use of the presently disclosed augmented reality functionality, the present disclosure further provides a highly robust and enjoyable in the here disclosed set of functions to make the method and system for collecting, and globally communicating and evaluating, digital still and video images of sports and event spectators, including augmented reality images from entertainment and gathering venues.

According to one aspect, the present disclosure provides a contest method, system, and integrated global communications platform allowing a sponsor to display an advertisement accompanied by a contest invitation in association with a spectator event. The method and system make available a network, including data transmission and storage mechanisms, for contest contestants located within an electronically geofenced perimeter of a spectator event. These geofenced participants may electronically submit affection-demonstrating digital images for contest participation. The affection-demonstrating digital images may include at least one still image or video segment selected from a personal photograph, a family photograph, and/or a pet photograph portraying demonstrations of kissing, hugging, or otherwise conveying personal affection between at least two individuals or pets. A plurality of spectators at the event may become contest participants and enter the contest. In so doing, the participant may generate a digital image using a camera, a cellular phone with a built-in camera, a scanner, or a kiosk and electronically submit the affection-demonstrating digital images representing demonstrations of kissing, hugging, or otherwise conveying personal affection between at least two individuals or pets, as well as participant information, to the contest network, for contest participation. The digital images may be electronically submitted using an MMS message or an internet connection. Once submitted the digital images may be stored on contest servers. The contest further involves selecting a subset of the affection-demonstrating digital images from spectators located within the electronically geofenced perimeter as candidates for entry into a voting stage of the contest.

The contest further involves broadcasting the selected subset of affection-demonstrating digital images to a global of community of spectators. The members of the global community of spectators may be both located at the spectator event, as well as be watching the spectator event via a media outlet. The contest invites all spectators of the spectator event to vote for at least one of the affection-demonstrating digital images from the selected subset of the affection-demonstrating digital images and communicate the vote to a contest server controlling the contest operations.

The contest further includes electronically receiving and tallying the votes from all spectators within a predetermined time limit and prior to the end of the spectator event. Electronically encrypting the affection-demonstrating digital images and contestant information also occurs for the contest. This includes using software provided on a contest participants' computer or mobile devices or upon receipt of the affection-demonstrating digital images by a server of the contest provider. This information may form a plurality of information capsules comprising a plurality of affection-demonstrating digital images, each of the affection-demonstrating digital images corresponding to an individual entrant of the contest. The contest further includes entering the plurality of affection-demonstrating digital images into an electronic batch of a plurality of affection-demonstrating digital image entrants.

The contest further involves selecting a subset of affection-demonstrating digital images from the electronic batch of affection-demonstrating digital images and designating the selected affection-demonstrating digital images as one or more winning entries of the contest according to the selected affection-demonstrating digital image having received the most votes from all spectators both within the geofenced spectator event perimeter and outside the geofenced spectator event perimeter. The contest further decrypts the digital image and contestant information and identifies a single winner of the contest by using the digital image and contestant information. Because winning affection-demonstrating digital images are identified electronically by submitting the digital images via an MMS message or Internet connection, new digital images may be initiated and completed in compressed time periods associated with the duration for the spectator event.

An important aspect of the present disclosure includes incorporating KissCam® as an app that provides framed event photo for uploading on social media, which shows that the person was present at the event. The difference between the existing KissCam® application or system and the subject matter of the present disclosure includes the ability to capture images from venue participants and make those images accessible to the entire global community of individuals who have the KissCam® app installed on their portable multifunction device. Then, during the entertainment or sports event at the particular venue, the holder of the portable multifunction device can determine which digital images they prefer.

Based on this preference, they may vote and send that vote back to the sports venue or entertainment venue. Then, based on the accumulated results of votes from those at the venue watching the particular sports or entertainment event, as well as the votes of individuals not at the venue, are added and compared. From this comparison a winner of the selected images is chosen, and that winner receives an appropriate reward. This is a fundamentally different process and system that integrates an entire global communications network to achieve satellite communications, control of voting processes, as well as communications both within the geofenced participant area. The method and system of the present disclosure provide the KissCam® to the world community as a whole, all occurring in real time. In essence, the present disclosure, allows everyone worldwide to participate in KissCam® contest events.

Another aspect of the present disclosure includes allowing winners to be chosen instantly and shown on the large television monitors at the arena venue or large gathering. For example, after 10 to 15 minutes following the receipt of worldwide votes, the method and system present to the venue participants and the world alike the voting results. Following the voting, winners are identified and posted on Facebook, youtube, Instagram or other social media.

The KissCam® app can be used for branding and fan engagement. KissCam® photo frames can be customized by brands, teams and entertainers with brand or team logos for their fans. At an event, the branded frame will pop up and users will use them for that event. These and other novel aspects of the present disclosure are described in more detail below.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF ILLUSTRATIVE EMBODIMENTS

Figure 1:
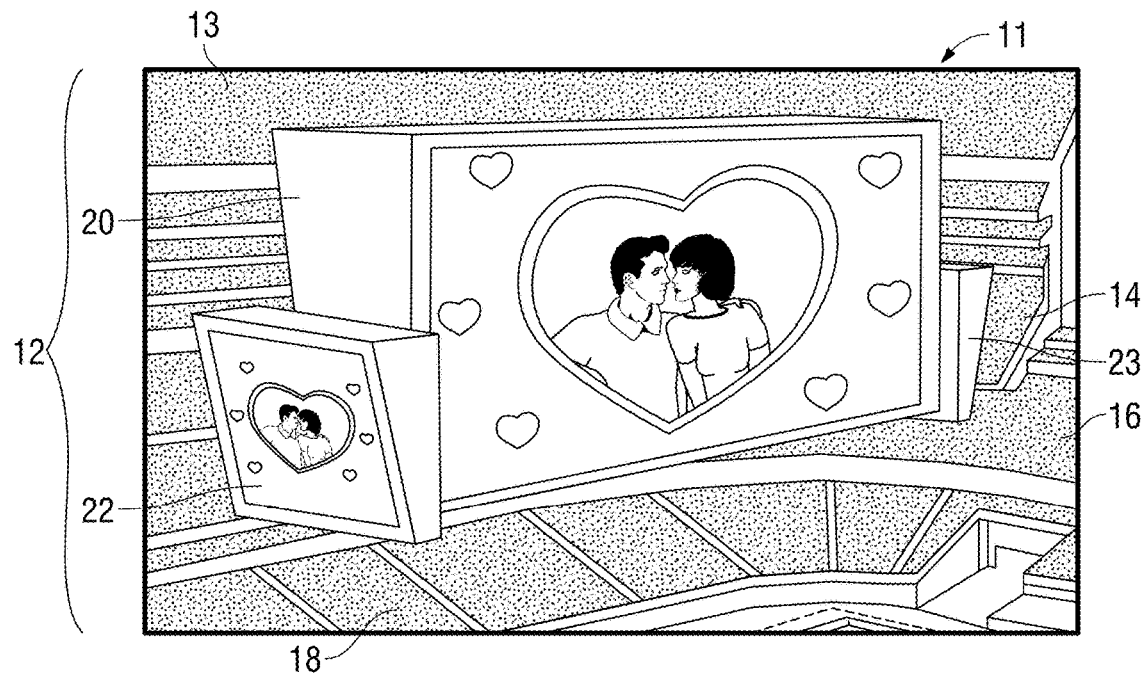
FIG. 1 shows a large sports or entertainment venue monitor or television displaying the output of the presently disclosed subject matter.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration.

It will be understood that in the event parts of different embodiments have similar functions or uses, they may have been given similar or identical reference numerals or descriptions. It will be understood that such duplication of reference numerals is intended solely for efficiency and ease of understanding the present invention and are not to be construed as limiting in any way, or as implying that the various embodiments themselves are identical.

Unless defined otherwise, all technical and scientific terms used herein have the same meaning as commonly understood by one of ordinary skill in the art to which the present invention belongs. However, some specific definitions are presented below.

The terms "user" refers to the individual who is interacts with the system primarily via the mobile client-side application. Users can also be defined as registered users, participants, spectators, persons.

The term "users" or "registered users" refers collectively to those individuals who have access to the system of the present invention, including venue participants, global spectators, sponsors, administrators, information technology specialists and end users generally. The term "non-user" refers to any individual who does not have access to either the server-side and/or client-side applications described herein yet may be recipient of the content generated by the same.

The term "video display" refers to devices upon which information may be displayed in a manner perceptible to a user, such as, for example, a computer monitor, cathode ray tube, liquid crystal display, light emitting diode display, touchpad or touchscreen display, and/or other means known in the art for emitting a visually perceptible output. Video displays may be electronically connected to a client device according to hardware and software known in the art.

In an implementation of a preferred embodiment of the invention, a "display page" may include a computer file residing in memory which may be transmitted from a server over a network to a mobile device which can store it in memory. A mobile device may receive non-transitoriny computer readable media, which may contain instructions, logic, data or code that may be stored in persistent or temporary memory of the mobile device. Similarly, one or more servers may communicate with one or more client devices across a network and may transmit computer files residing in memory. The network, for example, can include the Internet, wireless communication network, or any other network for connecting one or more client devices to one or more servers.

Any discussion of "client-side application" may also apply to a mobile application which is downloaded to or stored on a client device and/or mobile device.

Any discussion of "client", "client device" or "mobile device" may also apply to any type of networked device, including but not limited to phones such as cellular phones (e.g. An iPhone, Android, Windows Mobile, Blackberry, or any "smart phone") or location-aware portable phones (such as GPS); embedded or specialty device; or viewing device (such as appletv, Google TV, Roku, Smart TV, Picture Frame or other viewing device); personal computer, server computer, or laptop computer; personal digital assistants (pdas) such as Palm-based devices or tablet devices (such as iPad, Kindle Fire, or any tablet device); a roaming device such as a network-connected roaming device or other device capable of communicating wirelessly with a computer network; or any other type of network device that may communicate over a network and handle electronic transactions. Any discussion of any device mentioned may also apply to other devices.

At a client device, the "display page" or "user interface" may be interpreted by software residing on a memory of the client device, causing the computer file to be displayed on a video display in a manner perceivable by a user. The display pages (i.e., screens) described herein may be created using a software language known in the art such as, for example, the hypertext mark-up language ("HTML"), the dynamic hypertext mark-up language ("DHTML"), HTML5, the extensible hypertext mark-up language ("XHTML"), the extensible mark-up language ("XML"), or another software language that may be used to create a computer file displayable on a video display in a manner perceivable by a user. Any computer readable media with logic, code, data, instructions, may be used to implement any software or steps or methodology. Where a network comprises the Internet, a display page may comprise a webpage of a type known in the art.

The terms "page" or "display page" may include embedded functions comprising software programs stored on a memory, such as, for example, Cocoa, vbscript routines, Jscript routines, javascript routines, Java applets, activex components, ASP.NET, AJAX, Flash applets, Silverlight applets, Adobe AIR routines, or any other scripting language.

A display page may comprise well known features of graphical user interface technology, such as, for example, frames, windows, tabs, scroll bars, buttons, icons, menus, fields, and hyperlinks, and well-known features such as a touchscreen interface. Pointing to and touching on a graphical interface button, icon, menu option, or hyperlink also is known as "selecting" the button, icon, option, or hyperlink. Additionally, a "point and gesture" interface may be utilized, such as a hand-gesture driven interface. Any other interface for interacting with a graphical user interface may be utilized. A display page according to the invention also may incorporate multimedia features. For example, a user interface may be provided for a web page or for an application. An application may be accessed remotely or locally. A user interface may be provided for a mobile application (e.g. Iphone application), gadget, widget, tool, plug-in, or any other type of object, application or software.

Any of the client or server devices described may have tangible computer readable media with logic, code, or instructions for performing any actions described herein or running any algorithm. The devices with such computer readable media may be specially programmed to perform the actions dictated by the computer readable media. In some embodiments, the devices may be specially programmed to perform one or more tasks relating to blood glucose management. In some embodiments, the devices may communicate with or receive data collected from one or more measurement or sensing devices, which may collect physiological data from a subject or from a sample collected from a subject.

The term "time" refers to a chronological time or timeframe, including but not limited to morning, afternoon, evening, breakfast, lunch, dinner, night time, beginning, end, etc.

Other examples of protocols or standard communications means between the server and the client included within the scope of this invention include but are not limited to standard telephone lines, LAN or WAN links (e.g., T1, T3, 56 kb, X.25), broadband connections (ISDN, Frame Relay, ATM), and wireless connections using a variety of communication protocols (e.g. HTTP, HTTPS, XML, JSON, TCP/IP, IPX, SPX, netbios, Ethernet, RS232, messaging application programming interface (MAPI) protocol, real-time streaming protocol (RTSP), real-time streaming protocol used for user datagram protocol scheme (RTSPU), the Progressive Networks Multimedia (PDN) protocol, manufacturing message specification (MMS) protocol, wireless application protocol (WAP) and direct asynchronous connections.

FIG. 1 illustrates arena venue 10 that may house tens of thousands of participants. Arena venue 10 is often used for concerts, professional football contests, basketball contests, soccer contests, and for large media events where tens of thousands of individuals are positioned to observe a major community or regional event. So, arena venue 10 includes thousands of participants 12 that may be positioned in the most upper balcony 12, the middle balcony 14, a lower balcony 16 and a field side region 18. The construction of arena venue 10 is such that, to the maximum extent possible, participants in all seating regions 12 through 18 have an opportunity to see the activities occurring within arena venue 10.

One of the instruments the management and supporting media personnel seek to assure is that participants enjoy the greatest visibility and communications of activities occurring within arena venue 10. For example, large screen television or Jumbotron® 20, by Sony Corporation, provides a light-emitting diode (LED) screen that displays images measuring 30 feet diagonally with the resolution of 240×192 pixels. Other manufacturers also provide large monitor or television screens today that may range to large sizes. The Western Hemisphere's largest high-definition display is a Daktronics Prostar® at the University of Texas Darrell K. Royal-Texas Memorial Stadium known as Godzillatron®. In addition to large television screen 20, arena venue 10 frequently provides end zone large screen televisions 22 to assure that all participants have an optimal perspective in viewing large screen television 20.

Figure 2:
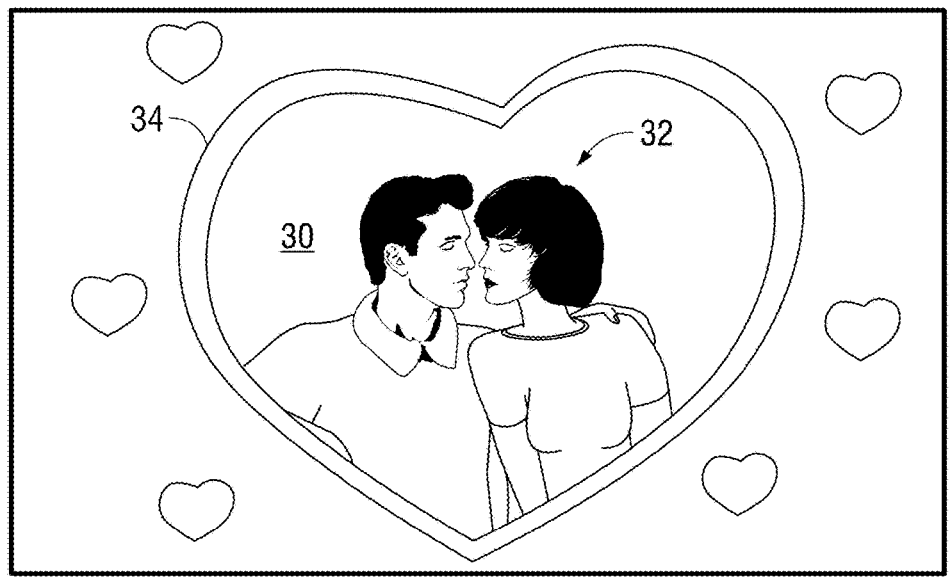
FIG. 2 portrays a user interface as a display output such as may be shown on a large sports or entertainment venue monitor.

FIG. 2 portrays a user interface 28 as a display output such as may be shown on a large sports or entertainment venue monitor 20. With the presently disclosed KissCam® video contest, still or video images such as affection-demonstrating video image 30 of FIG. 2 arena venue participants 32 who may be captured are shown as kissing to all the spectators seated within arena venue 10, including those in upper balcony 12, middle balcony 14, lower balcony 16, and field side 18. Clearly, this type of live video presentation to participants captured in an affection-demonstrating video image that may be broadcast to all arena venue participants 10, is exciting and entertaining.

Another aspect of the affection-demonstrating video images of the present disclosure includes the Valentines heart or creative artwork frame 34 which frames participants 32 demonstrating their affection for one another by kissing, hugging, or the like. These are controlled by a contest controller or administrator and may further include advertising or other messages within the affection-demonstrating digital image frame 30.

Figure 3:
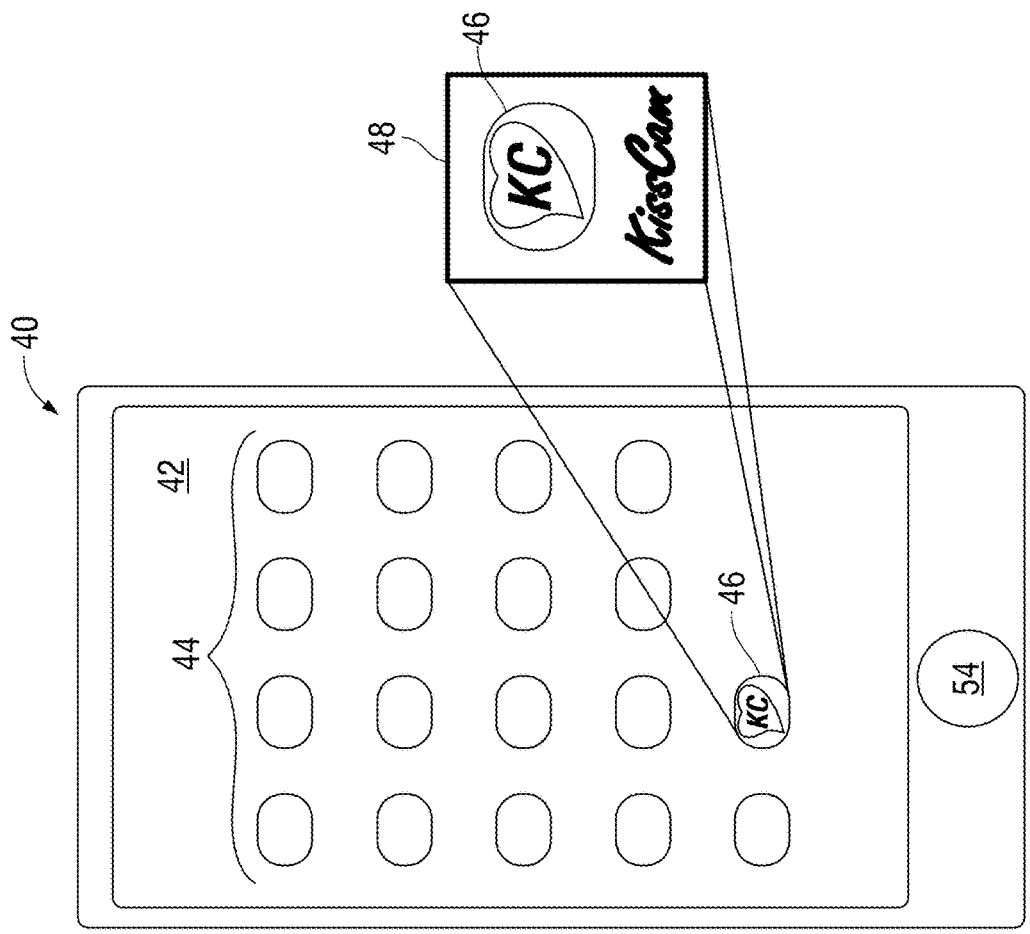
FIG. 3 illustrates the home user interface screen of a portable multifunction device, including an installation of the presently disclosed subject matter.

FIG. 3 demonstrates portable multifunction device 40, which supports critical functional aspects of the present disclosure, in combination with the functionality and benefits of inter-operating the media and entertainment facilities of arena venue 10. Thus, by communication of digital images via portable multifunction device 40, participants have an opportunity for being seen on large screen television 20 and end zone large screen televisions 22, as well as numerous communications and entertainment media outlets, as will be described work particularly below. In conjunction with a global communications network employing computer memory circuits and processors processing executable instructions, as well as the content and cooperation of numerous individuals interfacing with the presently disclosed subject matter, the result becomes an original entertainment method and system for the enjoyment of both participants within arena venue 10, as well as a much larger global community.

Focusing again on portable multifunction device 40, there appears home screen 42 which presents a user-controlled array of application icons 44 for user-controlled computer or portable multifunction device 40 processes. In particular, there is presented KissCam® icon 46, which, upon pressing, a user may initiate the present computer processes and communication facilities for the affection-demonstrating video images 30. As home screen excerpt 48 portrays, KissCam® icon 46 includes a heart-shaped image with the letters "KC" and the name KissCam® there below. However, the labeling of the subject matter of the present disclosure is not intended to be limiting in any way. Other application and processes formed according to the teachings of the present disclosure may assume different trademarks or trade names and yet be within the scope of the present disclosure and associated claims herein.

Home screen 42 provides the center of operation of portable multifunction device 40, which may be an iPhone® and iPad® and provides the location to store, find, and launch all portable multifunction device 40 apps, such as KissCam® app 46. In addition to using home screen 42, as user may find KissCam® app 46 on portable multifunction device 40 using a search process, such as the iPhone Spotlight tool. For those with 3D Touch, home screen 42 may also offer a range of shortcuts for seeing widgets or jumping to actions more quickly. The KissCam® app 46 also provides for Today View®, Notification Center, Control Center, and Siri® interfaces within portable multifunction device 40.

KissCam® app 46, which may be downloaded to portable multifunction device 40 using any acceptable means for downloading and installing a device 40 software application. With KissCam® app 46, a venue may integrate an audience into their sports contests and concerts to significantly enhance the entertainment value of the time spent watching the contest or event, whether the venue be a stadium, auditorium, or large open venue where large monitors, such as monitor 20, above, has use.

Figure 4:
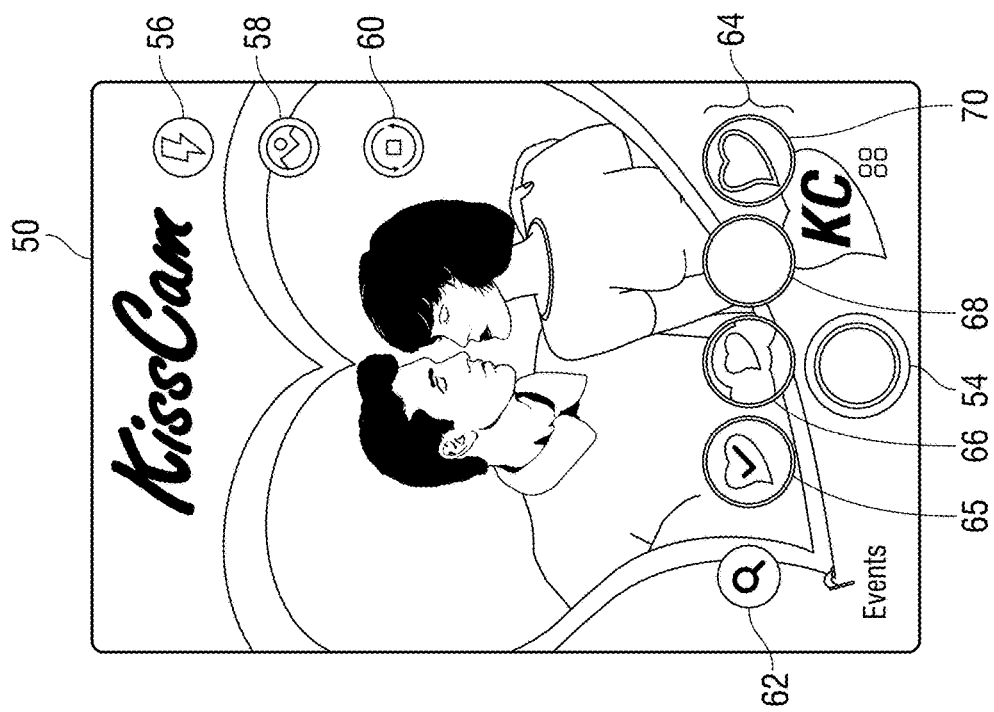
FIG. 4 presents the application home screen for the presently disclosed subject matter, as such may appear on a portable multifunction device.

Upon pressing KissCam® icon 46, portable multifunction device 40 initiates and displays application home screen 50 of FIG. 4. Application home screen 50 includes numerous functions. In addition to showing the KissCam® logo or brand 52, certain controls are available. By selecting home button 54, a user may return to home screen 42 of portable multifunction device 40.

Referring to FIG. 4, KissCam® app home screen 50 includes flash control 56, back lighting control 58, and camera lens selector control 60. At the bottom of KissCam® application home screen 50 also appears search control 62. To select a desired artwork frame 34, home screen 50 further includes event frame selector 64, which allows selection of different frame styles 65, generic selector 66, and branded KissCam® frame 68. The functions of these controls are detailed more expressly below.

Note the FIG. 4 may show a still digital image or a video image. Other characterizations of the KissCam® including 3D images and enhances are considered within the scope of the presently disclosed and claimed subject matter.

Figure 5:
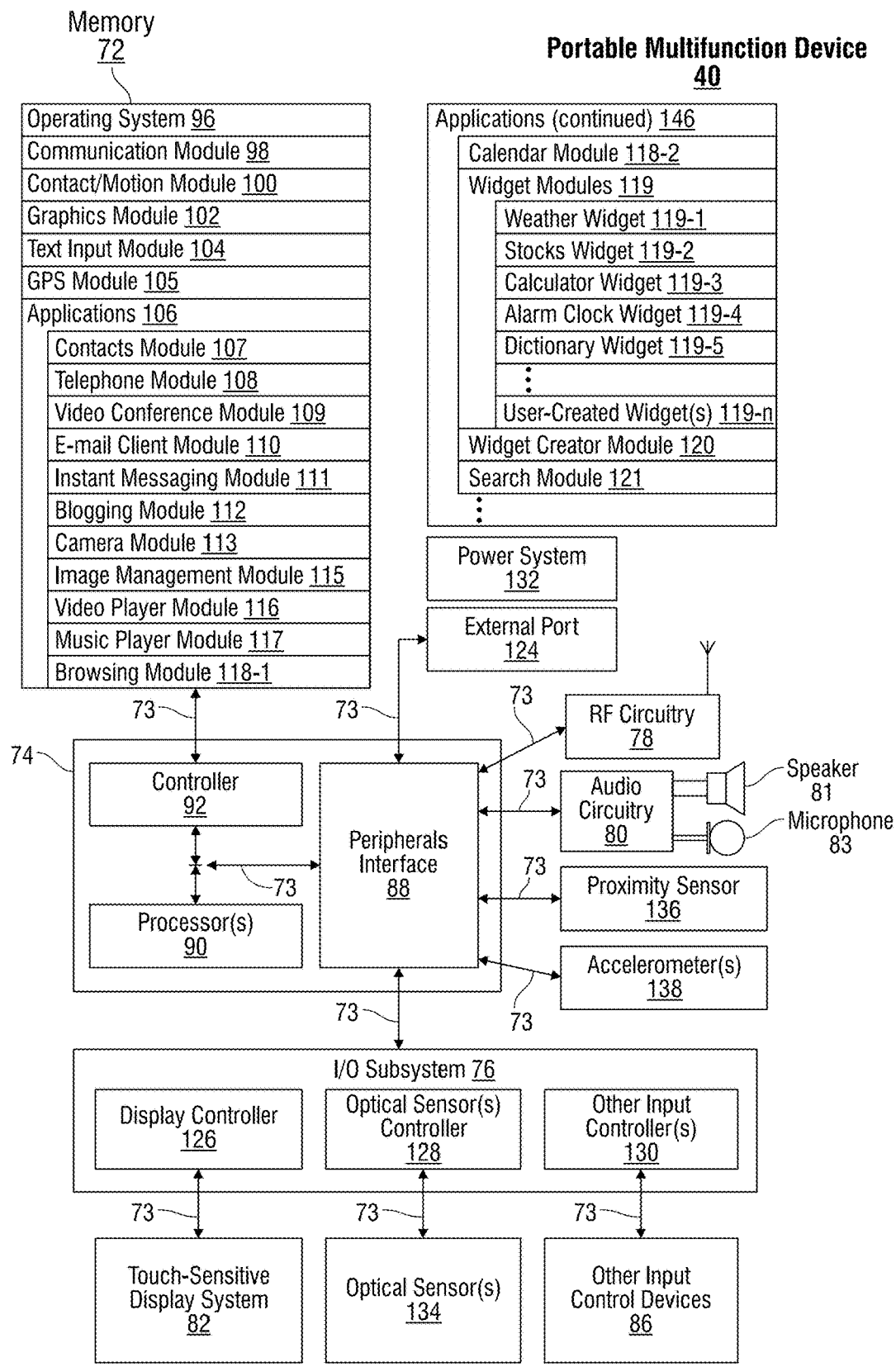
FIG. 5 depicts a block diagram of internal component circuits of a portable multifunction device that may support the data and executable instructions of the presently disclosed subject matter.
Figure 6:
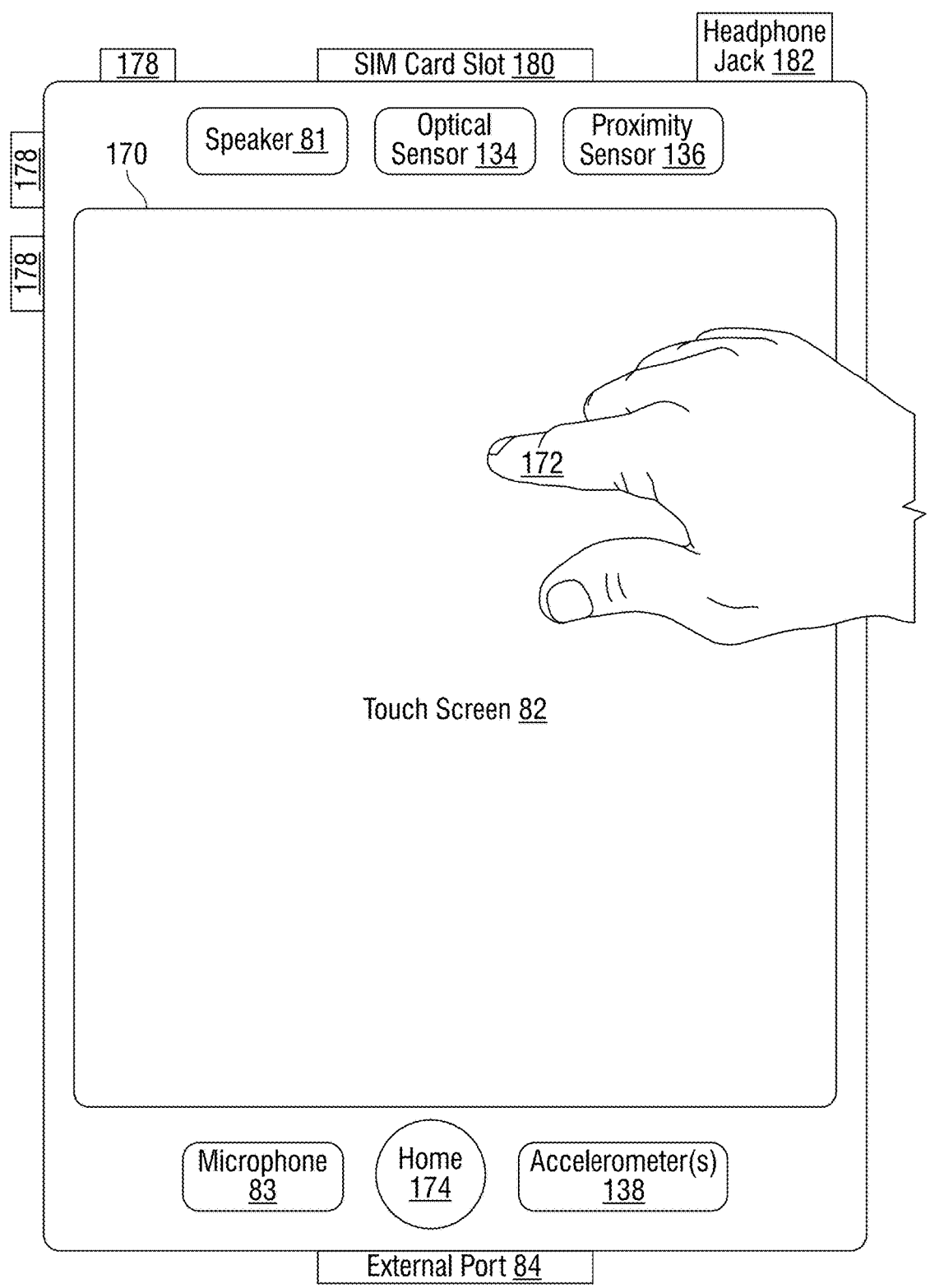
FIG. 6 illustrates a touchscreen and operating electrical and mechanical interfaces for a portable multifunction device that may support the functions and executable instructions of the presently disclosed subject matter.

FIGS. 5 and 6 are block diagrams illustrating portable multifunction device 40 with touch-sensitive displays 82 in accordance with some embodiments for the presently disclosed method and system for collecting, and globally communicating and evaluating digital images of public displays of affection from a large entertainment venue or gathering. Touch-sensitive display 82 is sometimes called a "touch screen" for convenience and may also be known as or called a touch-sensitive display system. Portable multifunction device 40 may include memory 62 (which may include one or more computer readable storage mediums), memory controller 92, one or more processing units (CPU's) 90, peripherals interface 88, RF circuitry 78, audio circuitry 80, speaker 81, microphone 83, input/output (I/O) subsystem 76, other input or control devices 76, and external port 94. Portable multifunction device 40 may include one or more optical sensors 134. These components may communicate over one or more communication buses or signal lines 73.

It should be appreciated that portable multifunction device 40 is only one example of an applicable device and that portable multifunction device 40 may have more or fewer components than shown, may combine two or more components, or a may have a different configuration or arrangement of the components. The various components shown in FIGS. 5 and 6 may be implemented in hardware, software or a combination of both hardware and software, including one or more signal processing and/or application specific integrated circuits.

Memory 72 may include high-speed random-access memory and may also include non-volatile memory, such as one or more magnetic disk storage devices, flash memory devices, or other non-volatile solid-state memory devices. Access to memory 72 by other components of portable multifunction device 40, such as the CPU 90 and peripherals interface 88, may be controlled by the memory controller 92.

Peripherals interface 88 couples the input and output peripherals of the device to the CPU 90 and memory 72. The one or more processors 90 run or execute various software programs and/or sets of instructions stored in memory 72 to perform various functions for portable multifunction device 40 and to process data.

In some embodiments, peripherals interface 88, CPU 90, and memory controller 92 may be implemented on a single chip, such as a chip 74. In some other embodiments, they may be implemented on separate chips.

RF (radio frequency) circuitry 78 receives and sends RF signals, also called electromagnetic signals. RF circuitry 78 converts electrical signals to/from electromagnetic signals and communicates with communications networks and other communications devices via the electromagnetic signals. RF circuitry 78 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth.

RF circuitry 78 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.16, IEEE 802.11g and/or IEEE 802.11n), voice over Internet Protocol (voip), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 80, speaker 81, and microphone 83 provide an audio interface between a user and portable multifunction device 40. Audio circuitry 80 receives audio data from peripherals interface 88, converts the audio data to an electrical signal, and transmits the electrical signal to speaker 81. Speaker 81 converts the electrical signal to human-audible sound waves. Audio circuitry 80 also receives electrical signals converted by microphone 83 from sound waves. Audio circuitry 80 converts the electrical signal to audio data and transmits the audio data to peripherals interface 88 for processing. Audio data may be retrieved from and/or transmitted to memory 72 and/or RF circuitry 78 by peripherals interface 88. In some embodiments, audio circuitry 80 also includes a headset jack. The headset jack provides an interface between audio circuitry 80 and removable audio input/output peripherals, such as output-only headphones or a headset with both output (e.g., a headphone for one or both ears) and input (e.g., a microphone).

I/O subsystem 76 couples input/output peripherals on portable multifunction device 40, such as touch screen 82 and other input/control devices 86, to peripherals interface 88. I/O subsystem 76 may include a display controller 76 and one or more input controllers 130 for other input or control devices. One or more input controllers 130 receive/send electrical signals from/to other input or control devices 86. Other input/control devices 86 may include physical buttons (e.g., push buttons, rocker buttons, etc.), dials, slider switches, joysticks, click wheels, and so forth. In some alternate embodiments, input controller(s) 130 may be coupled to any (or none) of the following: a keyboard, infrared port, USB port, and a pointer device such as a mouse. One or more buttons (e.g., 178, FIG. 6) may include an up/down button for volume control of speaker 81 and/or microphone 83. One or more buttons may include a home button (e.g., 54, FIG. 3). A quick press of the home button 54 may disengage a lock of touch screen 82 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby expressly incorporated by reference in its entirety. A longer press of the home button (e.g., 54) may turn power to portable multifunction device 40 on or off. The user may be able to customize a functionality of one or more of the buttons. Touch screen 82 is used to implement virtual or soft buttons and one or more soft keyboards.

Touch-sensitive touch screen 82 provides an input interface and an output interface between portable multifunction device 40v and a user. Display controller 126 receives and/or sends electrical signals from/to touch screen 82. Touch screen 82 displays visual output to the user. The visual output may include graphics, text, icons, video, and any combination thereof (collectively termed "graphics"). In some embodiments, some or all of the visual output may correspond to user-interface objects, further details of which are described below.

Touch screen 82 has a touch-sensitive surface, sensor or set of sensors that accepts input from the user based on haptic and/or tactile contact. Touch screen 82 and display controller 126 (along with any associated modules and/or sets of instructions in memory 72) detect contact (and any movement or breaking of the contact) on touch screen 82 and converts the detected contact into interaction with user-interface objects (e.g., one or more soft keys, icons, web pages or images) that are displayed on the touch screen. In an exemplary embodiment, a point of contact between a touch screen 82 and the user corresponds to a finger of the user.

Touch screen 82 may use LCD (liquid crystal display) technology, or LPD (light emitting polymer display) technology, although other display technologies may be used in other embodiments. Touch screen 82 and display controller 126 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 82.

A touch-sensitive display in some embodiments of touch screen 82 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen 82 displays visual output from portable multifunction device 40, whereas touch sensitive tablets do not provide visual output.

A touch-sensitive display in some embodiments of touch screen 82 may be as described in the following applications: (1) U.S. patent application Ser. No. 11/381,313, "Multipoint Touch Surface Controller," filed May 2, 2006; (2) U.S. patent application Ser. No. 6/840,862, "Multipoint Touchscreen," filed May 6, 2004; (3) U.S. patent application Ser. No. 6/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 82 may have a resolution in excess of 100 dpi. In an exemplary embodiment, the touch screen has a resolution of approximately 160 dpi. The user may make contact with touch screen 82 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, portable multifunction device 40 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 82 or an extension of the touch-sensitive surface formed by the touch screen.

Portable multifunction device 40 also includes a power system 132 for powering the various components. Power system 132 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Portable multifunction device 40 may also include one or more optical sensors 134. FIGS. 5 and 6 show optical sensor 134 coupled to optical sensor controller 128 in I/O subsystem 76. Optical sensor 134 may include charge-coupled device (CCD) or complementary metal-oxide semiconductor (CMOS) phototransistors. Optical sensor 134 receives light from the environment, projected through one or more lens, and converts the light to data representing an image. In conjunction with an imaging module 113 (also called a camera module), optical sensor 134 may capture still images or video. In some embodiments, optical sensor 134 is located on the back of portable multifunction device 40, opposite the touch screen 82 on the front of the device, so that the touch screen display may be used as a viewfinder for either still and/or video image acquisition.

In some embodiments, optical sensor 134 is located on the front of the device so that the user's image may be obtained for videoconferencing while the user views the other video conference participants on the touch screen display. In some embodiments, the position of optical sensor 134 can be changed by the user (e.g., by rotating the lens and the sensor in the device housing) so that a single optical sensor 134 may be used along with the touch screen display for both video conferencing and still and/or video image acquisition.

Portable multifunction device 40 may also include one or more proximity sensors 126. FIGS. 5 and 6 show a proximity sensor 136 coupled to peripherals interface 88. Alternately, proximity sensor 136 may be coupled to an input controller 130 in I/O subsystem 76. Proximity sensor 136 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, proximity sensor 136 turns off and disables touch screen 82 when multifunction device 40 is placed near the user's ear (e.g., when the user is making a phone call). In some embodiments, proximity sensor 136 keeps the screen off when the device is in the user's pocket, purse, or other dark area to prevent unnecessary battery drainage when the device is a locked state.

Portable multifunction device 40 may also include one or more accelerometers 138. FIGS. 5 and 6 show an accelerometer 138 coupled to peripherals interface 88. Alternately, accelerometer 138 may be coupled to an input controller 130 in I/O subsystem 76. Accelerometer 138 may perform as described in U.S. Patent Publication No. 20050190059, "Acceleration-based Theft Detection System for Portable Electronic Devices," and U.S. Patent Publication No. 20060017692, "Methods and Apparatuses for Operating A Portable Device Based on An Accelerometer," both of which are which are incorporated by reference in their entirety. In some embodiments, information is displayed on the touch screen display in a portrait view or a landscape view based on an analysis of data received from the one or more accelerometers.

In some embodiments, the software components stored in memory 72 may include an operating system 96, a communication module (or set of instructions) 88, a contact/motion module (or set of instructions) 90, a graphics module (or set of instructions) 92, a text input module (or set of instructions) 94, a Global Positioning System (GPS) module (or set of instructions) 105, and applications (or set of instructions) 106.

Operating system 96 (e.g., Darwin, RTXC, LINUX, UNIX, OS X, WINDOWS, or an embedded operating system such as vxworks) includes various software components and/or drivers for controlling and managing general system tasks (e.g., memory management, storage device control, power management, etc.) And facilitates communication between various hardware and software components.

Communication module 98 facilitates communication with other devices over one or more external ports 94 and also includes various software components for handling data received by RF circuitry 78 and/or external port 94. External port 94 (e.g., Universal Serial Bus (USB), FIREWIRE, etc.) Is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on ipod (trademark of Apple Computer, Inc.) Devices.

Contact/motion module 100 may detect contact with touch screen 82 (in conjunction with display controller 126) and other touch sensitive devices (e.g., a touchpad or physical click wheel). Contact/motion module 100 includes various software components for performing various operations related to detection of contact, such as determining if contact has occurred, determining if there is movement of the contact and tracking the movement across touch screen 82, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/"multiple finger" contacts). In some embodiments, the contact/motion module 100 and display controller 126 also detects contact on a touchpad. In some embodiments, contact/motion module 190 and controller 130 detects contact on a click wheel.

Graphics module 102 includes various known software components for rendering and displaying graphics on touch screen 82, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement and informs the user of an action that has been performed (such as moving an email message to a folder). In this context, a respective animation that confirms an action by the user of the device typically takes a predefined, finite amount of time, such as an amount of time between 0.2 and 1.0 seconds, or between 0.5 and 2.0 seconds, depending on the context.

Text input module 104, which may be a component of graphics module 92, provides soft keyboards for entering text in various applications (e.g., contacts 107, e-mail 110, IM 111, blogging 112, browser 117, and any other application that needs text input).

GPS module 105 determines the location of the device and provides this information for use in various applications (e.g., to telephone 108 for use in location-based dialing, to camera 113 and/or blogger 112 as picture/video metadata, and to applications that provide location-based services such as weather widgets, local yellow page widgets, and map/navigation widgets).

The applications 106 may include the following modules (or sets of instructions), or a subset or superset thereof:

A contacts module 107 (sometimes called an address book or contact list);
A telephone module 108;
A video conferencing module 109;
An e-mail client module 110;
An instant messaging (IM) module 111;
A blogging module 112;
A camera module 113 for still and/or video images;

An image management module 114;

A video player module 115;

A music player module 116;

A browser module 117;

A calendar module 118;

Widget modules 119, which may include weather widget 119-1, stocks widget 119-2, calculator widget 119-3, alarm clock widget 119-4, dictionary widget 119-5, and other widgets obtained by the user, as well as user-created widgets 119-6;

Widget creator module 120 for making user-created widgets 119-6;

Search module 121;

Video and music player module 122, which merges video player module 115 and music player module 116;

Notes module 123; and/or

Map module 124.

Examples of other applications 106 that may be stored in memory 72 include other word processing applications, JAVA-enabled applications, encryption, digital rights management, voice recognition, and voice replication.

In conjunction with touch screen 82, display controller 126, contact module 100, graphics module 92, and text input module 104, contacts module 107 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 108, video conference 109, e-mail 110, or IM 111; and so forth. Embodiments of user interfaces and associated processes using contacts module 137 are described further below.

In conjunction with RF circuitry 78, audio circuitry 80, speaker 81, microphone 83, touch screen 82, display controller 126, contact module 100, graphics module 92, and text input module 104, telephone module 108 may be used to enter a sequence of characters corresponding to a telephone number, access one or more telephone numbers in address book 107, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 108 are described further below.

In conjunction with RF circuitry 78, audio circuitry 80, speaker 81, microphone 83, touch screen 82, display controller 126, optical sensor 134, optical sensor controller 128, contact module 100, graphics module 92, text input module 104, contact list 107, and telephone module 108, videoconferencing module 109 may be used to initiate, conduct, and terminate a video conference between a user and one or more other participants.

In conjunction with RF circuitry 78, touch screen 82, display controller 126, contact module 100, graphics module 92, and text input module 104, e-mail client module 110 may be used to create, send, receive, and manage e-mail. In conjunction with image management module 114, e-mail module 110 makes it very easy to create and send e-mails with still or video images taken with camera module 113. Embodiments of user interfaces and associated processes using e-mail module 110 are described further below.

In conjunction with RF circuitry 78, touch screen 82, display controller 126, contact module 100, graphics module 92, and text input module 104, instant messaging module 111 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 111 are described further below.

In conjunction with RF circuitry 78, touch screen 82, display controller 126, contact module 100, graphics module 92, text input module 104, image management module 114, and browsing module 117, blogging module 112 may be used to send text, still images, video, and/or other graphics to a blog (e.g., the user's blog).

In conjunction with touch screen 82, display controller 126, optical sensor(s) 134, optical sensor controller 128, contact module 100, graphics module 92, and image management module 114, camera module 113 may be used to capture still images or video (including a video stream) and store them into memory 72, modify characteristics of a still image or video, or delete a still image or video from memory 72. Embodiments of user interfaces and associated processes using camera module 113 are described further below.

In conjunction with touch screen 82, display controller 126, contact module 100, graphics module 92, text input module 104, and camera module 113, image management module 114 may be used to arrange, modify or otherwise manipulate, label, delete, present (e.g., in a digital slide show or album), and store still and/or video images. Embodiments of user interfaces and associated processes using image management module 114 are described further below.

In conjunction with touch screen 82, display controller 126, contact module 100, graphics module 92, audio circuitry 80, and speaker 81, video player module 115 may be used to display, present or otherwise play back videos (e.g., on the touch screen or on an external, connected display via external port 94). Embodiments of user interfaces and associated processes using video player module 115 are described further below.

In conjunction with touch screen 82, display system controller 126, contact module 100, graphics module 92, audio circuitry 80, speaker 81, RF circuitry 78, and browser module 117, music player module 116 allows the user to download and play back recorded music and other sound files stored in one or more file formats, such as MP3 or AAC files. In some embodiments, portable multifunction device 40 may include the functionality of an MP3 player, such as an ipod (trademark of Apple Computer, Inc.). Embodiments of user interfaces and associated processes using music player module 146 are described further below.

In conjunction with RF circuitry 78, touch screen 82, display system controller 126, contact module 100, graphics module 92, and text input module 104, the browser module 117 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 78, touch screen 82, display system controller 126, contact module 100, graphics module 92, text input module 104, e-mail module 110, and browser module 117, calendar module 118 may be used to create, display, modify, and store calendars and data associated with calendars (e.g., calendar entries, to do lists, etc.). Embodiments of user interfaces and associated processes using calendar module 118 are described further below.

In conjunction with RF circuitry 78, touch screen 82, display system controller 126, contact module 100, graphics module 92, text input module 104, and browser module 117, the widget modules 119 are mini-applications that may be downloaded and used by a user (e.g., weather widget 119-1, stocks widget 119-2, calculator widget 119-3, alarm clock widget 119-4, and dictionary widget 119-5) or created by the user (e.g., user-created widget 119-6). In some embodiments, a widget includes an HTML (Hypertext Markup Language) file, a CSS (Cascading Style Sheets) file, and a javascript file. In some embodiments, a widget includes an XML (Extensible Markup Language) file and a javascript file (e.g., Yahoo! Widgets).

In conjunction with RF circuitry 78, touch screen 82, display system controller 126, contact module 100, graphics module 92, text input module 104, and browser module 147, widget creator module 150 may be used by a user to create widgets (e.g., turning a user-specified portion of a web page into a widget).

In conjunction with touch screen 82, display system controller 126, contact module 100, graphics module 92, and text input module 104, search module 151 may be used to search for text, music, sound, image, video, and/or other files in memory 72 that match one or more search criteria (e.g., one or more user-specified search terms).

In conjunction with touch screen 82, display controller 126, contact module 100, graphics module 92, and text input module 104, notes module 153 may be used to create and manage notes, to do lists, and the like.

In conjunction with RF circuitry 78, touch screen 82, display system controller 126, contact module 100, graphics module 92, text input module 104, GPS module 135, and browser module 147, map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 6). In some embodiments, memory 72 may store a subset of the modules and data structures identified above. Furthermore, memory 72 may store additional modules and data structures not described above.

In some embodiments, portable multifunction device 40 is a device where operation of a predefined set of functions on the device is performed exclusively through a touch screen 82 and/or a touchpad. By using a touch screen and/or a touchpad as the primary input/control device for operation of portable multifunction device 40, the number of physical input/control devices (such as push buttons, dials, and the like) on portable multifunction device 40 may be reduced.

The predefined set of functions that may be performed exclusively through a touch screen and/or a touchpad include navigation between user interfaces. In some embodiments, the touchpad, when touched by the user, navigates portable multifunction device 40 to a main, home, or root menu from any user interface that may be displayed on portable multifunction device 40. In such embodiments, the touchpad may be referred to as a "menu button." In some other embodiments, the menu button may be a physical push button or other physical input/control device instead of a touchpad.

FIG. 6 illustrates a portable multifunction device 40 having a touch screen 82 in accordance with some embodiments. The touch screen may display one or more graphics within user interface (UI). In this embodiment, as well as others described below, a user may select one or more of the graphics by making contact or touching the graphics, for example, with one or more fingers 172 (not drawn to scale in FIG. 6). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with portable multifunction device 40. In some embodiments, inadvertent contact with a graphic may not select the graphic. For example, a swipe gesture that sweeps over an application icon may not select the corresponding application when the gesture corresponding to selection is a tap.

Portable multifunction device 40 may also include one or more physical buttons, such as "home" or menu button 174. As described previously, menu button 174 may be used to navigate to any application 106 in a set of applications that may be executed on portable multifunction device 40. Alternatively, in some embodiments, menu button 174 is implemented as a soft key in a GUI in touch screen 82.

In one embodiment, portable multifunction device 40 includes a touch screen 82, a menu button 174, a home button 176 for powering the device on/off and locking the device, volume adjustment button(s) 178, a Subscriber Identity Module (SIM) card slot 180, a head set jack 182, and a docking/charging external port 84. Home button 176 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, portable multifunction device 40 also may accept verbal input for activation or deactivation of some functions through microphone 83.

Figure 7:
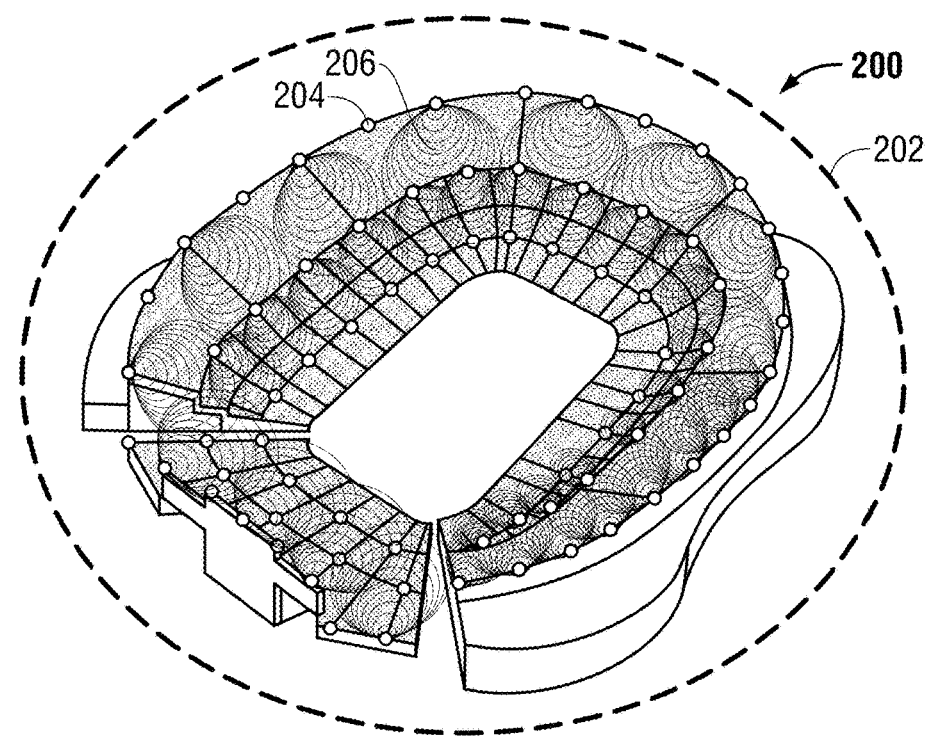
FIG. 7 illustrates a sports or entertainment venue capable of wirelessly communicating with a portable multifunction device as may be applicable to the subject matter of the present disclosure.

FIG. 7 illustrates a sports or entertainment venue 200 capable of wirelessly communicating with a portable multifunction device 40 as may be applicable to the subject matter of the present disclosure. Arena venue 200, includes a geofence 202 for controlling KissCam® app 46 communications within arena venue 200. Not only may geofence 202 apply to arena venue 10, as FIG. 7 depicts, but also geofence 202 may serve venues such as large churches, outdoor gatherings and other locations where the presently disclosed combination of a large television screen 20 (FIG. 1) and personal or participant use of portable multifunction device 40 may be possible.

In FIG. 7, geofence 202 provides a highly valuable and attractive format for use of the subject matter of the present disclosure. In particular, there are numerous wireless communication nodes 204 capable of communicating across arena venue 200, as WiFi communication waves 206 indicate. By virtue of the communication nodes 204 and their wireless transmissions 206, essentially all venue participant equipped with portable multifunction devices 40 may participate in the method and system of the present disclosure.

Arena venue 200 may include thousands of access 204 and hundreds of miles of networking cable installed in a large and complex building footprint. The technology infrastructure layer comprises the full set of physical hardware, networking equipment, and operational software that serves as the venue's foundation.

In the wireless and electronics layers of arena venue 200 are resources capable of supporting all of the desired functions of the KissCam® app 46 of the present disclosure. By engaging these resources with the operations of the presently disclosed subject matter strong technological capabilities and options arise. These technical resources include Wi-Fi access points and distributed antenna systems to provide fans connectivity on their mobile devices. Arena venue 200 also includes networked hardware/beacon technology to enable location-based service to fans and stadium operations staff with connected, immersive display hardware that can turn all parts of the arena into interactive screens. Moreover, venue-wide enterprise resource planning systems allow arena staff and management to integrate in-stadium functions like operation/facilities, retail point of sale, customer service, ticketing, and social media. As will be explained below, systems integration solutions that enable stadium technology to integrate with its surrounding environment, including broadcast systems, nearby retail/dining, and municipal transit systems.

While a strong technology foundation is critical to providing the fan service that is expected in modern stadiums, the potential for transformative value creation lies in opening up the stadium to allow fans and other partners to build on top of the technology and sport infrastructure of the stadium. Moving up the stack, enabling technologies include the tools, protocols, and data that teams, and venues provide to fans, partners, and sponsors to access the core infrastructure.

Technological features involved with the KissCam® functions here disclosed include application programming interfaces (API's) that allow developers to build apps and other solutions using stadium information, such as contest/event schedules, seating maps, amenity locations, and ticket prices. Identity management tools to give each fan a unified credential for use in every transaction and touchpoint including arena entry as well as the purchase of tickets, concessions, and merchandise. The arena venue 200 audio and video feeds that capture fan-created content for integration into social media, in-stadium promotions, and contest broadcast. Especially applicable to the KissCam® contest are social listening/analytics solutions that give teams and venues the immediate "voice of the fan" regarding the stadium experience and any operational problems that may arise, for immediate resolution Geofencing 202 establishes a virtual boundary in a radius around arena venue 200. Depending on how geofence 202 is configured it can prompt mobile push notifications, trigger text messages or alerts, send targeted advertisements on social media, allow tracking on vehicle fleets, disable certain technology or deliver location-based marketing data. Geofence 202 provides a location-based service in which the KissCam® app may use GPS, RFID, Wi-Fi or cellular data to trigger a pre-programmed action when a portable multifunction device 40 exits geofence 202. The parameters controlling geofence 202 may be defined within the code of the KissCam® app 46, especially since users need to opt-in to location services for geofence 202 to work. All of this functionality is available to participants who download the KissCam® app at arena venue 200.

Geofence 202 facilitates participant engagement and makes the event considerable more interesting and fun as the participants play the KissCam® contest.

Figure 8:
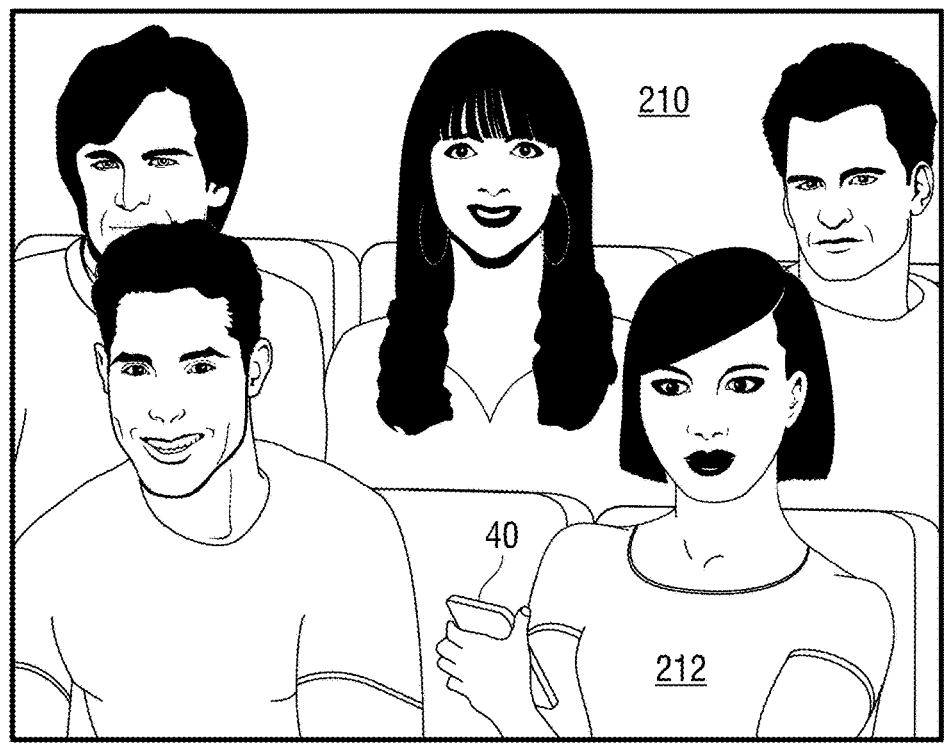
FIG. 8 depicts a participant in a sports or entertainment venue with a portable multifunction device capable of transmission into the system of the present disclosure.

FIG. 8 depicts a participant in a sports or entertainment venue 200 with a portable multifunction device 40 capable of transmission into the system of the present disclosure. In particular, FIG. 8 illustrates that in seat region 210 of a portion of the arena venue 10, a participant 212 may use portable multifunction device 40 to capture a screen display, such as display 50 of FIG. 4. By virtue of capturing screen display 50, participant 182 becomes a member in a large group of participants for the method and system of the present disclosure.

Figure 9:
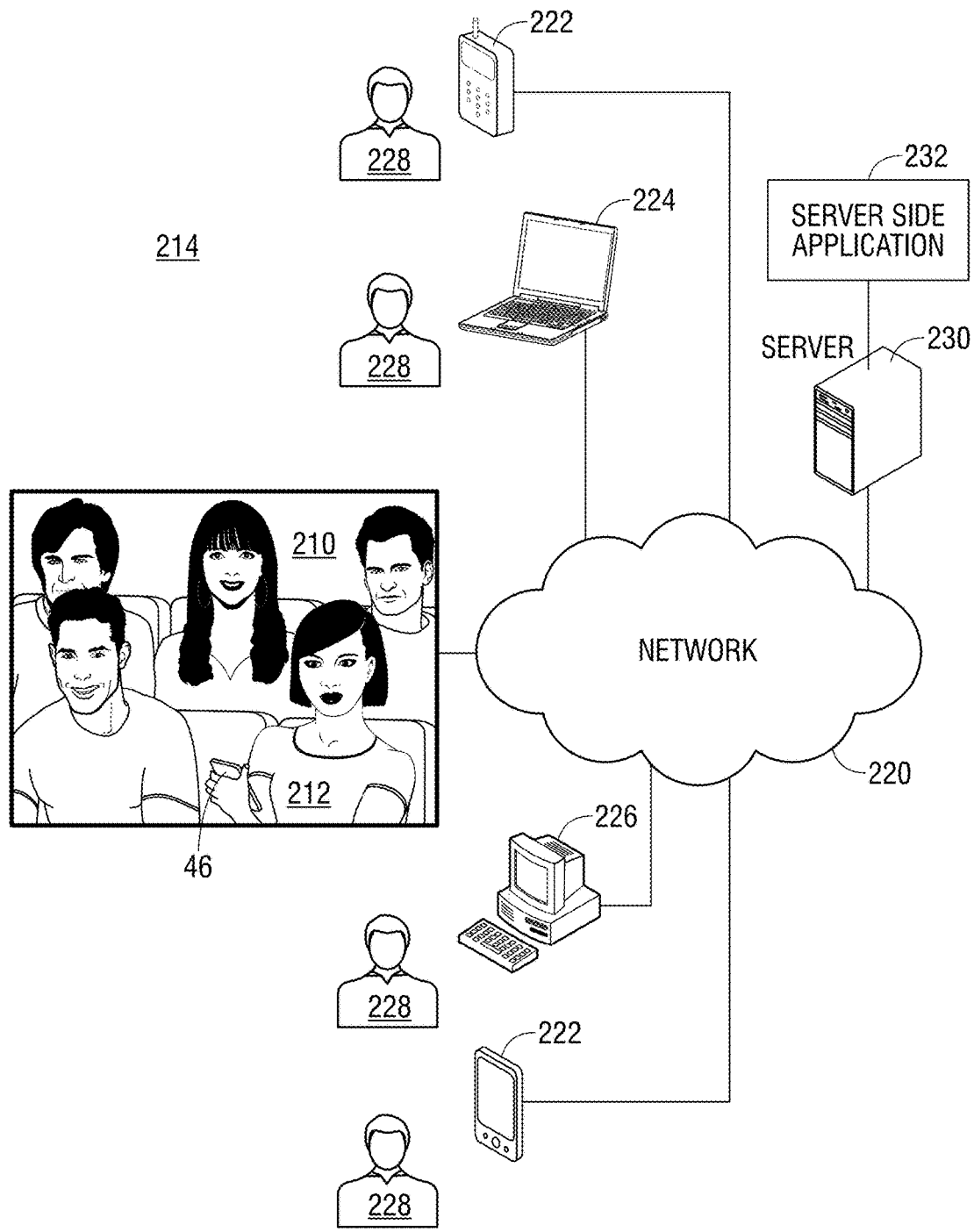
FIG. 9 depicts a client-side configuration of the presently disclosed subject matter.

FIG. 9 depicts a client-side configuration of the presently disclosed subject matter. FIG. 9 illustrates the client site componentry of the present disclosure. With reference to FIG. 9, client-side configuration 214 includes network 220. Network 220 may receive input from cellular phones 222 to receive communication from cell phone users, as well as input from laptop computers 224 and desktop computers 226 may permit users 228 to access client-side functions of the present disclosure. Of course, most important for the participants 212 in the disclosed method and system are venue participants 210 who are playing and exchanging data from client-side system configuration 214. Network 220 provides communication and processing to server 230 for accessing the server-side functions.

A server-based application residing on the server 230 may communicate with the client-side application of KissCam® contest via network 220 and portable multifunction devices 40. The KissCam® client-side app may be in communication with one or more additional client-side applications depending on rules, permissions and connections held by and established through the business logic operating on through server 230 and associated computing resources on server-side application 232.

Server-side application 230 includes the logical modules, databases and user interface components of the KissCam® contest software application that is installed on a network connected server. In a preferred embodiment, there may be two or more groupings of system components, databases, process modules and user interfaces. The more generic system components, databases, process modules and administrative interfaces which are part of the core system and not linked to a specific disease are considered core components.

The KissCam® contest participant operates on the client side of the disclosed computer architecture. Within the system of the present invention, the role of the user is to record the digital still and video images for communicating to the server-side architecture. This includes recording the images, provide feedback to other users regarding participation in the KissCam® contest, as well as to enjoy the KissCam® contest with others at the arena venue 200.

Figure 10:
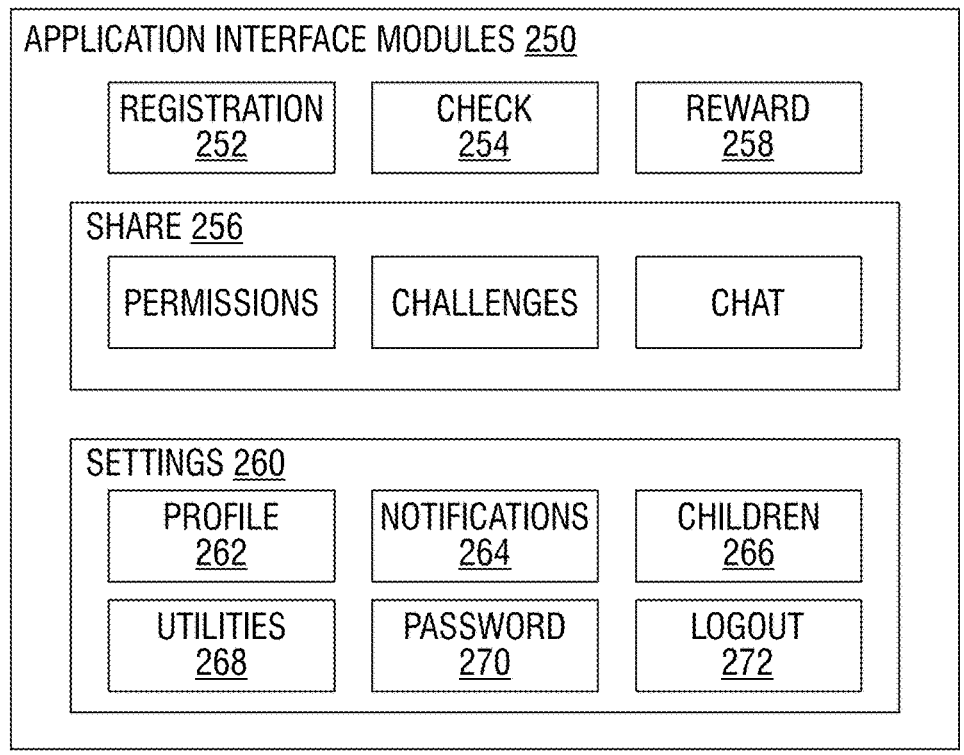
FIG. 10 portrays the application interface modules applicable to the subject matter of the client-side application interface modules of the presently disclosed subject matter.

The left side of FIG. 10 depicts the high-level architecture of the client-side application. A schematic block diagram is presented showing an embodiment of the client-side application of the present invention. The various functional process modules of client-side application include 1) Check, 2) Share, 3) Reward and 4) Settings which are mirrored within the main menu of the client-side application. Although there are various functionalities defined within each module, each module description is provided as an overview of the navigational aspects of the application.

In a preferable embodiment, the server-side application resides at the server and the client-side application is a mobile application residing in local memory on portable multifunction device 40 (such as an iPhone, Blackberry, or other "smart phone"). In some instances, the mobile application may have been downloaded to the mobile client device from the server. The mobile application on the client device may communicate with server-side application on the server. In some instances, the client-side application may primarily function as a standalone application but may communicate with the server-side application in particular situations. Any communications may occur between the server-side application and the client-side application over a network (such as the Internet), via wired connection or wirelessly.

The client-side application may share data with the server-side application or another application. For example, the client-side application and the server-side application may access the same data. In some instances, the data may be stored in one or more databases. The data may be stored locally with the server-side application, locally with the client-side application, or may be stored at another system or memory (e.g. A server or client device). The data may or may not be divided and stored on different memories.

Data may be stored on a plurality of databases. These databases may be stored anywhere. For example, they may be stored on the same system or on different systems. In one embodiment, the server-side application may be configured to have access to all or most of the data in the databases. The client-side application may access data in the same set of databases. In some instances, the client-side application may access less data than is accessed by the server-side application.

In any of these situations, the server-side application and the client-side application may be stored on the same system or on different systems. Similarly, the databases may be stored on the same system or different systems. In some embodiments, the databases may belong to a single organization or may be shared by multiple organizations. Any components that may be stored on different systems may communicate with one another over a network, including but not limited to a wireless communications network, the Internet, a local area network. In one example, a data management software program may be stored on a server and may be accessed by a client device, mobile device (such as an iPhone), or any other type of device. A mobile application may reside on an iPhone, "smart phone", cellular phone, PDA, or any other type of device and the databases may be stored on one or more server.

Any form of interaction across one or more systems may be provided, including communication between various applications and/or sharing of data.

The client-side application may be created by any technique known in the art. In a preferred embodiment, the client-side application is created to be compatible with a particular device. For example, the client-side application may be an iPhone application configured to operate on an iPhone device. Thus, the client-side application may operate in an iPhone environment. In some implementations, the client-side application may be a gadget operable to run in an existing environment.

The data provided in the client-side application may be available via a web service to a dedicated secure socket for the client-side application for retrieval and refreshing of data. The client-side application may establish an SSL connection (or some other type of secure connection) which may require the user to enter an ID and password.

In some embodiments, the server-side application may be protected in the application server and made available to another web server hosted by a wireless communication provider (e.g. AT&T, Verizon etc.). Similarly, the client-side application may or may not be available directly to the public.

FIG. 10 portrays the application interface modules applicable to the subject matter of the client-side application interface modules of the presently disclosed subject matter. FIG. 10 is a block diagram showing the various user interface modules of the client-side application. Those modules include registration 252, check 254, share 256, reward 258 and settings 260. Within settings module 260 are sub-modules pertaining to specific administrative functions including setting a profile 262, notifications 264, children 266, utilities 268, password 270 and logout 272 functions. Theses functions are understood by those skilled in the architecture of client-server systems capable of performing the functions and providing the benefits herein described.

Figure 11:
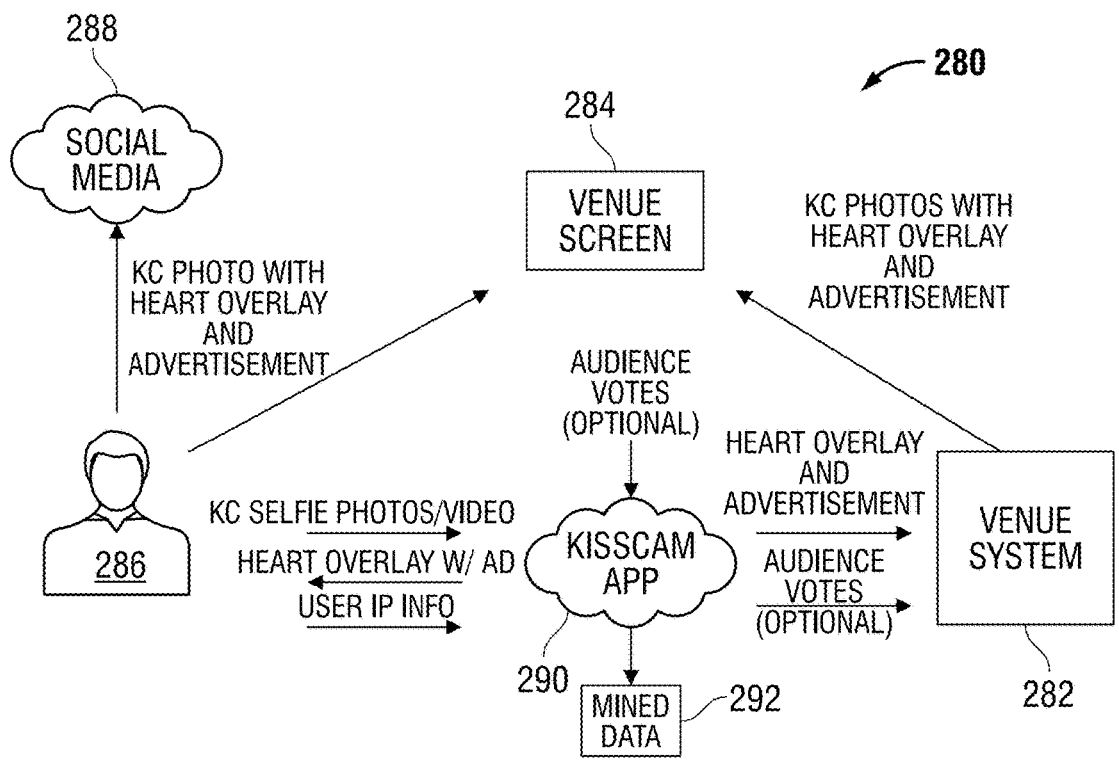
FIG. 11 shows an overall diagram of the functions and benefits of the presently disclosed subject matter.

FIG. 11 provides a flowchart 280 of the functions and features within the scope of the present disclosure. Considering FIG. 11, venue system 282 provides a client-server architecture for communicating the affection-demonstrating digital imagery of the presently disclosure. From venue system 282 come digital images, including overlays, such as frame artwork overlay 34 (FIG. 2) and advertisements that may be communicated to bring venue system 282 to a large television screen 284, of an arena venue 200, as discussed in FIGS. 1 and 7, above. Also, participant 286 has the ability to perceive the content on the venue screen 284, as well as communicate the contact via social media platforms 288. From KissCam® participant 286 selfie photographs and videos and the KissCam® frame 34 (FIG. 2) to come back together with an appropriate advertisement for dissemination of the imagery associated with the affection-demonstrating digital images all through the KissCam® app 290.

Participant 286 has the ability to communicate affection-demonstrating photos and videos to the application interface of the present disclosure. In addition, participant 286 provides user information relevant to his participation in the presently just closest. The affection-demonstrating digital imaging system may be materially enhanced through overlay images from KissCam® application 290. Moreover, from KissCam® application 290, audience votes from around the globe maybe received and processed.

As FIG. 11 further provides, KissCam® application 290 provides heart overlay and advertisement content back to venue system 282, as well as audience votes. Venue system 282 is designed to extract greatest commercial and entertainment value from the content created through the method and system here disclosed. Moreover, KissCam® application 290, provides the ability to mine data 292 for both commercial and demographic information.

In essence, therefore, the KissCam® contest method and system integrate a global communications platform allowing a sponsor to display an advertisement accompanied by a contest invitation in association with a spectator event. The method and system make available a network, including data transmission and storage mechanisms, for contest contestants located within an electronically geofenced perimeter of a spectator event. These geofenced participants may electronically submit affection-demonstrating digital images for contest participation. The affection-demonstrating digital images may include at least one still image selected from a personal photograph, a family photograph, and/or a pet photograph portraying demonstrations of kissing, hugging, or otherwise conveying personal affection between at least two individuals or pets. A plurality of spectators at the event may become contest participants and enter the contest. In so doing, the participant may generate a digital image using a camera, a cellular phone with a built-in camera, a scanner, or a kiosk and electronically submit the affection-demonstrating digital images representing demonstrations of kissing, hugging, or otherwise conveying personal affection between at least two individuals or pets, as well as participant information, to the contest network, for contest participation. The digital images may be electronically submitted using an MMS message or an internet connection. Once submitted the digital images may be stored on contest servers. The contest further involves selecting a subset of the affection-demonstrating digital images from spectators located within the electronically geofenced perimeter as candidates for entry into a voting stage of the contest.

The KissCam® contest further involves broadcasting the selected subset of affection-demonstrating digital images to a global of community of spectators. The members of the global community of spectators may be both located at the spectator event, as well as be watching the spectator event via a media outlet. The contest invites all spectators of the spectator event to vote for at least one of the affection-demonstrating digital images from the selected subset of the affection-demonstrating digital images and communicate the vote to a contest server controlling the contest operations.

The KissCam® contest further includes electronically receives and tallies the votes from all spectators within a predetermined time limit and prior to the end of the spectator event. Electronically encrypting the affection-demonstrating digital images and contestant information also occurs for the contest. This includes using software provided on a contest participants' computer or mobile devices or upon receipt of the affection-demonstrating digital images by a server of the contest provider. This information may form a plurality of information capsules comprising a plurality of affection-demonstrating digital images, each of the affection-demonstrating digital images corresponding to an individual entrant of the contest. The contest further includes entering the plurality of affection-demonstrating digital images into an electronic batch of a plurality of affection-demonstrating digital image entrants.

The KissCam® contest further involves selecting a subset of affection-demonstrating digital images from the electronic batch of affection-demonstrating digital images and designating the selected affection-demonstrating digital images as one or more winning entries of the contest according to the selected affection-demonstrating digital image having received the most votes from all spectators both within the geofenced spectator event perimeter and outside the geofenced spectator event perimeter. The contest further decrypts the digital image and contestant information and identifies a single winner of the contest by using the digital image and contestant information. Because winning affection-demonstrating digital images are identified electronically by submitting the digital images via an MMS message or Internet connection, new digital images may be initiated and completed in compressed time periods associated with the duration for the spectator event.

An important aspect of the present disclosure includes incorporating KissCam® as an app that provides framed event photo for uploading on social media, which shows that the person was present at the event. The difference between the existing KissCam® application or system and the subject matter of the present disclosure includes the ability to capture images from venue participants and make those images accessible to the entire global community of individuals who have the KissCam® app installed on their portable multifunction device. Then, during the entertainment or sports event at the particular venue, the holder of the portable multifunction device can determine which digital images they prefer.

Based on this preference, they may vote and send that vote back to the sports venue or entertainment venue. Then, based on the accumulated results of votes from those at the venue watching the particular sports or entertainment event, as well as the votes of individuals not at the venue, are added and compared. From this comparison a winner of the selected images is chosen, and that winner receives an appropriate reward. This is a fundamentally different process and system that integrates an entire global communications network to achieve satellite communications, control of voting processes, as well as communications both within the geofenced participant area. The method and system of the present disclosure provide the KissCam® to the world community as a whole, all occurring in real time. In essence, the present disclosure, allows everyone worldwide to participate in KissCam® contest events.

Another aspect of the present disclosure includes allowing winners to be chosen instantly and shown on the large television monitors at the arena venue or large gathering. For example, after 10 to 15 minutes following the receipt of worldwide votes, the method and system present to the venue participants and the world alike the voting results. Following the voting, winners are identified and posted on Facebook, youtube, Instagram or other social media.

Figure 12A:
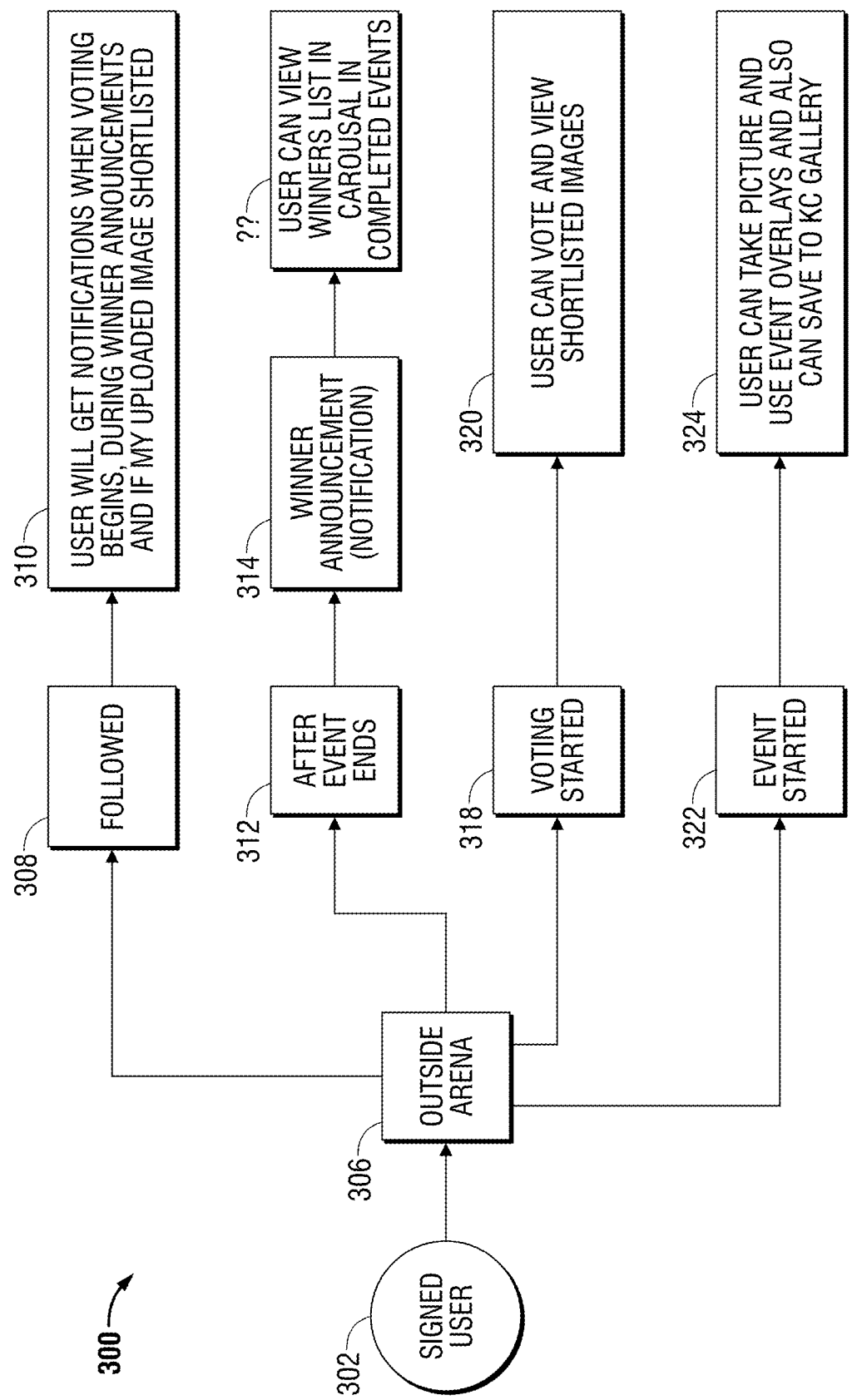
FIG. 12A through 12C illustrate a flow chart of the signed user and unsigned user functions for participants of the presently disclosed subject matter.

FIG. 12A provides flowchart 300 for showing the functions of the presently disclosure for capturing communicating affection-demonstrating videos from a large gathering to global community. The differentiator between a signed user 302 (FIGS. 12A and 12B) or an unsigned user 304 (FIG. 12C) begins the determination of the steps that the president subject matter performance. If particular, with reference to FIG. 12A if the participant is a signed user 302 process flow at 306 depends upon whether inside or outside geofence 202. This determines the functions that the user can perform. So, outside arena determination 306 determines that the user may be followed by step 308. If so, process confirm flow goes to step 310 where the participant will get notifications when voting begins, during winner announcements, and if my upload image from this user is shortlisted.

System of the present disclosure further determines whether the event has ended at step 312. If so, a winner announcement occurs at step 314 and the user can view winners and a listing carousel for the completed events, at step 316. If voting has started, at step 318 the process flow allows the a vote to occur for selecting a winner from a shortlisted set of images at step 320.

Process 300 further test at 322 if the event has started. If so then, the user can take a picture and use the event overlays and also save the picture to the KissCam® photo gallery for use in selection of the winner for the KissCam® contest. This occurs at at step 322.

Figure 12B:
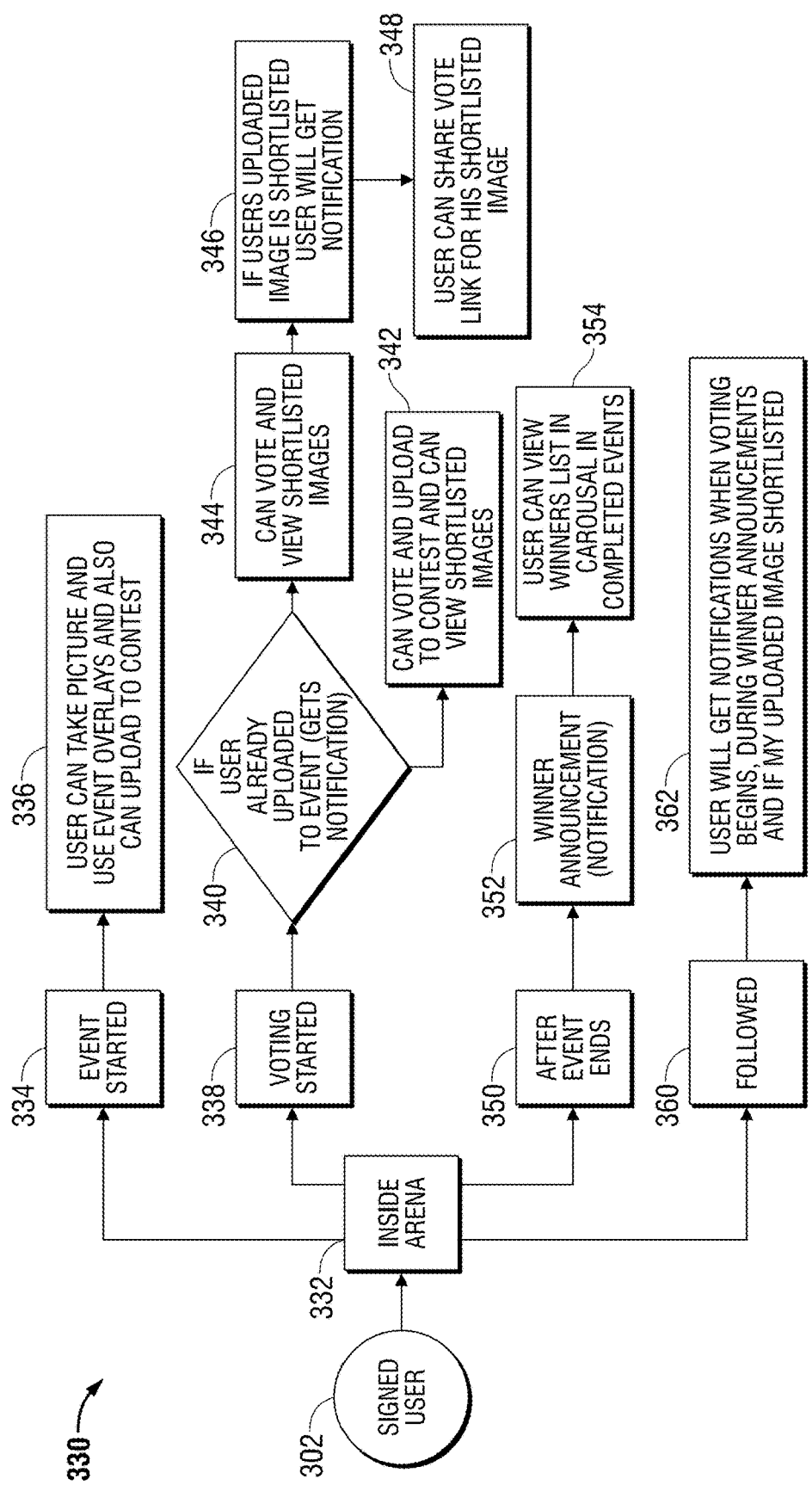

FIG. 12B shows for diagram 330 playing the signed user 302 inside the arena or large gathering 332. Control depends on whether the event has started, as tested at step 334. Here, the user can take a picture and use the event overlays and also upload photos and videos to the contest at step 336. If voting has started, as step 338 tests, process 330 further tests, at query 340, if the user has not already uploaded to the event. If not, the user can vote and upload to the contest and can view shortlisted images, at step 342. At step 344, the user may vote and view shortlisted images. Then, at step 346, if the users uploaded images is shortlisted, the user will get a notification of such. Further, at step 348 the user can share a vote link to others of his shortlisted image to encourage a voting.

After the event ends, step 350 becomes effective to provide a winner announcement at step 352. Step 354 further enables the winner to view the winners list of in photo carousel of photographs or digital images in various completed events. At step 360 process flow 330 applies when the user is followed. Then, the user will get notification when voting begins, during winter announcements and if his uploaded image is shortlisted step 352.

Figure 12C:
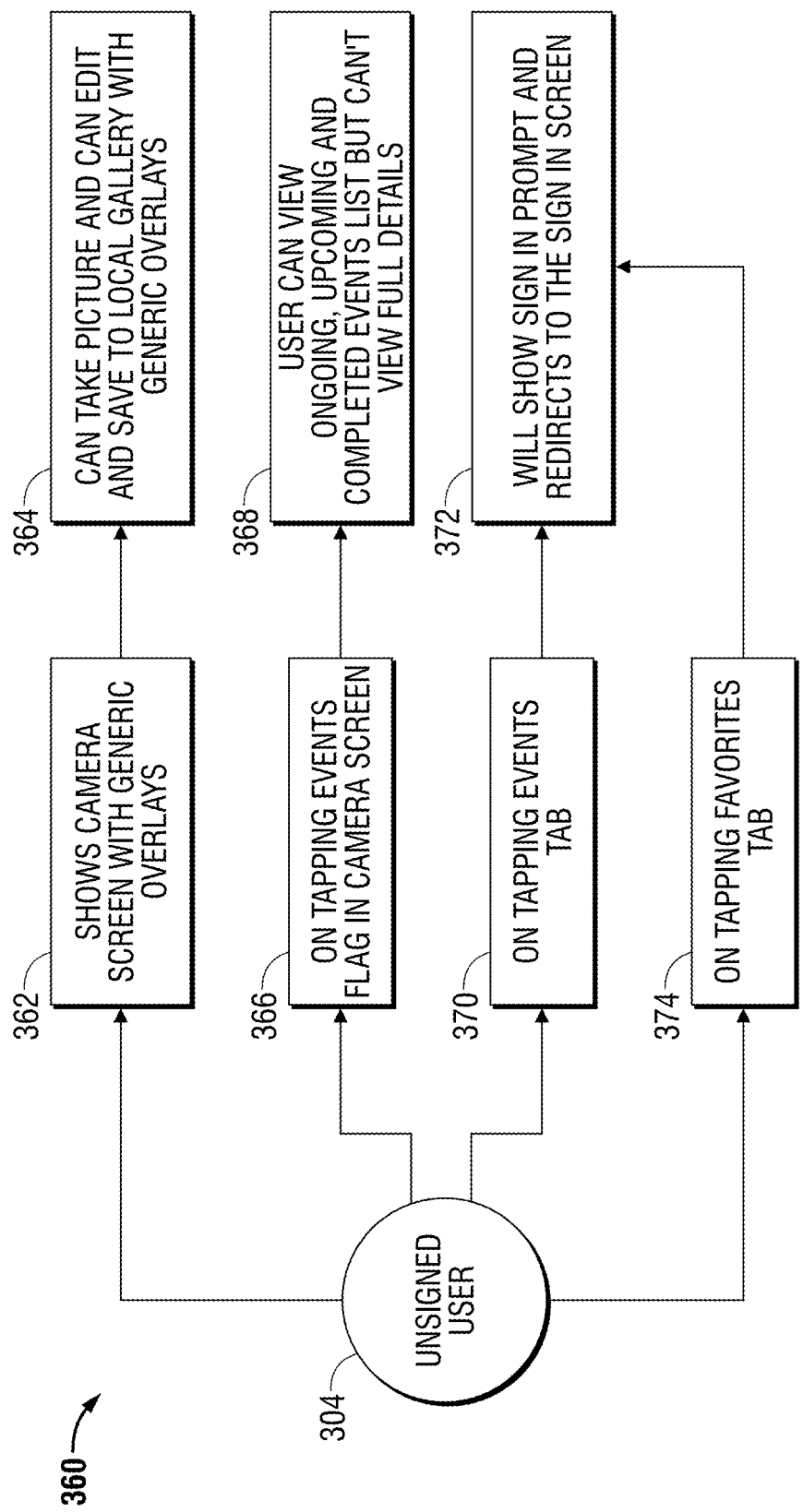

FIG. 12C provides process flow 360 addressing the situation of the unsigned user 304. From step 362, the present method and system show a camera screen generic overlays. At step 364, the user can take a picture and can edit and save it to a local gallery with generic overlays. At step 366, the present method and system operates such that on tapping the events flag in the KissCam® camera screen, process flow goes to step 368 at which the user can view on going, upcoming, and completed events list, but cannot view full details. When the user taps the events tab at step 370, the method will show, at step 372, a sign-in prompt and redirect flow to the sign-in screen. Then, upon tapping a favorites tab, at step 374, process flow may also go to step 372, as referenced.

Figure 13:
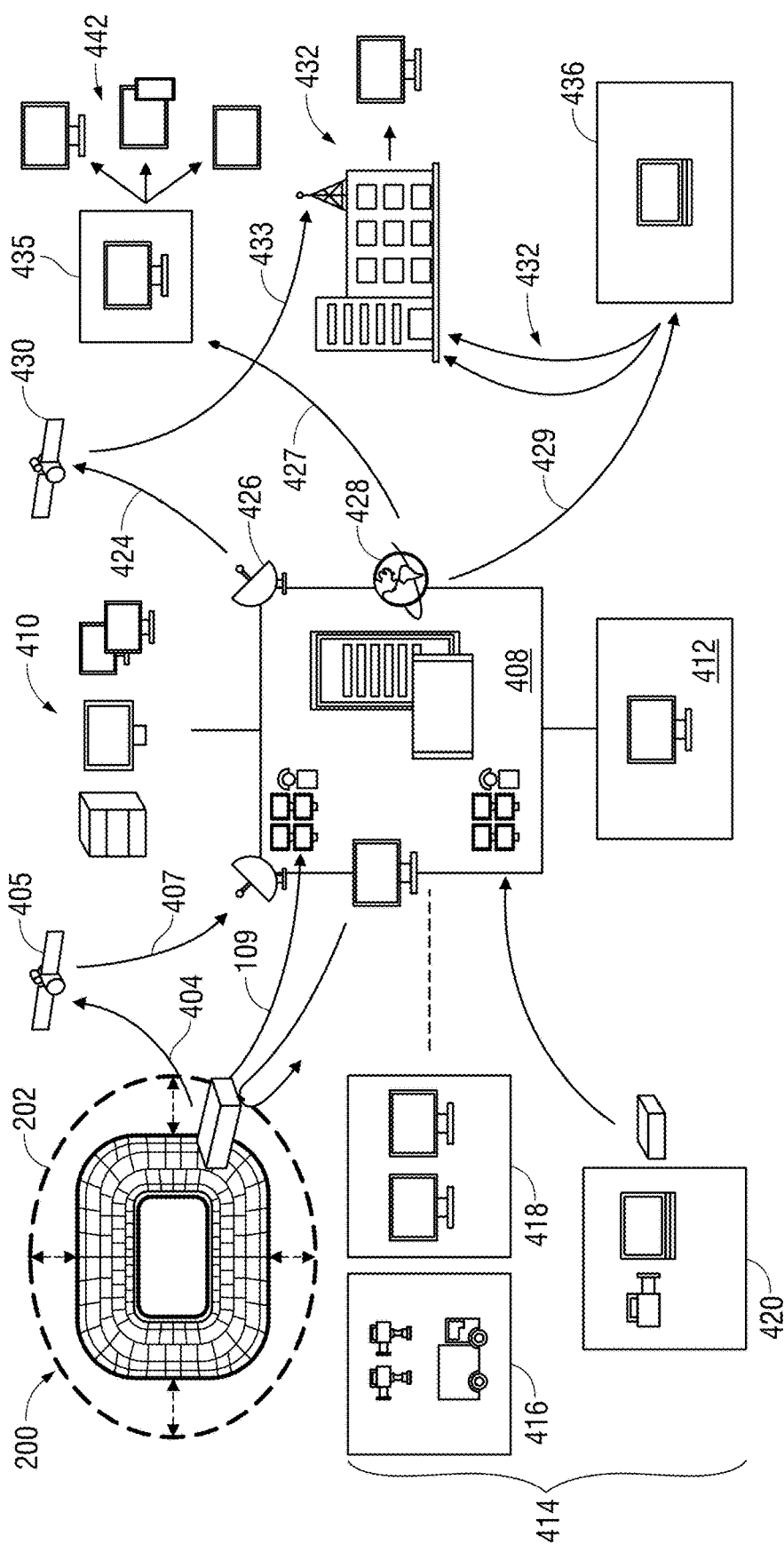
FIG. 13 depicts conceptually an association of multimedia venues, production centers, and world feed and unilateral distribution systems associated for enabling the subject matter of the present disclosure.

FIG. 13 shows international communications network 400 for communicating from Arena venue 200 to a global community the activities and operations of the KissCam® app and contest system. Within Geofence 202, arena venue 200 provides the operational base of the KissCam® contest. Feeds from Arena venue 200 may go via camera 402 as well as via wireless satellite communications path 404 to synchronous satellite 405 as a back up. From camera 402, output goes to international broadcasting center 406, which includes master control room 408, quality control room 410, and may be viewed by monitor control 412.

At Arena venue 200 an international communications center technical operations center 414 operates. This includes an arrangement of mobile cameras 416 and local monitors 418, as well as back up cameras and monitors 420. Back up cameras 420 may also feed master control room 408. Master control room 408 includes a production control room or center for performing the operations necessary for taking the video and audio communications from arena venue 200 as part of the entertainment flow of a particular sporting event. Outputs from international broadcasting center 406 include satellite feed 424 and land-based communications feed 428. Satellite broadcasting signal 424 is relayed by synchronous satellite 430 to a local broadcasting center 432. Output from land-based distribution 428 may go directly to video output or be for the relayed from video output 436 to a local broadcasting station 432. From local broadcasting station 432 output may go to the various viewing venues 438 for participating or watching the events occurring at arena venue 200. In addition, land-based communications output 428 may go to control room monitor 440 to be broadcast to various locations for viewer enjoyment.

The international communications arrangement 400 of FIG. 13 is exemplary of the types of global communications that can occur from Arena venue 200. It is through this kind of international communications network 400 that Kiss-Cam® images and videos may be broadcast to spectators at remote locations for their active participation in the Kiss-Cam® contest The technical infrastructure of international communication network 400 may use a multitude of leading technology solutions all working together offering the best interactive and multimedia consumption experience for viewers. Such technologies may include cloud processing of live feed streaming, high-bandwidth file transfer from venue to the cloud-based infrastructure, as well as cloud-based media transcoding operation. Resources to accomplish these functions may further include cloud based storage within a content delivery network (CDN).

Technical operations center (TOC) 414 may be located in portable cabins in each venue's broadcast compound as the main distribution point and interface between production facilities and telecommunications provider. TOC 414 may serve as the main operational area for signals, accommodating all necessary equipment (routers, patch panels, audio and video monitoring and measuring equipment) and may be connected to the international broadcasting center (IBC) 406 with multilateral feeds.

IBC 406 may include a variety of technical facilities, including a master control room (MCR) as the central distribution point within IBC 406 for all incoming (venues and non-venue) and outgoing broadcast circuits. All incoming feeds may be through general telecom interfaces, such as fiber optic communications or satellite downlink.

IBC 406 may also include a production control room (PCR) as the central distribution point for incoming and outgoing feeds and a quality control room (QCR) as the central point for quality control and as the command center of any audio and video content produced as part of the overall television production of the arena venue 200 event. IBC 406, therefore, may serve as one mode of a global distribution of selected KissCam® images and videos.

With high definition technology, the use of KissCam® video and images can provide an entertaining platform that is truly at the cutting edge of TV production. The disclosed KissCam® contest, therefore, provides numerous ways to innovate in this way to improve the viewing experience for sports and entertainment spectators and viewing participants around the world.

Figure 14:
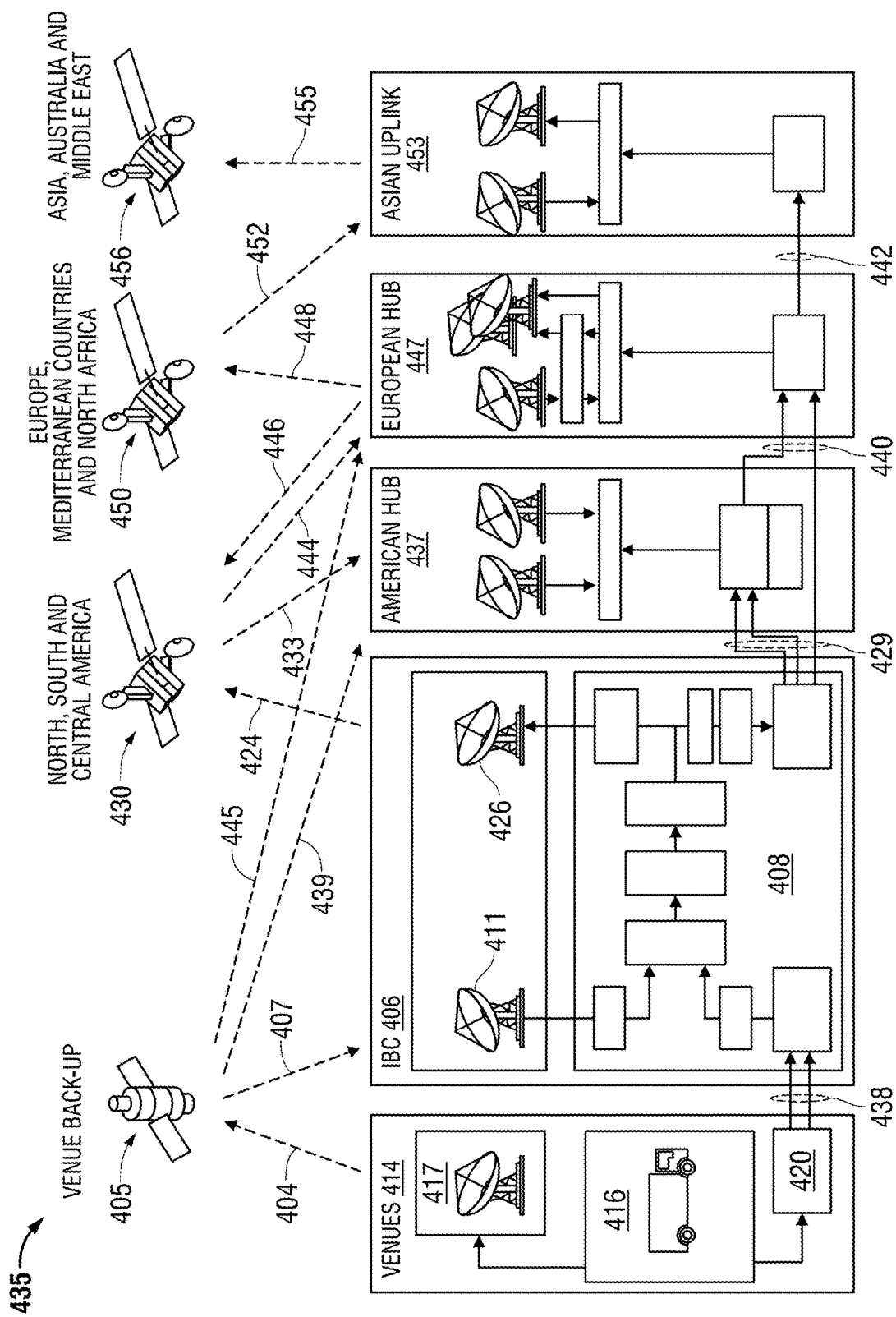
FIG. 14 portrays an association of satellite communication mean means whereby the content of the presently disclosed subject matter maybe communicated in a global communications environment.

FIG. 14 portrays an association of satellite communications 437 whereby the content of the presently disclosed subject matter may be communicated in a globally. FIG. 14 depicts global satellite-based communication network 437 applicable to the subject matter of the present disclosure. Network 437 assures that the captured KissCam® digital images and videos reach a global community of participants who can vote and instantaneously provide feedback to the KissCam® contest to any chosen arena venue 200 from any viewing location worldwide. Thus, within an exemplary venue, venue communications 414 may interface with technical production capabilities and provide satellite 417 output for transmission to venue satellite 405 via satellite uplink 404. In addition, land-based output 438 may flow from communication circuitry 420 to production center 408 within IBC 406. Production center 408 may further communicate with satellite communications facility 411 via downlink 407 from venue back up satellite 405. Output production from IBC 406 may be generated and transmitted via satellite output 426 along satellite communication spent 424 to a North, South and Central America satellite 430. American hub 437 may receive communications from venue back up satellite 405 along communications path 439, as well as along path 433 from North, South and Central America satellite 430. Communications from American hub 437 may also be received from IBC 406 via land based communication path for 29. Output from American hub 437 may also be transmitted via land based communication at 440 to European hub 447. European hub 447 may, by way of communication path 448, provide satellite communications to Europe, Mediterranean countries via North Africa satellite 450. Asia uplink 453 may receive communications via path 452 from satellite 450, as well as a direct land-based link 442. Lastly, output from Asia uplink 453 may go to Asia, Australia and Middle East satellite 456.

Figure 15A:
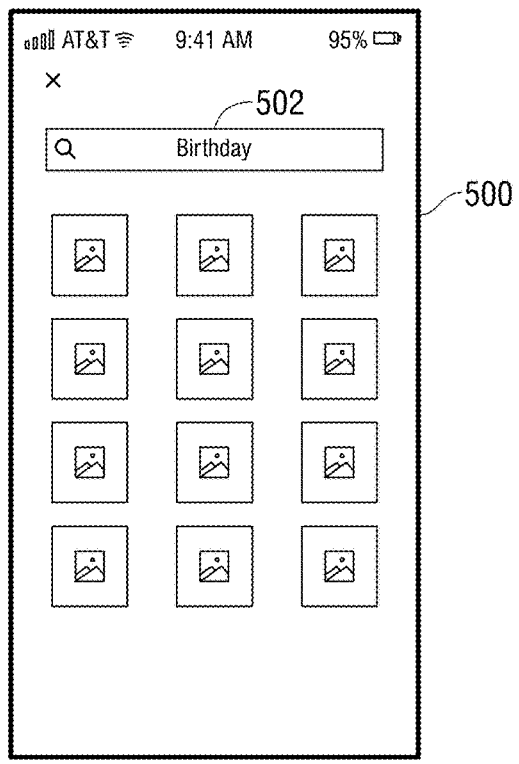
FIGS. 15A through 15T depict functional screens applicable to the operation of the presently disclosed subject matter.
Figure 15B:
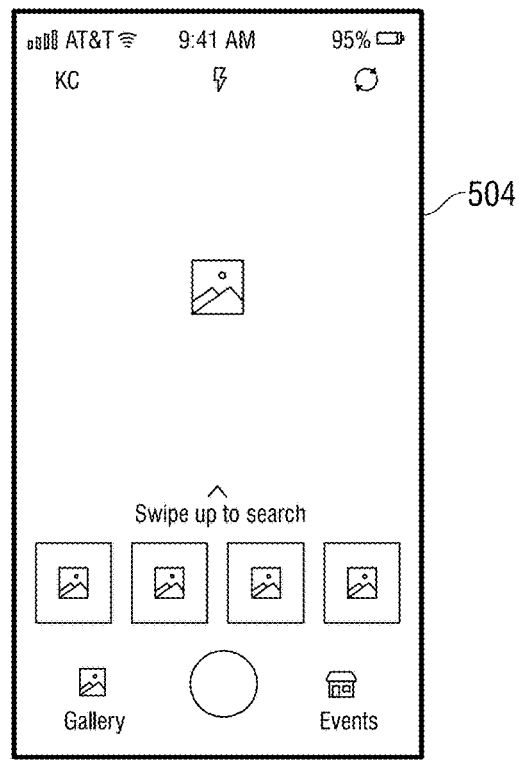
Figure 15C:
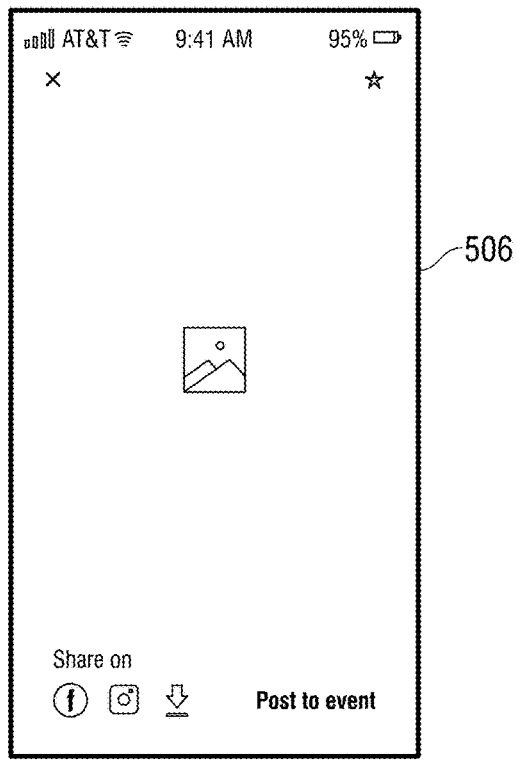
Figure 15D:
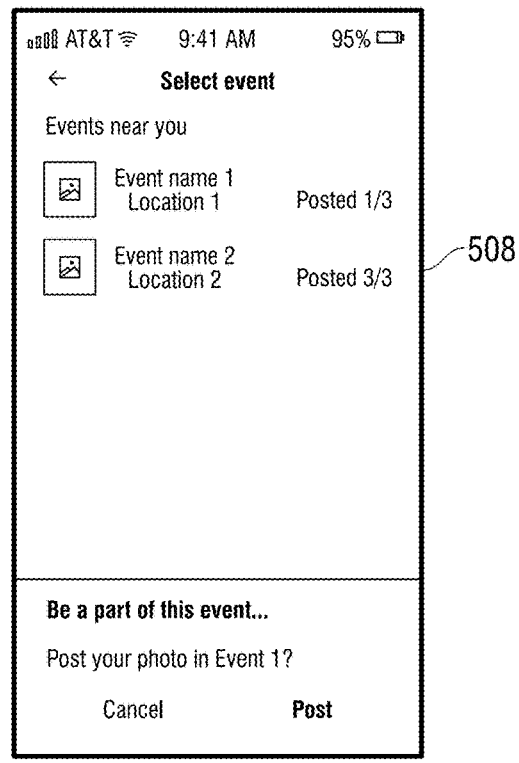
Figure 15E:
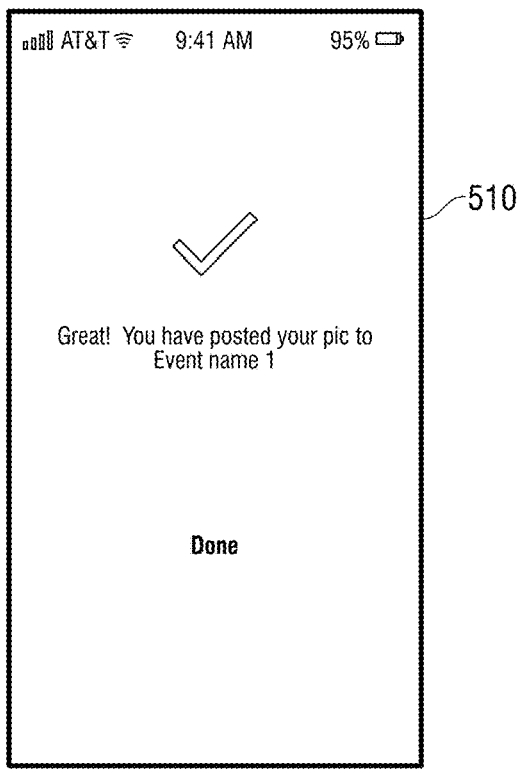
Figure 15F:
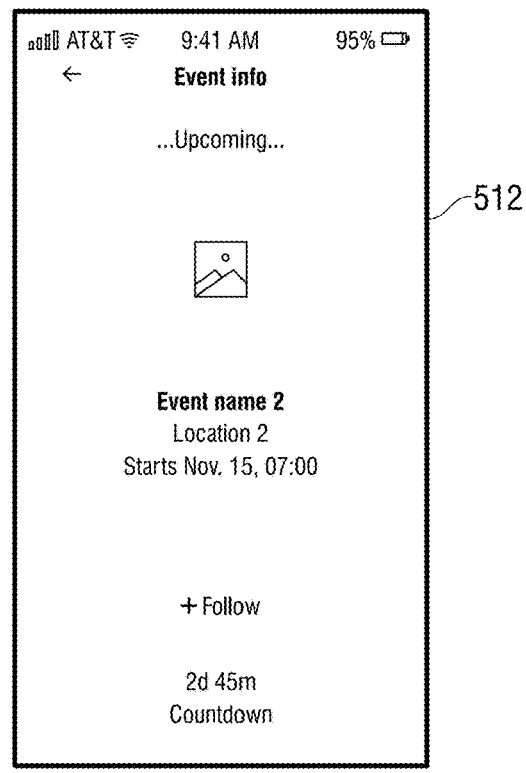
Figure 15G:
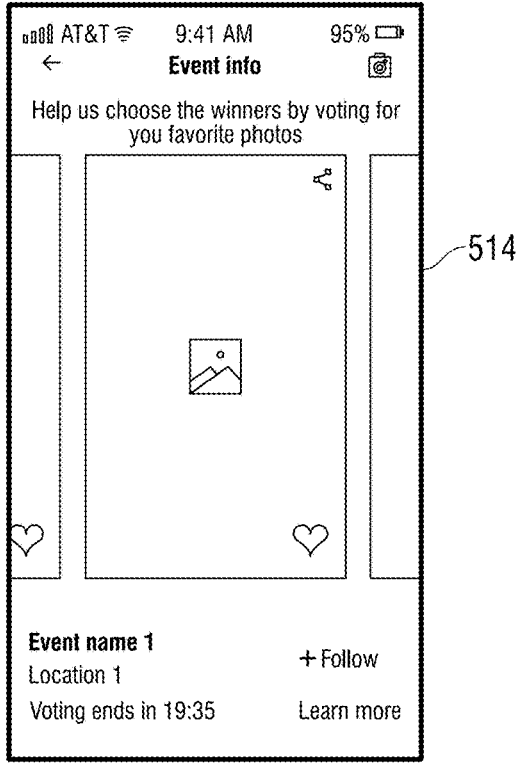
Figure 15H:
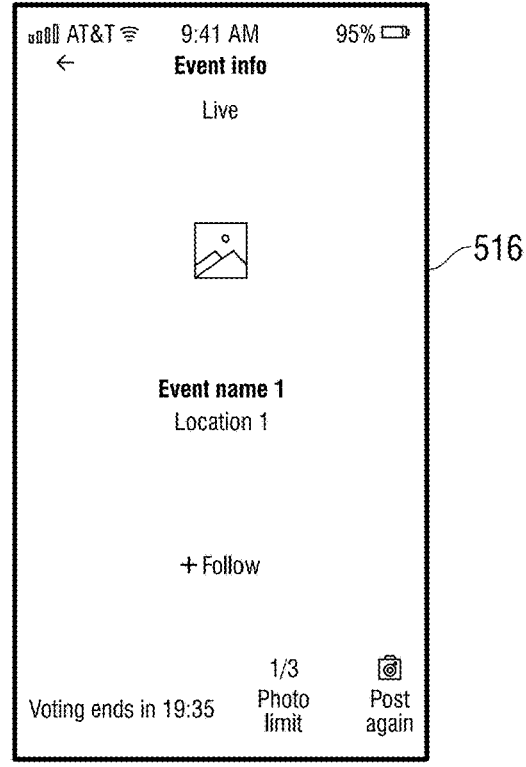
Figure 15I:
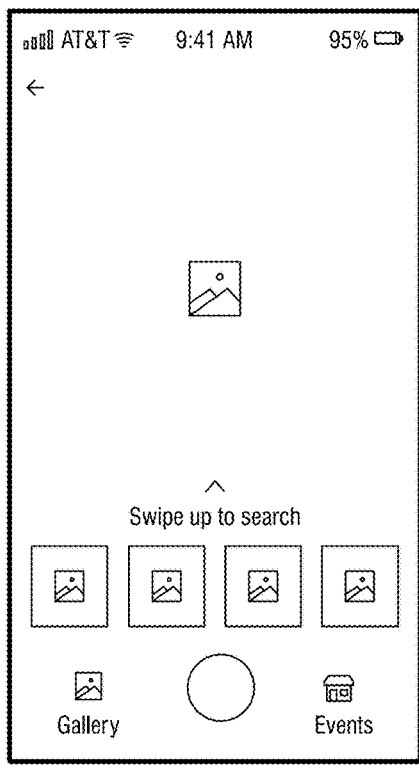
Figure 15J:
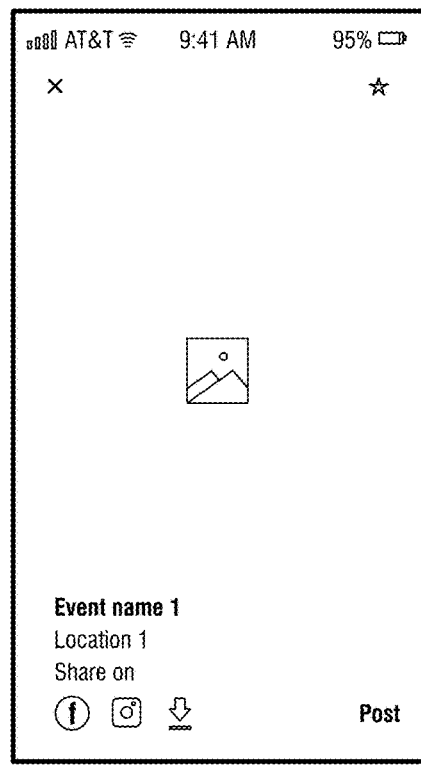
Figure 15K:
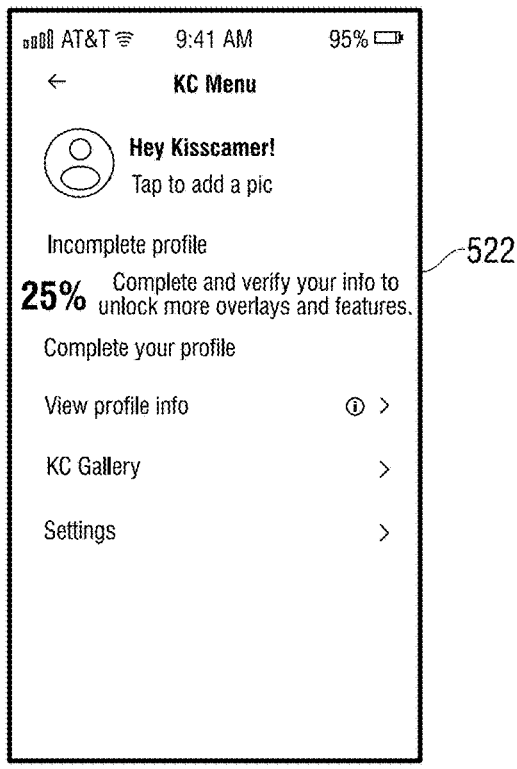
Figure 15L:
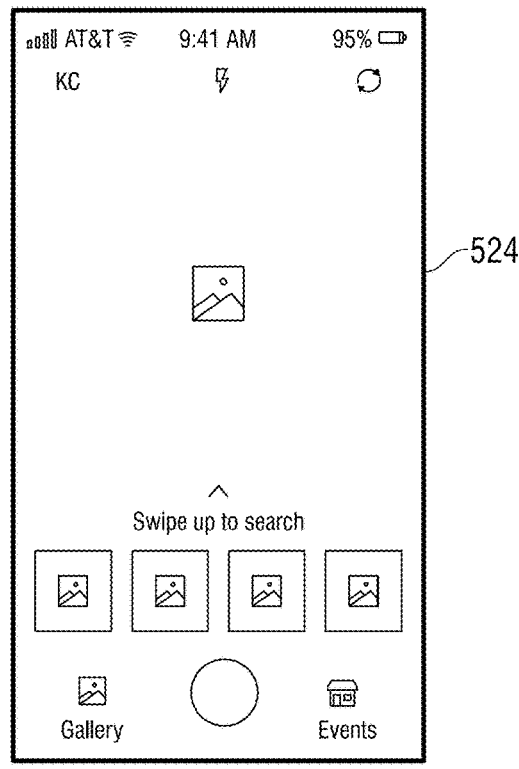
Figure 15M:
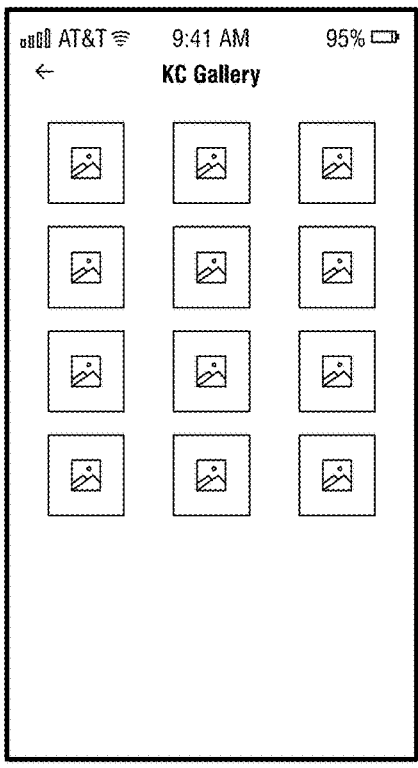
Figure 15N:
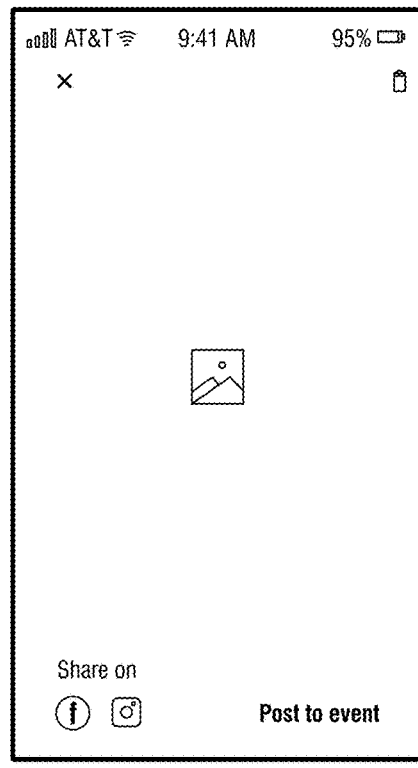
Figure 15O:
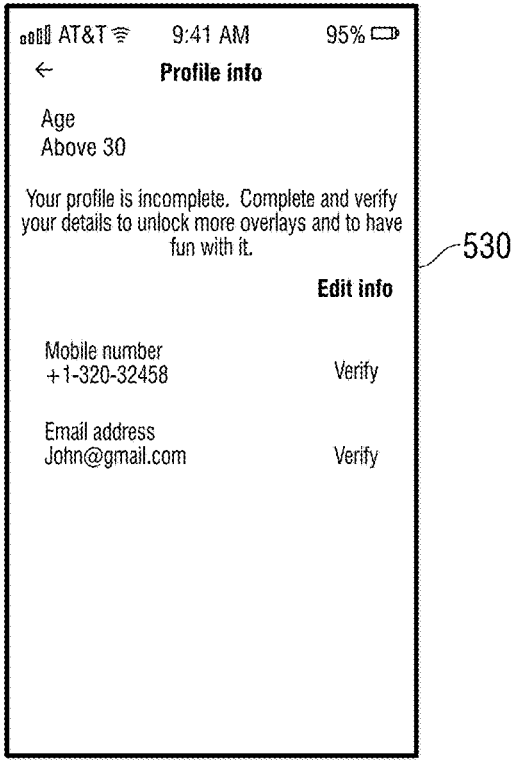
Figure 15P:
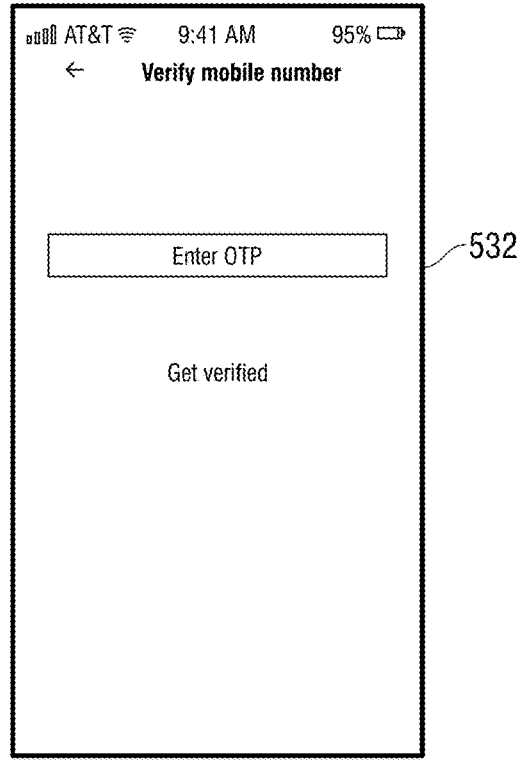
Figure 15Q:
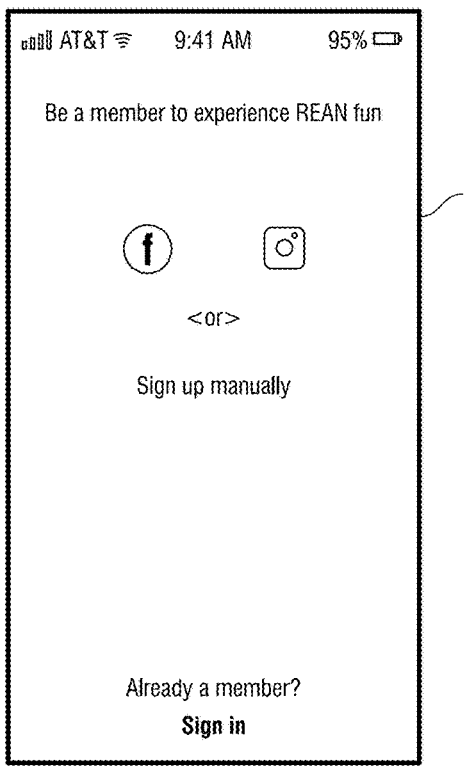
Figure 15R:
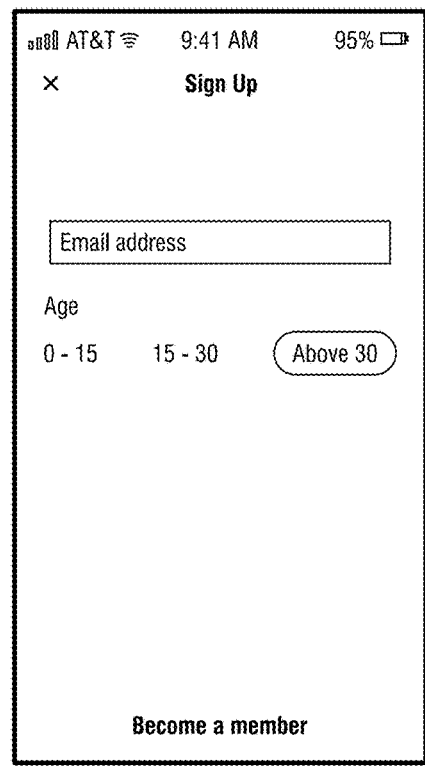
Figure 15S:
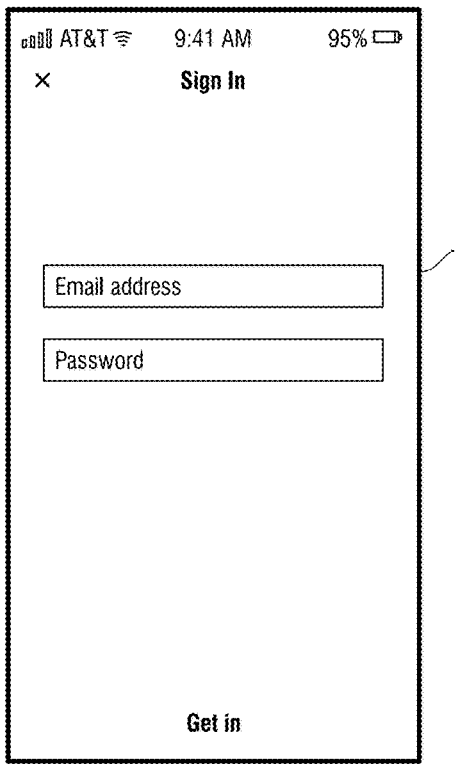
Figure 15T:
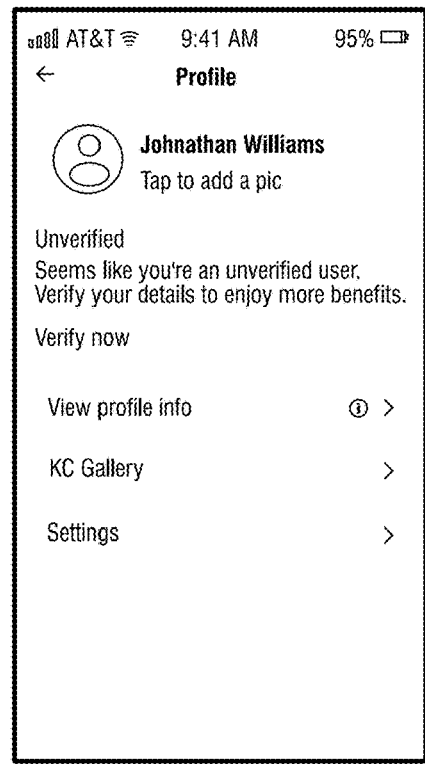

FIGS. 15A through 15T depict functional screens applicable to the operation of the presently disclosed subject matter. FIG. 15A shows a search overlays screen 500 for using a search overlay function. The search overlay function identifies to the user the various overlays applicable or available to use with his KissCam® photo or video. FIG. 15B illustrates a camera screen 504 for use with the messaging system as a present disclosure. FIG. 15C shows preview screen 506 for allowing previews of images applicable to the subject matter of the present disclosure.

FIG. 15D shows an event selector screen 508 to show how the present subject matter allows the user to select a particular event for participation and viewing posted KissCam® images. FIG. 15E shows a user interface screen 510 of the present subject matter by which a user can be notified that his KissCam® digital image has been loaded or included within the potential selectees that may win the KissCam® contest.

FIG. 15F depicts an event screen 512 by which the user may receive information regarding a particular event. The method and system provide information about upcoming, ongoing, and past events in which the infection-demonstrating video images have been used or maybe used for performing the disclosed contest. FIG. 15G shows screen 514 for voting on a particular posted digital image from the selected images in a particular KissCam® contest.

FIG. 15H shows event information screen 516 that the present method and system provide to inform a user of selected aspects of a particular event or gathering whereby the affection-demonstrating video contest of the present disclosure may be enjoyed. FIG. 15I shows a camera screen 518 applicable to the present subject matter, whereby a user may select which camera may be used to capture a digital image for participating in the the KissCam® contest. FIG. 15J provides a preview events screen 520 whereby a user may preview selected aspects of an upcoming event to determine his desire to participate with the contest of the present disclosure.

FIG. 15K shows profile screen 522 for managing the user's profile with the global KissCam® contest system. In addition, this information concerning user who is an arena venue 200 or external spectator permits the system to know from where a vote comes and how to interface with the KissCam® app 46, as well as properly accounting for participant votes for a particular digital image. FIG. 15L provides functional screen 524 for a user to search for overlays to include in a digital image that he may submit for participation in the KissCam® contest. Screen 514 provides various images of the overlays that may be selected for participation and inclusion with his particular KissCam® digital image entry.

FIG. 15M provides gallery screen 526 for displaying to a user various photographs or digital images or videos that have been captured for the purposes of the KissCam® contest. From gallery selection screen 526, the user has the ability to select the particular digital image that may be submitted for inclusion in a particular contest. Again, however, inclusion of a video can occur only within geofence 202 (FIG. 7) of the particular venue or gathering.

FIG. 15N shows screen 528 that allows the user to preview a particular video image that has been selected from the gallery for purposes submission into the KissCam® contest. FIG. 15O provides screen 530 as an aspect of the user profile enabling a user to determine any information necessary for completing his personal profile, as well as to help provide the missing information. FIG. 15P provides functional user interface screen 532 for a verification of the particular mobile number that may be used by the participant as he completes his profile in the KissCam® contest.

FIG. 15Q provides sign-up screen 534 for the user's digital imagery to be uploaded to various social media sites such as Facebook®, Instagram®, Twitter®, and other generally recognized social media platforms. FIG. 15R shows how the present disclosure presents to a user a functional screen for him sign into the KissCam® contest via his Facebook® or Instagram® account.

FIG. 15S provides screen 538 showing how a user, once an account has been established, may sign-in using his email address and password. FIG. 15T shows screen 540 depicting a user profile that permits navigation to profile information, the photo gallery of the particular user, and controls to the settings for the KissCam® contest.

Figure 16A:
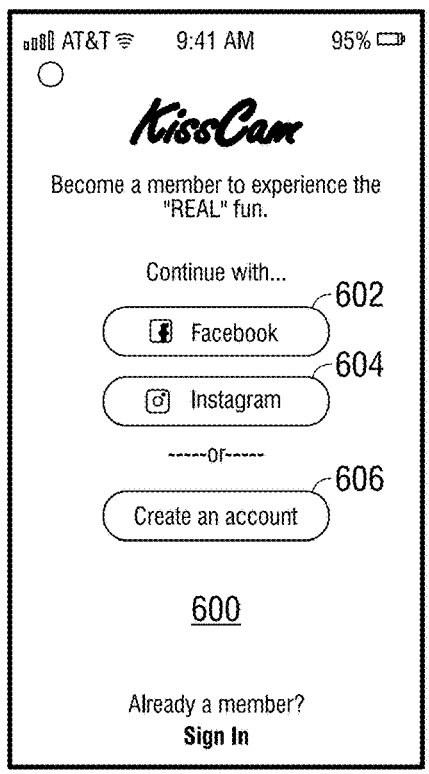
FIGS. 16A through 16O portray user interface screens applicable to the subject matter of the present disclosure.
Figure 16B:
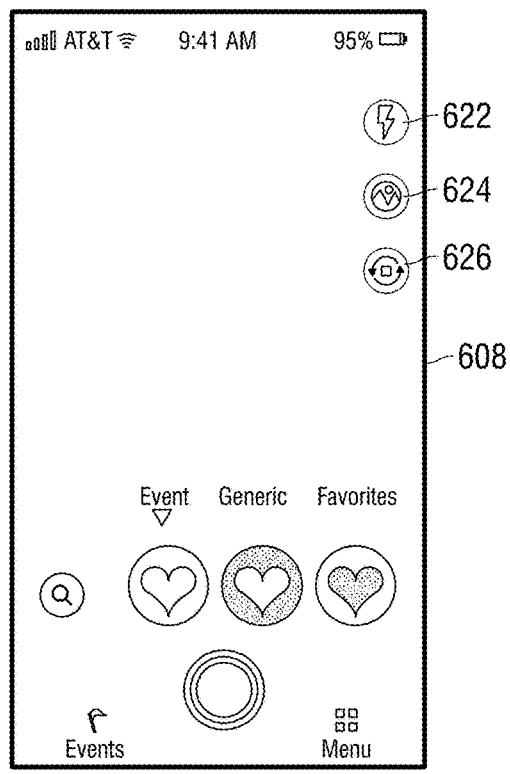
Figure 16C:
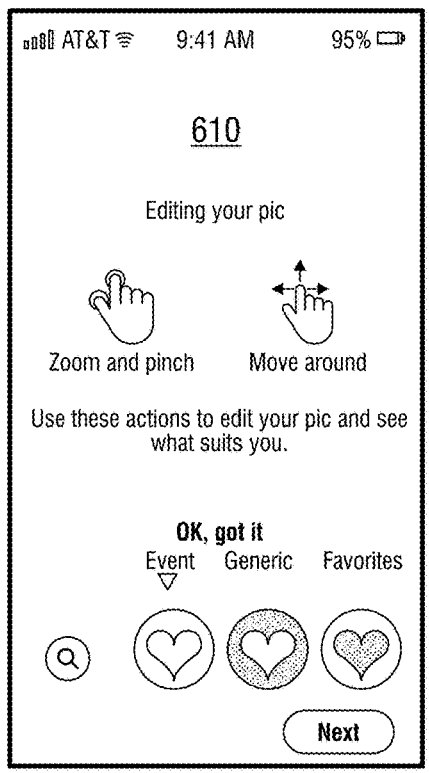
Figure 16D:
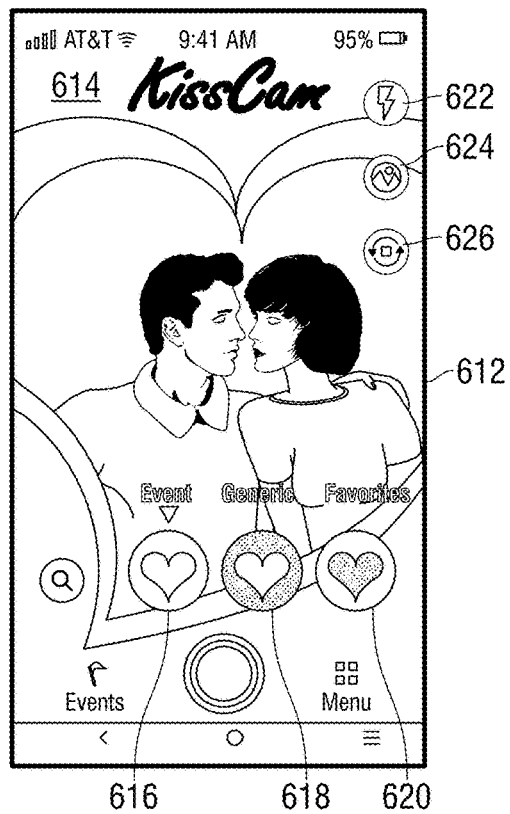
Figure 16E:
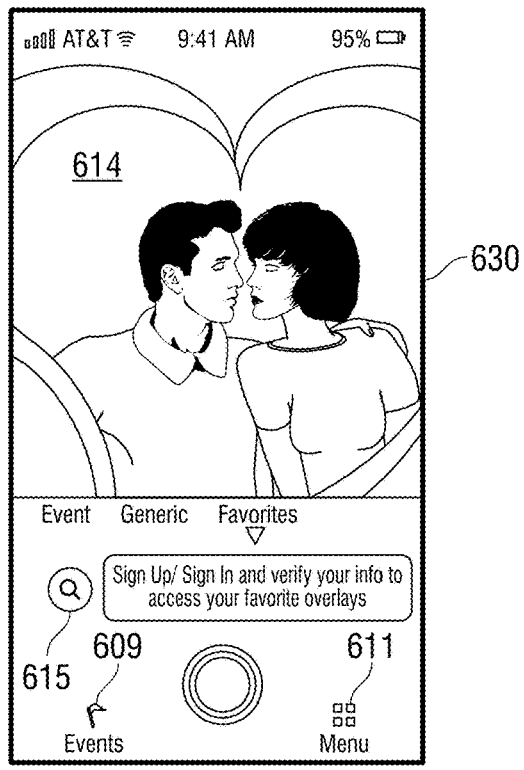
Figure 16F:
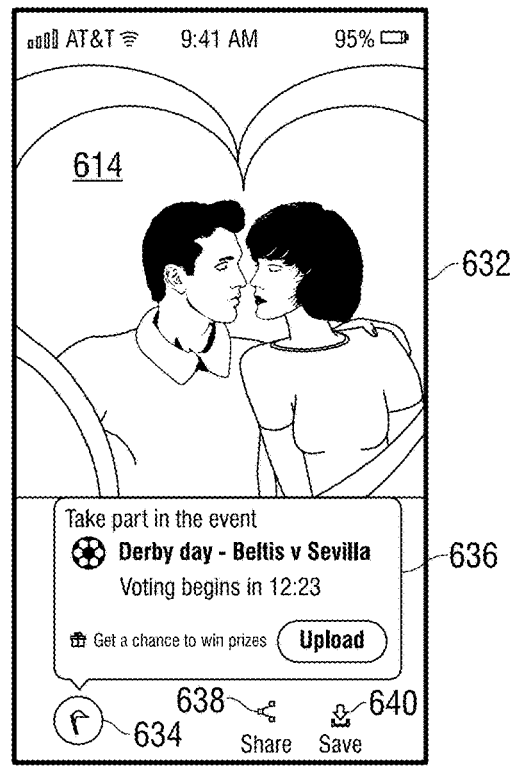
Figure 16G:
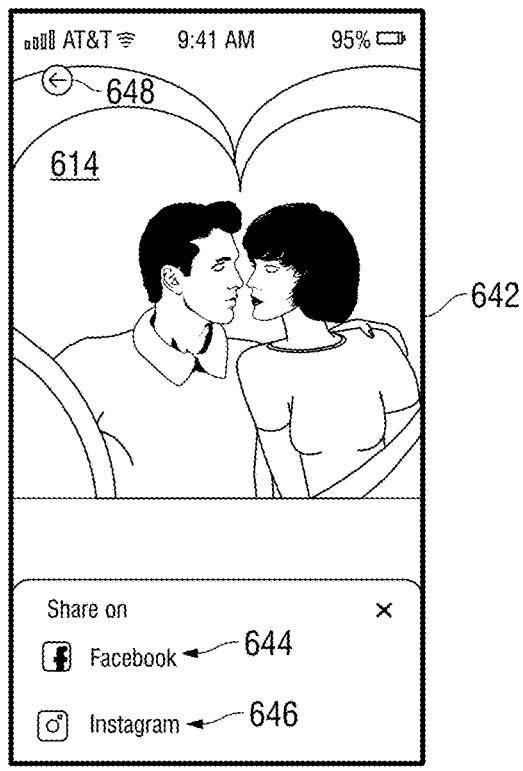
Figure 16H:
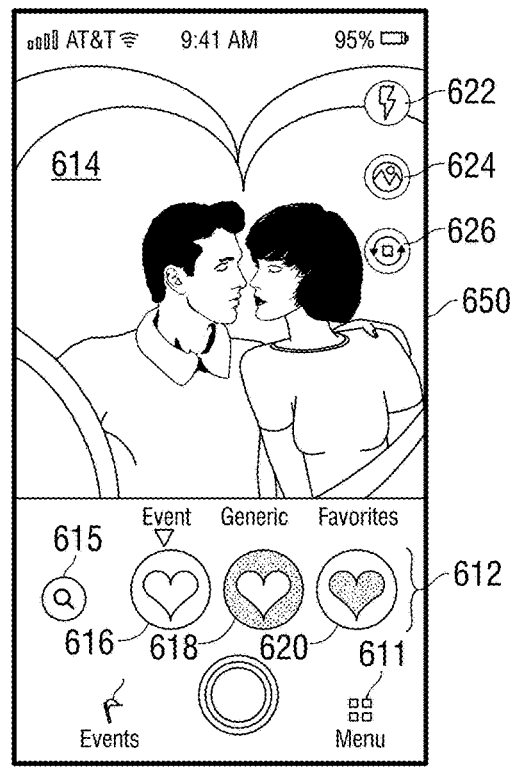
Figure 16I:
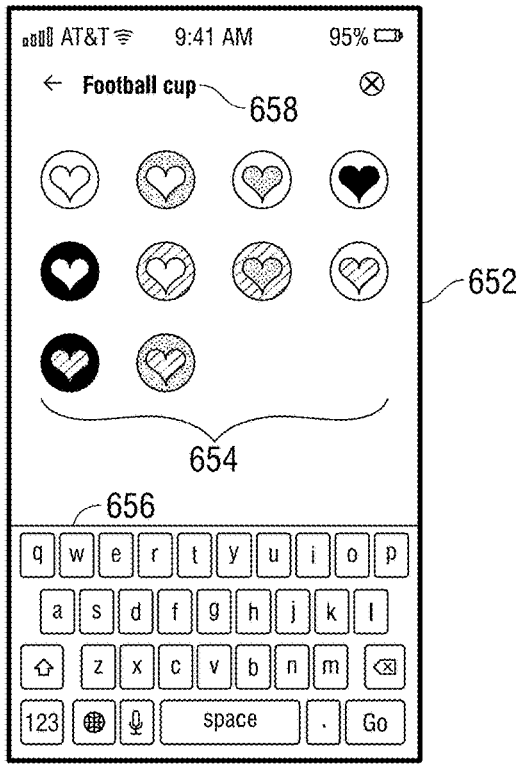
Figure 16J:
Figure 16K:
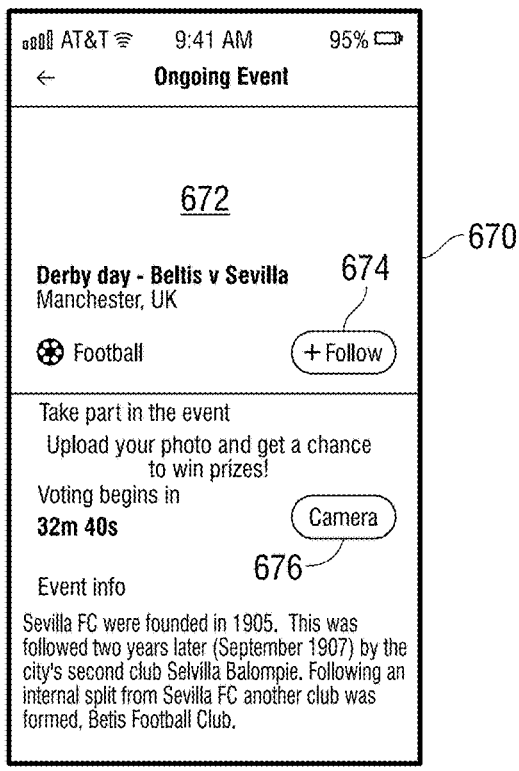
Figure 16L:
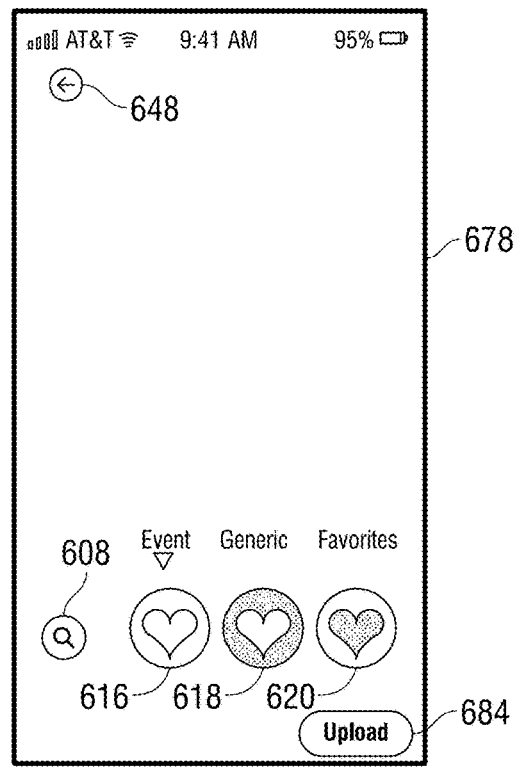
Figure 16M:
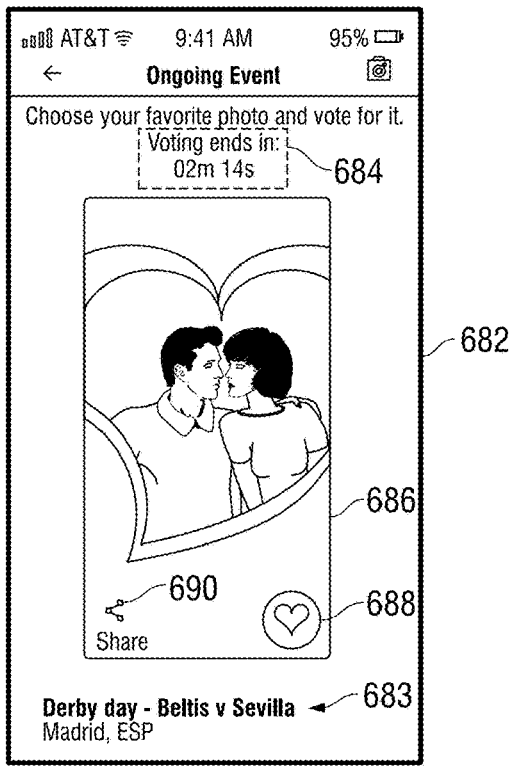
Figure 16N:
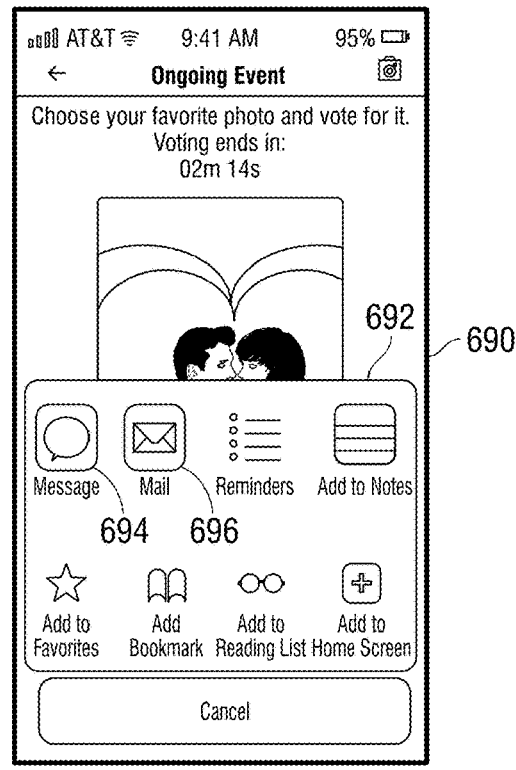
Figure 16O:
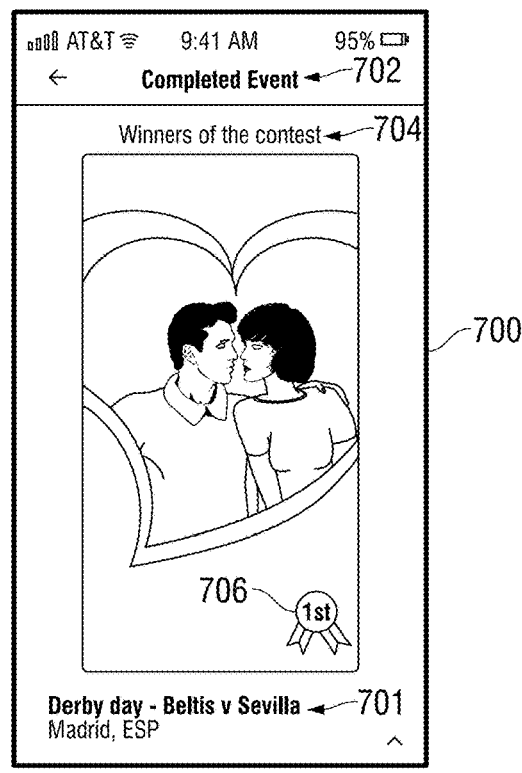

FIGS. 16A through 16O portray user interface screens applicable to the subject matter of the present disclosure. FIG. 16A shows an example of an initial use screen 600 that equips an individual to become a member and experience the KissCam® here disclosed. Login may be via social media sites such as Facebook or Instagram. Alternatively, the user may directly create an account into the system providing requested information.

FIG. 16B illustrates how the method and system begin the initial process of a photograph being uploaded by an individual how desires to play the KissCam® contest. FIG. 16C illustrates various functions at screen 610 for editing and uploading the digital image. These functions may include a "zoom and pinch" function for enlarging and shrinking the image, as well as a control for moving the image around on the screen. These actions permit the user to position the image for the optimal desired impression when using the presently disclosed system.

FIG. 16D shows in screen that once a digital image is uploaded and positioned as in FIG. 16C, frame 614 allows use of controls for flash 622, contrast 624, and camera lens selection 626. Moreover, heart-shaped overlay controls 612 allows use of event specific overlays 616, generic overlays 618, and favorite overlays 620. The attractive use and position of an overlay on a digital image frame help to make the image an ideal candidate for a spectator to submission as a KissCam® contest entry.

FIG. 16E depicts an exemplary initial screen for using the present method and system at the present disclosure on the floor by multiple unction device Siri is hearing described. FIG. 16E shows screen 630 that includes a KissCam® image 614. At screen 630 a participant may sign up/sign in and verify his info to access favorite overlays. Search glass 615 shows that the user may search for an overlay that is most pleasing to him. Additional functions on screen 630 include events selector 609 and menu button 611.

FIG. 16F shows event selection screen 632 where there is the ability to select at function button 634 the event with which the user seeks to participate. For example, in this particular instance screen portion 636 shows that the user has been permitted are presented with the opportunity to take part in the "Derby Day-Beltis v. Sevilla" soccer event. Screen portion 636 includes the time in which the voting begins and invites the participant to upload his image in the database for the particular event. In addition, screen 632 shows that the image can be shared using button 638 and the information concerning the century say via function 640.

FIG. 16G show on screen 642 that the participant may share the uploaded KissCam® digital image on Facebook*® via control 644 or Instagram® via function 646. It should be noted, however, that other social platforms such as Twitter or Foursquare, etc., may be connected to as an additional function. FIG. 16 G shows screen 642 where KissCam® image 614 includes a screen portion for social media sharing. This screen portion may be activated by the user pressing area 638 on screen 632, at FIG. 16 F. In screen 16 G, the user is notified that he may share the image 614 on Facebook by selecting option 640 form or Instagram by selecting option 646.

FIG. 16H shows screen 650 where buy a user may have add KissCam® image 614. In particular, screen 650 presents the user with the option of changing or selecting the various overlays.

FIG. 16I shows screen 652 where by selectable overlay gallery 654 is presented to the user. In addition, the user may search for a particular overlay by providing input to field 658.

FIG. 16J shows screen 660 whereby upon selecting events selector 609 the user is presented with a list of upcoming events. There are other events that are made available or listed for the user. These include on going and completed events as well.

FIG. 16K shows screen 670 that is accessible a pawn the user selecting one of the events from events listing 662 as shown in screen 660 and FIG. 16J. In FIG. 16K, the event D derby day-Beltis the Sevilla, in Manchester UK appears. This display shows that it is a football or soccer event as shown by the soccer ball icon. Selector 674 allows the user to designate that he seeks to follow this particular event, D derby day-Beltis the Savella as a KissCam® participant. The user may participate as a spectator within geofence 202 of the arena venue 200. In such case, the The user may use camera button 676 to initiate on camera that would be used for capturing a photo at the event within the geo-fence 202. Alternatively, if the user or participant is outside geo-fence 202, the camera button well either not be operable or not be shown.

FIG. 16L shows screen 676, which includes upload button 680. If the user is within Geo fence 202, he may press upload button 680 for a KissCam® image shown on screen 678. In response to pressing button 680, The KissCam® app will load the photo on screen 678 into the KissCam® client/server architecture and allow it to participate in the contest for photo selection.

FIG. 16M shows Screen 682 which includes a carousel of images that the KissCam® app provides for an ongoing event. Screen 682 permits the user, whether inside or outside geo-fence 202 to designate his favorite using heart selector button 688. For the potential purpose of garnering additional vote for the users favorite, share button 690 allows the user toShare his selected image to friends and family. In addition, screen 682 informs the user to choose a favorite photo and vote for it as described, and also that voting ends, in this example, in two minutes and 14 seconds at screen portion 684.

FIG. 16N shows screen 690, which provides a customary template screen portion 692 to indicate ways by which the user may share his selected favorite photo 686.

FIG. 16O for a completed event, here the event Derby day-Beltis v. Sevilla. In screen 700, strain area 702 notifies the user that the event is completed. Screen portion 704 identifies that favorite photo 686 is the winner. In addition, winning ribbon 706 shows that the photograph is the number one winner for the Contest.

There are numerous user interface screens that operate within the KissCam® contest of the present disclosure. This discussion highlights only a few of them. In particular, user screen 710 shows a portable multifunction device screen we're by KissCam® icon 712 is presented to the user. In the example, the user may be an administrator of the KissCam® contest. It is from the screens that the administrator or contest operator may select various features of the Kiss-Cam® screens that a personal multifunction device 40 shows during KissCam® contest operation.

FIG. 17 B shows user interface 714 for interfacing with KissCam® screen 718. This is the administrators entry point for controlling many of the overlays 716 that the user experiences when operating the KissCam® contest. For example, search function 720 permits the user to select from a list of overlays, such as overlay list 722.

Figure 17A:
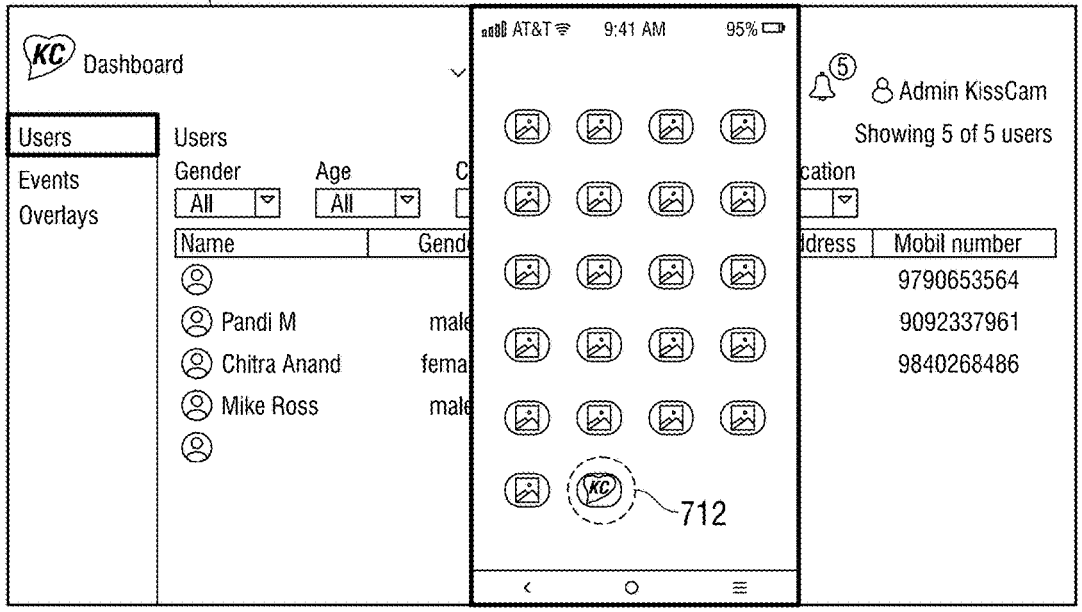
FIGS. 17A through 17G show computer screens enabling the support communications and related functionality of the presently disclosed subject matter.
Figure 17B:
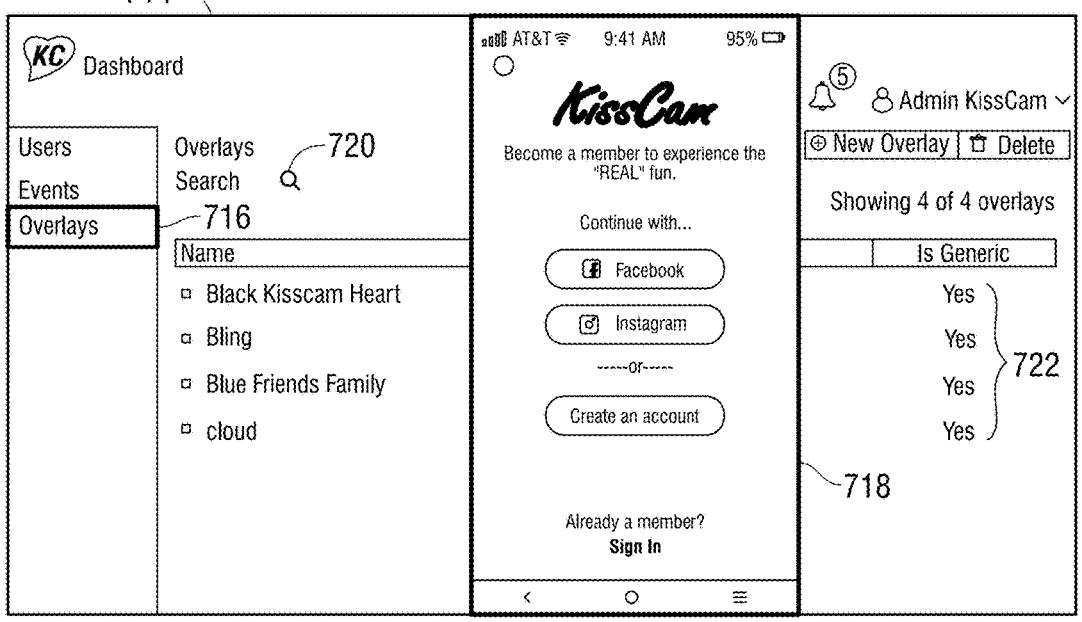
Figure 17C:
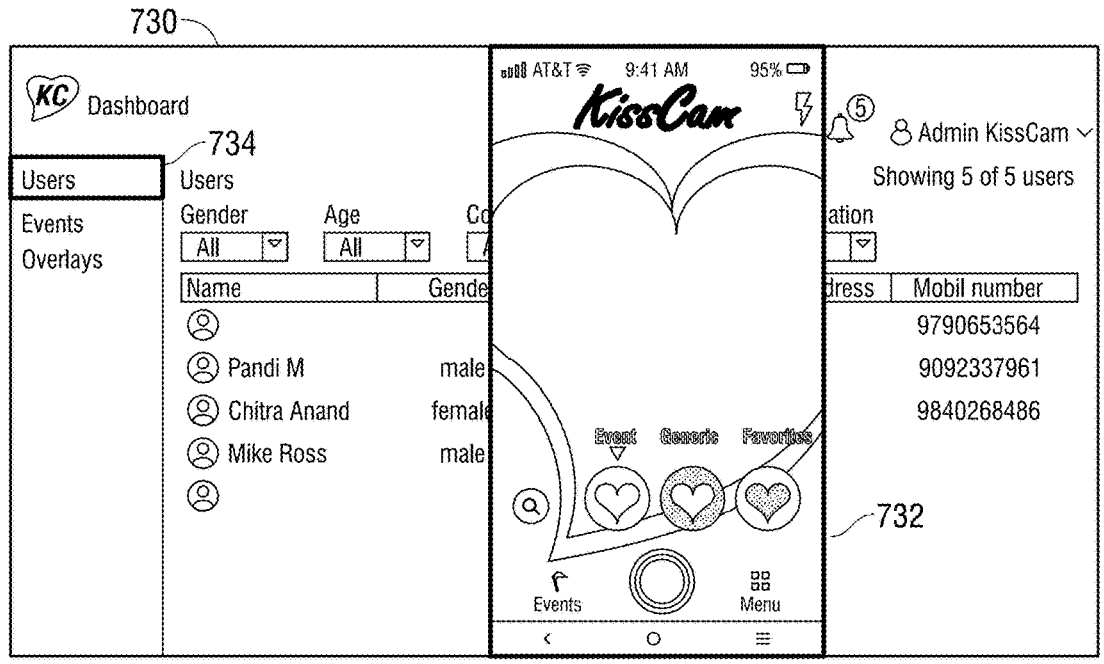
Figure 17D:
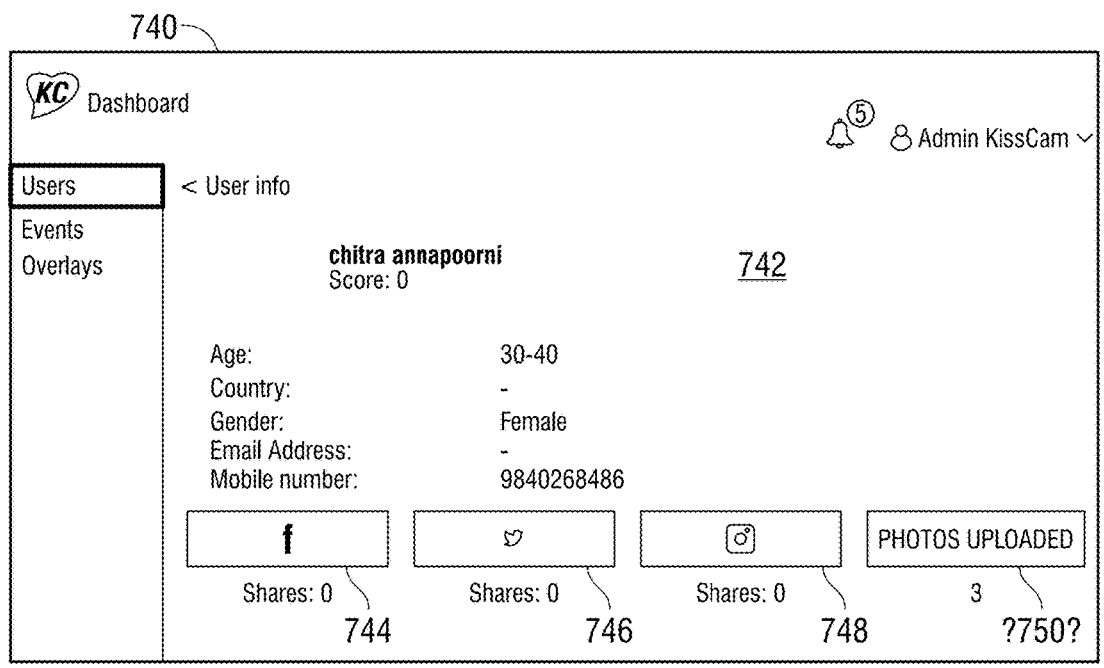

FIG. 17D shows user interface screen 740 that provides information regarding a user and the populating of her profile 742. In addition, through user interface 740, there is a tally of the number of shares, for example, that the profile has with Facebook at indicator 744, with Twitter at indicator 746, and with Instagram at indicator 748. Indicator 750 shows the number of photos that the user, here Chitra Annapoorni, has loaded into the KissCam® contest.

Figure 17E:
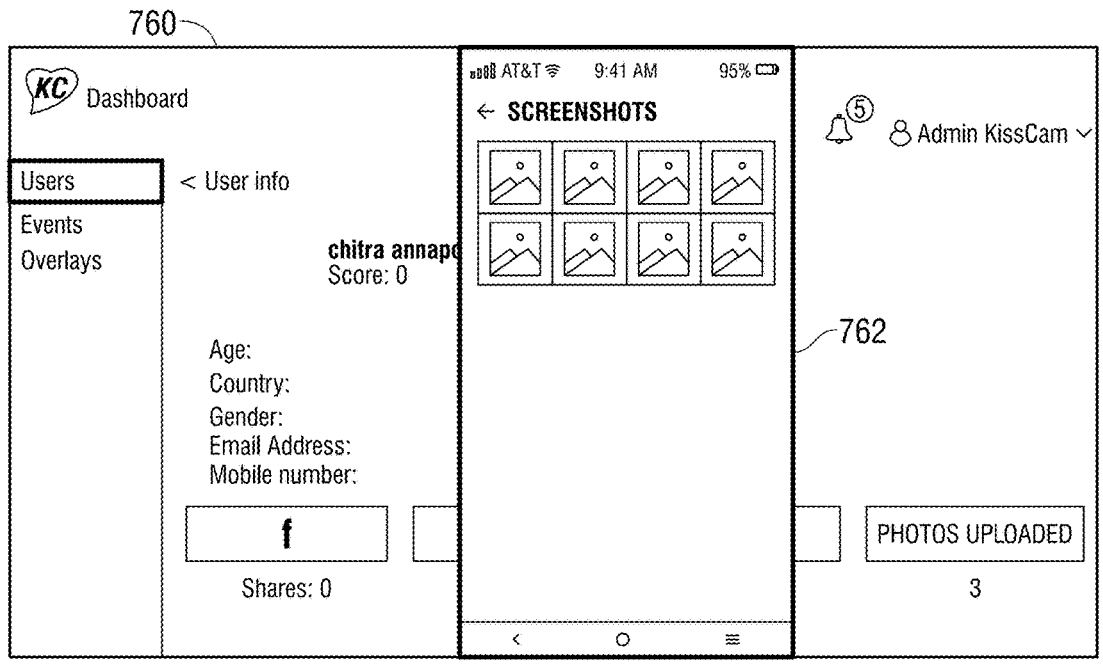

FIG. 17E further shows screen 760 by which a user may use screen 762 of portable multifunction device 40 for uploading photographs into the KissCam® gain from the gallery of photographs appearing in screen 762.

Figure 17F:
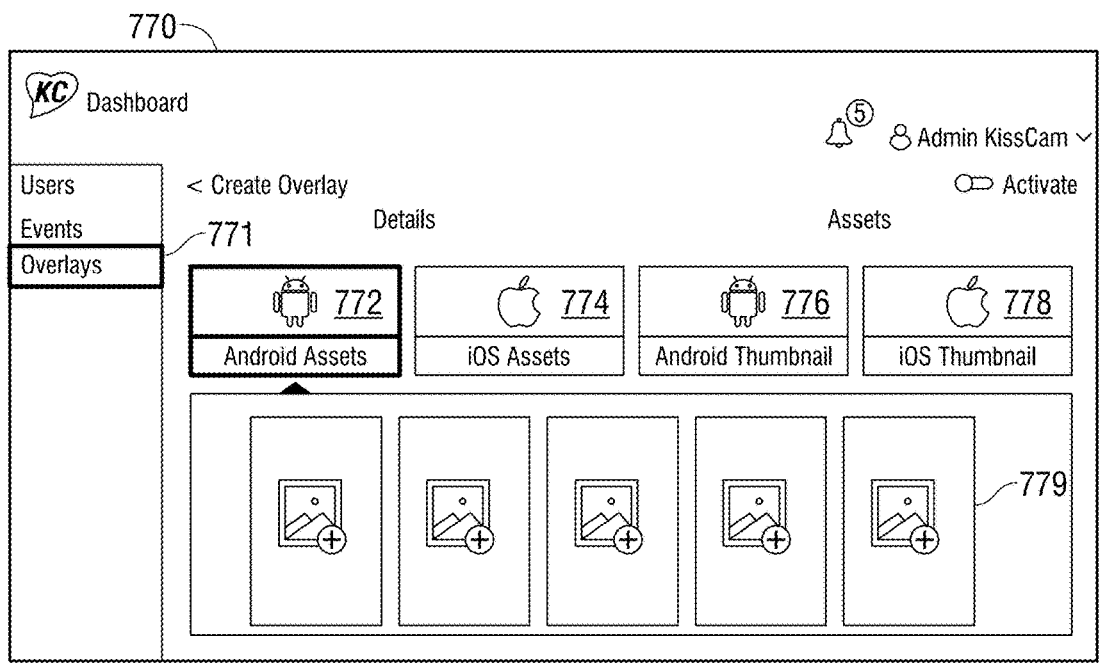

FIG. 17F shows user interface screen 770 that an administrator may use for populating data bases of overlays for use on different types a portable multifunction devices. The possible portable multifunction device is 40 for which the subject matter of the present disclosure they find application and provide assets may include android assets 772, iOS assets 774, android thumbnails 776, and iOS some thumbnails 778. To populate these images for the various devices, a gallery 779 is provided that is specific to the different types of Android interfaces, as well as iOS interfaces for operating the KissCam® contest of the present disclosure.

Figure 17G:
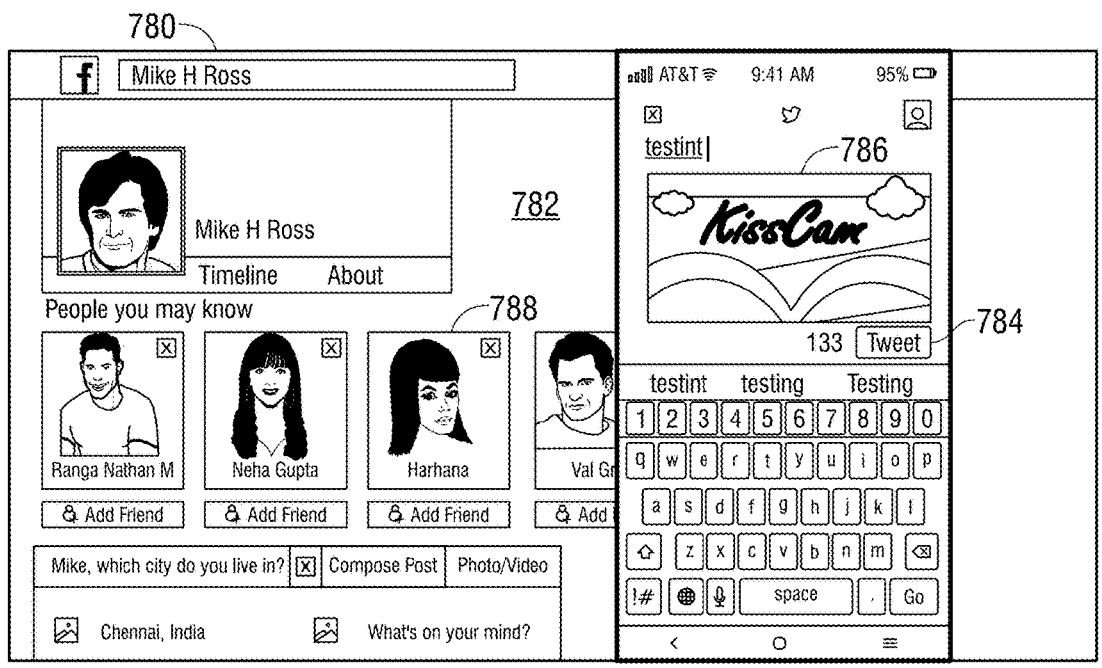
Figure 18A:
FIGS. 18A through 18E illustrate various kinds of affection or positive emotions amongst friends enabled by the method and system of the present disclosure.
Figure 18B:
Figure 18C:
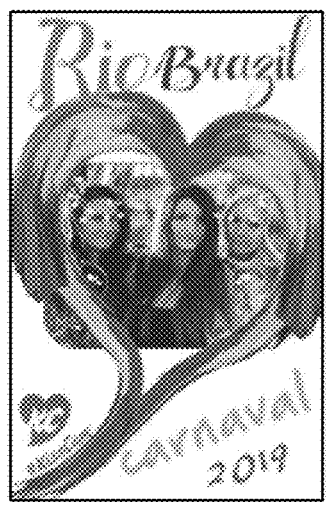
Figure 18D:
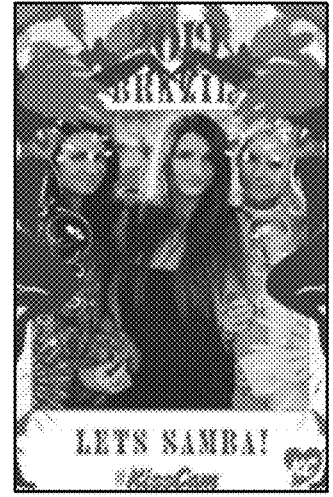
Figure 18E:

FIG. 17G shows user interface screen 780. In user interface screen 780 appears a user's, here Mike H Ross', Facebook page 782. On Facebook page 780 to appear the normal type of Facebook images for various friends. The indication of KissCam® screen 780 shows that there is a cooperative arrangement between the functions and utility of KissCam® screen 784 and Facebook page 782.

In one embodiment, a system of sharing an event with members of a social network is provided and includes a device accompanying said participant during the event and a server associated with said social network. In fact, in several embodiments certain augmented reality, artificial reality, and virtual reality functions cooperate with the presently disclosed subject matter. Augmented reality (AR) is one type of reality-based interface. AR interfaces supplement the real world with virtual (computer generated) objects that appear to coexist in the same space as the real world. (Source: R. Azuma, Y. Baillot, R. Behringer, S. Feiner, S. Julier, and B. MacIntyre, "Recent advances in augmented reality," IEEE Computer Graphics and Applications, vol. 21, 2001, pp. 34-47. En: http://www.argamedesign.com).

In an alternative embodiment, the inventive subject matter here disclosed includes an apparatus and computerized method providing a memory, a display, an image source, and a processor communicably coupled to the memory, the display and the image source. The processor receives an image from the image source, detects at least one target within the image, retrieves an electronic content associated with the target, creates an AR image by combining the image with the electronic content associated with the target and displays the AR image on the display.

The processor receives an image from the image source, detects at least one target within the image, retrieves an electronic content associated with the target, creates an AR image by combining the image with the electronic content associated with the target and displays the AR image on the display. In addition, the present invention provides a computerized method of augmenting an image displayed to a user. A processor, a memory communicably coupled to the processor, a display communicably coupled to the processor and an image source communicably coupled to the processor are provided. An image is received from the image source. At least one target is detected within the image using the processor. An electronic content associated with the target is retrieved using the processor. An AR image is created by combining the image with the electronic content associated with the target using the processor. The AR image is displayed on the display.

Incorporated fully and expressly within this present disclosure is the subject matter of U.S. Pat. No. 9,566,494 B2 including a system and method for creating and sharing an event using a social network. Such an event may be a sporting event, whereby sharing the event on a social network enhances and expands the participant and spectator experience. The AR messages include geo-referenced artificial reality words or symbols to indicate distances, tips, targets or other information to the participant. The event is shared with spectators, such as friends or a subset of friends in the participant's social network. In addition to creating an active gallery for an event, messages can be exchanged among participants and spectators and virtual goods, money, and donations exchanged.

Generally speaking, the system and methods of the present invention enhance and expand the participant and spectator experience at an event by sharing the event on a social network. The event includes views of the event from a participant position and AR messages overlaid the view. The participant(s) and spectators can communicate with each other, providing a mechanism for a remote "gallery" of spectators.

In combination with the presently disclosed subject matter, here is combined a method of sharing an event with members of a social network, is provided and includes announcing to one or more members of a social network an invitation to participate in said event and operating a device accompanying said participant during the event to track positions of the participant during the event. The positions are communicated to a social media server associated with the social network. Some of the invited members subscribe to the event on the social network where they can view the event with a perspective view from a participant position recorded on said social media server. The view includes an AR message and preferably a photo background or artificial reality background.

The present disclosure may further provide a memory, a display, an image (still or video) source, and a processor communicably coupled to the memory, the display and the image source. The processor receives an image from the image source, detects at least one target within the image, retrieves an electronic content associated with the target, creates an AR image by combining the image with the electronic content associated with the target and displays the AR image on the display.

Within the scope of the disclosure, a processor receives an image from the image source, detects at least one target within the image, retrieves an electronic content associated with the target, creates an AR image by combining the image with the electronic content associated with the target and displays the AR image on the display. The image source may include a camera, a data storage device, an electronic content delivery device or a webpage. The image may include a graphic image, a photograph or a video stream. The content may include a video, an animation, a three-dimensional model, a new image, a text, a link to additional information or electronic content. The apparatus can be a mobile phone, an electronic tablet, a computer, a gaming device, a wrist worn electronic device, a handheld electronic device or any other suitable device. The steps preformed by the processor will be further described below.

FIGS. 18A through 18E illustrate various kinds of affection or positive emotions amongst friends enabled by the method and system of the present disclosure.

FIG. 18 is a flow chart of a computerized method 800 of augmenting an image displayed to a user in accordance with one embodiment of the present invention. A processor, a memory communicably coupled to the processor, a display communicably coupled to the processor and an image source communicably coupled to the processor are provided in block 802. An image is received from the image source in block 804. At least one target is detected within the image using the processor in block 806. An electronic content associated with the target is retrieved using the processor in block 808. An AR image is created by combining the image with the electronic content associated with the target using the processor in block 810. The AR image is displayed on the display in block 812.

The method may also include the steps of tracking the target within the video stream and adjusting the AR image. Similarly, the method may include the step of adjusting the electronic content within the AR image based on a change in the target within the image using the processor. Likewise, the method may include the step of continuously repeating the receiving, detecting, retrieving, creating and displaying steps as long as the image is received from the image source. Other steps may include: (1) receiving one or more user commands and changing the AR image based on the one or more user commands using the processor; (2) detecting one or more interest points, fiduciary markers or optical flow associated with the target within the image using a feature detection method and the processor, and identifying the target using the one or more interest points, fiduciary markers or optical flow and the processor; and/or (3) retrieving the electronic content from a remote source via a network. The feature detection method can be a corner detection method, a blob detection method, an edge detection or thresholding method, or a combination thereof. The steps can be performed in real time or near real time.

As described above, the image source may include a camera, a data storage device, an electronic content delivery device or a webpage. The image may include a graphic image, a photograph or a video stream. The content may include a video, an animation, a three-dimensional model, a new image, a text, a link to additional information or electronic content. The apparatus can be a mobile phone, an electronic tablet, a computer, a gaming device, a wrist worn electronic device, a handheld electronic device or any other suitable device. The steps preformed by the processor will be further described below.

Figure 19:
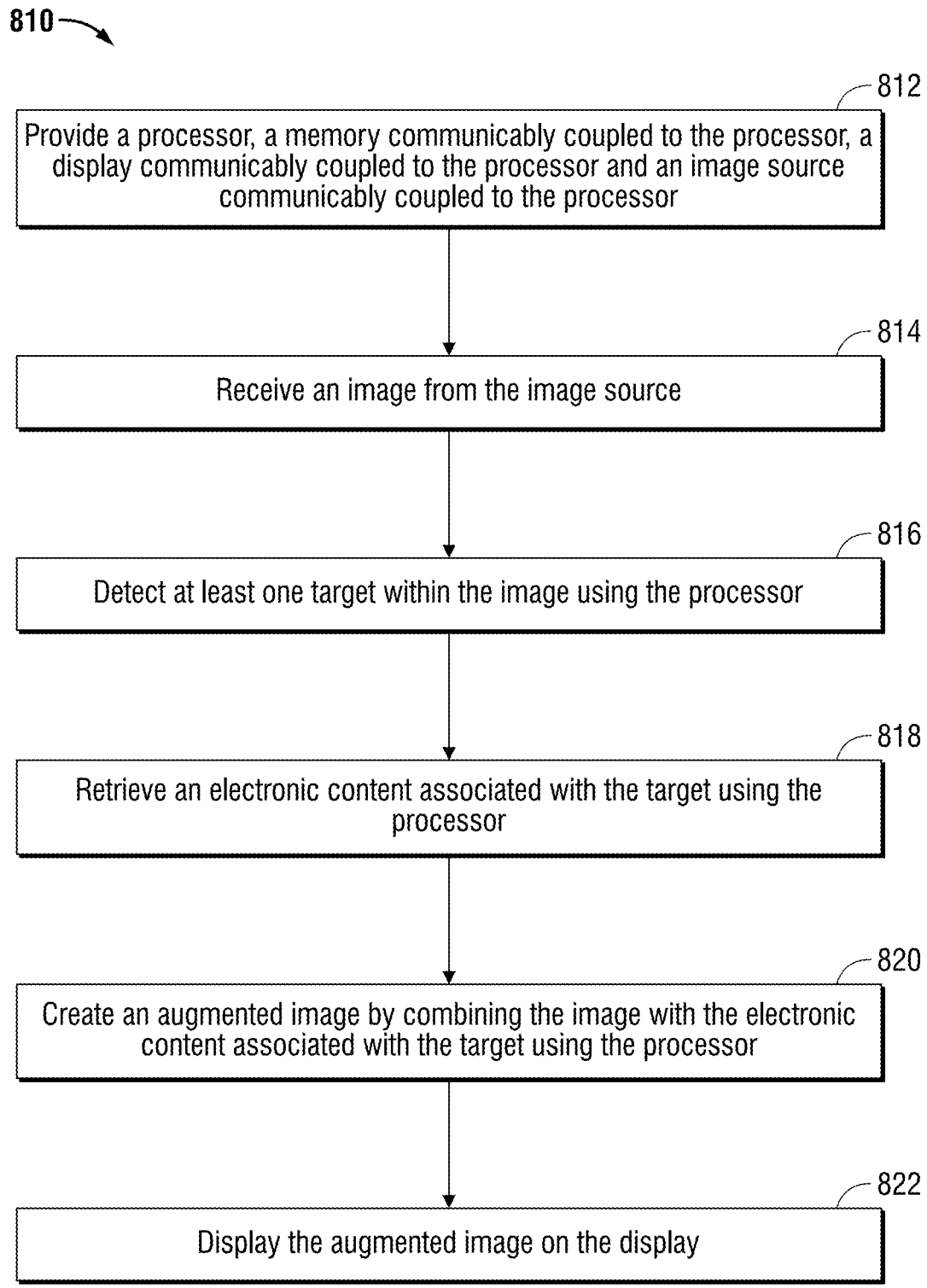
FIG. 19 shows processing steps for the augmented reality functionality of the present method and system.
Figure 20B:
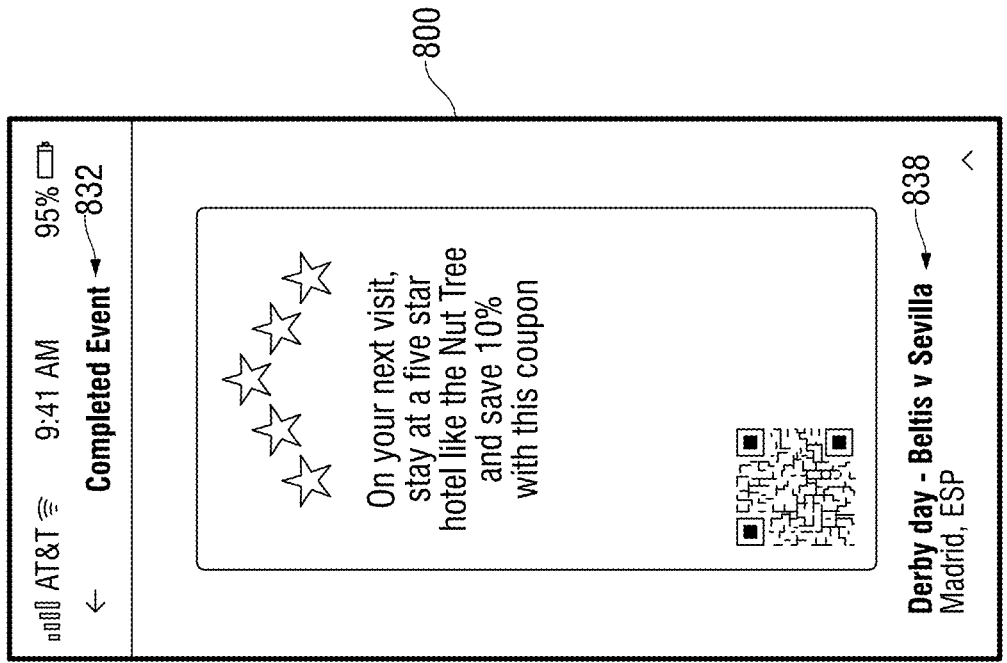
FIGS. 20A through 20E show an exemplary implementation of the processing sequence of FIG. 19.
Figure 20A:
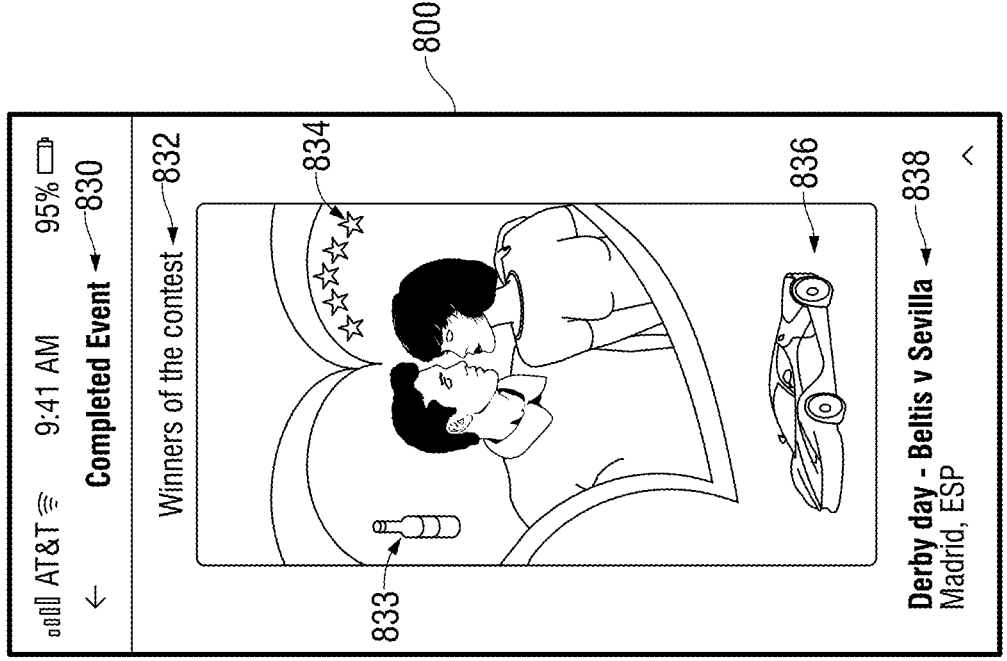

FIGS. 20A through 20E show an exemplary implementation of the processing sequence of FIG. 19. FIG. 20A shows three augmented images from the image source that have been superimposed on to the Kisscam display. The images are labeled Item numbers 833 (a wine bottle), 834 (five stars) and 836 (line drawing of a sports car). The augmented images serve as links to other screens within the KissCam® application or to screens/websites supplied by a third party vendor working with the KissCam® application. The number, image types and placement of augmented images on a particular KissCam® screen while under application control may be in response to one or more criteria. The exemplary criteria may include, as a first criteria, that the user being a contest winner or just a participant.

Another exemplary criteria for selecting AR images may relate to the user's KissCam® application profile (e.g., the application knowing that the user is a wine lover, or that the user's home address is at least 100 miles from the current event they are attending. The presently disclosed method and system may, for example, detected such information using the above-described GPS function of the KissCam® app. Given the user is a substantial distance from home, they might have need of a rental car or hotel accommodations currently or in the future.

Yet another AR image criteria may derive from previous interactions between the user by the KissCam® application. Moreover, a further AR image may simply be randomly generated and presented to the user according to a specific randomization schema.

FIG. 20B shows a screen supplied by or through the KissCam® application by a third party vendor of a discount coupon redeemable by the named hotel. The screen is shown as a result of the user selecting the augmented image of five stars (item 834) when the KissCam® application was showing the screen in FIG. 20A. The screen can be static showing no movement or could incorporate movement such as an animated GIF or video or could allow the user to zoom and pan over the screen images.

Figure 20D:
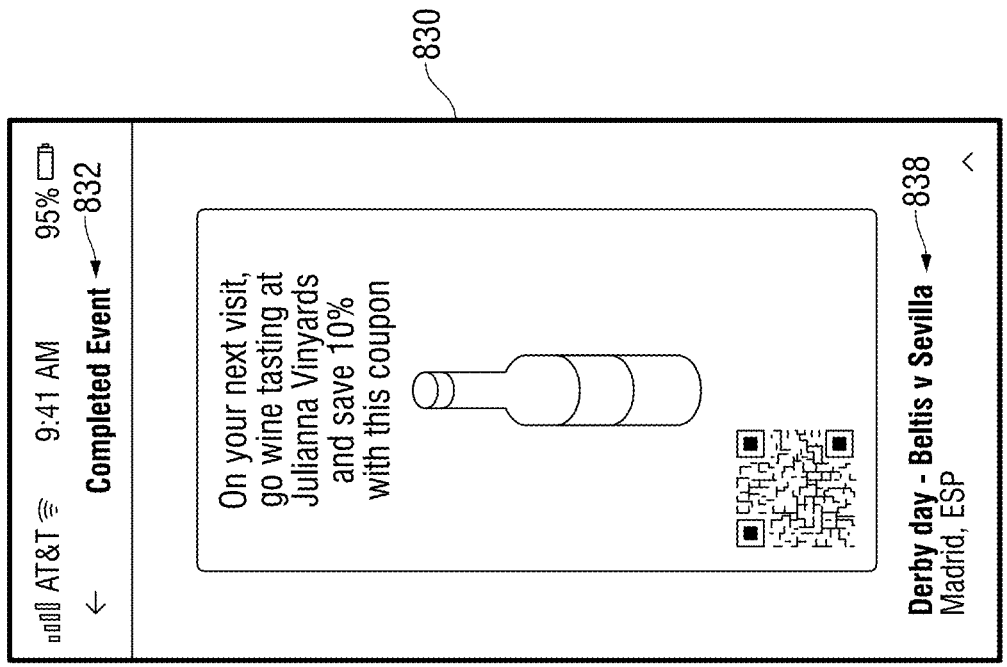
Figure 20C:
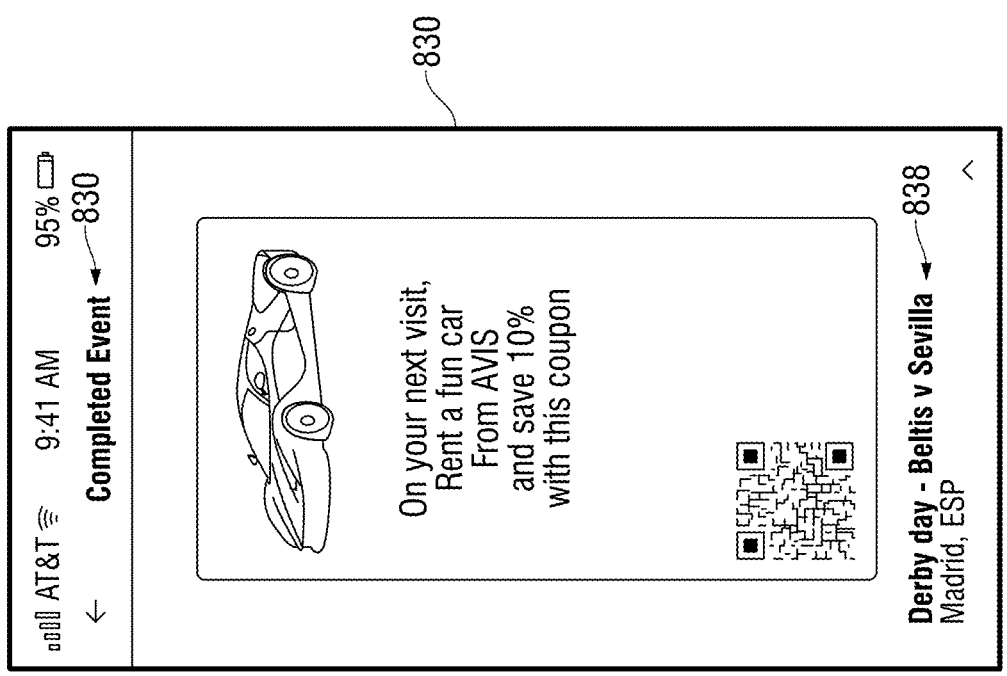

FIG. 20C shows a screen supplied by or through the KissCam application by a third party vendor of a discount coupon redeemable by the named car rental company. The screen is shown as a result of the user selecting the augmented image of the race car (item 836) when the KissCam® application was showing the screen in FIG. 20A. The screen can be static showing no movement or could incorporate movement such as an animated GIF or video or could allow the user to zoom and pan over the screen images.

FIG. 20D shows a screen supplied by or through the KissCam® application by a third party vendor of a discount coupon redeemable by the named wine company. The screen is shown as a result of the user selecting the augmented image of the wine bottle (item 833) when the KissCam application was showing the screen in FIG. 20A. The screen can be static showing no movement or could incorporate movement such as an animated GIF or video or could allow the user to zoom and pan over the screen images.

Figure 20E:

FIG. 20E shows a screen supplied by or through the KissCam application by a third party vendor, a close up of the wine bottle shown in FIG. 20D. The screen is shown as a result of the user selecting the augmented image of the wine bottle (item 833) and zooming in using the built in hand gestures recognized by the KissCam® application. The screen can be static showing no movement or could incorporate movement such as an animated GIF or video or could allow the user to zoom and pan over the screen images.

A principal difference between the pre-existing Kiss-Cam® contest or system and the subject matter of the present disclosure includes the ability to capture images from venue participants and make those images accessible to the entire global community of individuals who have the KissCam® app on their portable multifunction device. Then, during the entertainment or sports event at the particular venue, the holder of the portable multifunction device can determine which digital images they prefer. Based on this preference, they may vote and send that vote back to the sports venue or entertainment venue. Then, based on the accumulated results of votes from those retail suppose at the venue watching the particular sports or entertainment event, as well as the votes of individuals not at the venue, are added and compared. From this comparison a winner of the selected images is chosen, and that winner receives an appropriate reward. This is a fundamentally different process and system that depends on and interfaces with an entire global communications network, including satellite communications, that provides control of the voting processes that may take place at the respective venues or gatherings.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter.

What is claimed is:

1. A contest method comprising the steps of:
 a sponsor displaying an advertisement accompanied by a contest invitation in association with a spectator event;
 providing a network, including data transmission and storage mechanisms, for contest contestants located within a electronically geofenced perimeter of said spectator event to electronically submit affection-demonstrating digital images for contest participation, said affection-demonstrating digital images comprising at least one still image selected from a personal photograph, a family photograph, and a pet photograph portraying demonstrations of kissing, hugging, or otherwise conveying personal affection between at least two individuals or pets;
 a plurality of spectators of said spectator event, becoming contest participants and entering said contest, by generating a digital image utilizing a camera, a cellular phone with a built-in camera, a scanner, or a kiosk and electronically submitting said affection-demonstrating digital images representing demonstrations of kissing, hugging, or otherwise conveying personal affection between at least two individuals or pets, as well as participant information, to said network, for contest participation, said digital images being electronically submitted utilizing an MMS message or an internet connection, said digital images being stored on contest servers;

selecting a subset of said affection-demonstrating digital images from spectators located within said electronically geofenced perimeter of said spectator event as candidates for entry into a voting stage of said contest;

broadcasting said selected subset of said affection-demonstrating digital images to a global of community of spectators both located at the spectator event and watching the spectator event via a media outlet;

inviting all spectators of the spectator event to vote for at least one of said affection-demonstrating digital images from said selected subset of said affection-demonstrating digital images and communicating a vote to a contest server;

electronically receiving and tallying said votes from all said spectators within a predetermined time limit and prior to the end of the spectator event;

electronically encrypting said affection-demonstrating digital images and contestant information, utilizing software provided on said contest participants' computer or mobile devices or upon receipt of said affection-demonstrating digital images by a server of said contest provider, to form a plurality of information capsules comprising a plurality of affection-demonstrating digital images, each said affection-demonstrating digital images corresponding to an individual entrant of said contest;

entering said plurality of affection-demonstrating digital images into an electronic batch of a plurality of affection-demonstrating digital image entrants;

selecting an affection-demonstrating digital image from said electronic batch of said plurality of affection-demonstrating digital images and designating such selected affection-demonstrating digital image as a winning entry of said contest according to the selected affection-demonstrating digital image having received the most votes from all spectators both within the spectator event geofenced perimeter and outside the spectator event geofenced perimeter;

decrypting said digital image and contestant information and identifying a single winner of said contest by using said digital image and said contestant information; and wherein submitting said digital images via said MMS message or said internet connection, new digital images can be initiated and completed in compressed time periods associated with the duration for said spectator event.

2. The method of claim 1, further comprising the step of operating said network to permit said one or more members who have elected to become spectators to said event by connecting to said social network server during the event, and viewing said event at the event venue, wherein at least one view is a perspective view from a position at the event venue and includes an augmented reality (AR) message displayed to said spectators, and wherein said server is capable of displaying said AR message during the event.

3. The method of claim 1, further comprising the step of providing a plurality of framed images for framing the submitted digital images.

4. The method of claim 1, further comprising the step of identifying said winner and communicating said winner to global community of spectators both inside and outside said geofenced perimeter.

5. The method of claim 1, further comprising the step of broadcasting said affection-demonstrating digital images on a large television screen within a large sports or entertainment venue.

6. The method of claim 1, further comprising the step of communicating said winner through a global spectator community using an network of globally interconnected communication satellites.

7. The method of claim 1, further comprising the step of collecting a collection of demographic and marketing data sets from said spectators and said participants for use in marketing and related commercial activities.

8. A global advertising and spectator contest for performing in a large arena venue or large gathering of spectators, comprising:

an advertisement accompanied by a contest invitation in association with a spectator event for a sponsor to display;

a network, including data transmission and storage mechanisms, for contest contestants located within a electronically geofenced perimeter of said spectator event to electronically submit affection-demonstrating digital images for contest participation, said affection-demonstrating digital images comprising at least one still image selected from a personal photograph, a family photograph, and a pet photograph portraying demonstrations of kissing, hugging, or otherwise conveying personal affection between at least two individuals or pets;

a plurality of spectators of said spectator event, becoming contest participants and entering said contest, by generating a digital image utilizing a camera, a cellular phone with a built-in camera, a scanner, or a kiosk and electronically submitting said affection-demonstrating digital images representing demonstrations of kissing, hugging, or otherwise conveying personal affection between at least two individuals or pets, as well as participant information, to said network, for contest participation, said digital images being electronically submitted utilizing an MMS message or an internet connection, said digital images being stored on contest servers;

a selectable subset of said affection-demonstrating digital images from spectators located within said electronically geofenced perimeter of said spectator event as candidates for entry into a voting stage of said contest;

broadcasting electronics and video systems for broadcasting said selected subset of said affection-demonstrating digital images to a global of community of spectators both located at the spectator event and watching the spectator event via a media outlet;

an invitation system for inviting all spectators of the spectator event to vote for at least one of said affection-demonstrating digital images from said selected subset of said affection-demonstrating digital images and communicating a vote to a contest server;

electronic vote receiving instructions and circuitry for electronically receiving and tallying said votes from all said spectators within a predetermined time limit and prior to the end of the spectator event;

electronic data encryption instructions and circuitry for electronically encrypting said affection-demonstrating digital images and contestant information, utilizing software provided on said contest participants' computer or mobile devices or upon receipt of said affection-demonstrating digital images by a server of said contest provider, to form a plurality of information capsules comprising a plurality of affection-demonstrating digital images, each said affection-demonstrating digital images corresponding to an individual entrant of said contest;

data entry instructions and circuitry for entering said plurality of affection-demonstrating digital images into an electronic batch of a plurality of affection-demonstrating digital image entrants;

selection instructions and circuitry for selecting an affection-demonstrating digital image from said electronic batch of said plurality of affection-demonstrating digital images and designating such selected affection-demonstrating digital image as a winning entry of said contest according to the selected affection-demonstrating digital image having received the most votes from all spectators both within the spectator event geofenced perimeter and outside the spectator event geofenced perimeter;

decrypting instruction and circuitry for decrypting said digital image and contestant information and identifying a single winner of said contest by using said digital image and said contestant information; and wherein submitting said digital images via said MMS message or said internet connection, new digital images can be initiated and completed in compressed time periods associated with the duration for said spectator event.

9. The contest of claim 8, further comprising instructions and circuitry for operating said network to permit said one or more members who have elected to become spectators to said event by connecting to said social network server during the event, and viewing said event at the event venue, wherein at least one view is a perspective view from a position at the event venue and includes an augmented reality (AR) message displayed to said spectators, and wherein said server is capable of displaying said AR message during the event.

10. The contest of claim 8, further comprising instructions and circuitry for providing a plurality of framed images for framing the submitted digital images.

11. The contest of claim 8, further comprising instructions and circuitry for identifying said winner and communicating sad winner to global community of spectators both inside and outside said geofenced perimeter.

12. The contest of claim 8, further comprising instructions and circuitry for broadcasting said affection-demonstrating digital images on a large television screen within a large sports or entertainment venue.

13. The contest of claim 8, further comprising instructions and circuitry for communicating said winner through a global spectator community using an network of globally interconnected communication satellites.

14. The contest of claim 8, further comprising instructions and circuitry for collecting a collection of demographic and marketing data sets from said spectators and said participants for use in marketing and related commercial activities.

15. A sporting or entertainment event, comprising:
a large electronically enhanced arena venue comprising interconnected wireless communications circuitry and systems capable of engaging a large group of spectators in electronic wireless communications with a communications network;

a global advertising and spectator contest for performing in a large arena venue or large gathering of spectators, said contest comprising an advertisement accompanied by a contest invitation in association with a spectator event for a sponsor to display;

a network, including data transmission and storage mechanisms, for contest contestants located within a electronically geofenced perimeter of said spectator event to electronically submit affection-demonstrating digital images for contest participation, said affection-demonstrating digital images comprising at least one still image selected from a personal photograph, a family photograph, and a pet photograph portraying demonstrations of kissing, hugging, or otherwise conveying personal affection between at least two individuals or pets;

a plurality of spectators of said spectator event, becoming contest participants and entering said contest, by generating a digital image utilizing a camera, a cellular phone with a built-in camera, a scanner, or a kiosk and electronically submitting said affection-demonstrating digital images representing demonstrations of kissing, hugging, or otherwise conveying personal affection between at least two individuals or pets, as well as participant information, to said network, for contest participation, said digital images being electronically submitted utilizing an MMS message or an internet connection, said digital images being stored on contest servers;

a selectable subset of said affection-demonstrating digital images from spectators located within said electronically geofenced perimeter of said spectator event as candidates for entry into a voting stage of said contest;

broadcasting electronics and video systems for broadcasting said selected subset of said affection-demonstrating digital images to a global of community of spectators both located at the spectator event and watching the spectator event via a media outlet;

an invitation system for inviting all spectators of the spectator event to vote for at least one of said affection-demonstrating digital images from said selected subset of said affection-demonstrating digital images and communicating a vote to a contest server;

electronic vote receiving instructions and circuitry for electronically receiving and tallying said votes from all said spectators within a predetermined time limit and prior to the end of the spectator event;

electronic data encryption instructions and circuitry for electronically encrypting said affection-demonstrating digital images and contestant information, utilizing software provided on said contest participants' computer or mobile devices or upon receipt of said affection-demonstrating digital images by a server of said contest provider, to form a plurality of information capsules comprising a plurality of affection-demonstrating digital images, each said affection-demonstrating digital images corresponding to an individual entrant of said contest;

data entry instructions and circuitry for entering said plurality of affection-demonstrating digital images into an electronic batch of a plurality of affection-demonstrating digital image entrants;

selection instructions and circuitry for selecting an affection-demonstrating digital image from said electronic batch of said plurality of affection-demonstrating digital images and designating such selected affection-demonstrating digital image as a winning entry of said contest according to the selected affection-demonstrating digital image having received the most votes from all spectators both within the spectator event geofenced perimeter and outside the spectator event geofenced perimeter;
- decrypting instruction and circuitry for decrypting said digital image and contestant information and identifying a single winner of said contest by using said digital image and said contestant information; and
- wherein submitting said digital images via said MMS message or said Internet connection, new digital images can be initiated and completed in compressed time periods associated with the duration for said spectator event.

16. The sporting or entertainment event of claim 15, wherein said a global advertising and spectator contest further comprises instructions and circuitry for operating said network to permit said one or more members who have elected to become spectators to said event by connecting to said social network server during the event, and viewing said event at the event venue, wherein at least one view is a perspective view from a position at the event venue and includes an augmented reality (AR) message displayed to said spectators, and wherein said server is capable of displaying said AR message during the event.

17. The sporting or entertainment event of claim 15, wherein said a global advertising and spectator contest further comprises instructions and circuitry for providing a plurality of framed images for framing the submitted digital images.

18. The sporting or entertainment event of claim 15, wherein said a global advertising and spectator contest further comprises instructions and circuitry for identifying said winner and communicating said winner to global community of spectators both inside and outside said geofenced perimeter.

19. The sporting or entertainment event of claim 15, wherein said a global advertising and spectator contest further comprises instructions and circuitry for broadcasting said affection-demonstrating digital images on a large television screen within a large sports or entertainment venue.

20. The sporting or entertainment event of claim 15, wherein said a global advertising and spectator contest further comprises instructions and circuitry for communicating said winner through a global spectator community using an network of globally interconnected communication satellites.

* * * * *